(12) United States Patent
Lim et al.

(10) Patent No.: US 10,001,250 B2
(45) Date of Patent: *Jun. 19, 2018

(54) LIGHTING DEVICE

(71) Applicant: LG Innotek Co., Ltd., Seoul (KR)

(72) Inventors: Dong Nyung Lim, Seoul (KR); Do Hwan Kim, Seoul (KR); Jae Jin Kim, Seoul (KR); Cheon Joo Kim, Seoul (KR); Sang Hoon Lee, Seoul (KR); Keun Tak Joo, Seoul (KR); Tae Young Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/359,302

(22) Filed: Nov. 22, 2016

(65) Prior Publication Data

US 2017/0074463 A1 Mar. 16, 2017

Related U.S. Application Data

(63) Continuation of application No. 14/177,453, filed on Feb. 11, 2014, now Pat. No. 9,528,693.

(30) Foreign Application Priority Data

Feb. 28, 2013 (KR) .................. 10-2013-0021977
Feb. 28, 2013 (KR) .................. 10-2013-0021978

(Continued)

(51) Int. Cl.
*F21K 9/232* (2016.01)
*F21K 9/238* (2016.01)
(Continued)

(52) U.S. Cl.
CPC ............. *F21K 9/232* (2016.08); *F21K 9/23* (2016.08); *F21K 9/235* (2016.08); *F21K 9/237* (2016.08);
(Continued)

(58) Field of Classification Search
CPC .................................. F21K 9/235; F21K 9/237
See application file for complete search history.

(56) References Cited

U.S. PATENT DOCUMENTS

2006/0227558 A1* 10/2006 Osawa ............... F21V 3/00
362/351
2009/0175041 A1* 7/2009 Yuen ............... F21V 25/02
362/294

(Continued)

FOREIGN PATENT DOCUMENTS

WO  WO 2011/010535 A1  1/2011
WO  WO 2012/095584 A2  7/2012
WO  WO 2013/178047 A1  12/2013

*Primary Examiner* — Alexander Garlen
(74) *Attorney, Agent, or Firm* — Birch, Stewart, Kolasch & Birch, LLP

(57) ABSTRACT

A lighting device includes a heat sink including a first heat radiation part and a second heat radiation part, a light source module including a substrate disposed on the first heat radiation part of the heat sink, and a light emitting device disposed on the substrate; and a power supply unit which is disposed within the second heat radiation part of the heat sink and supplies power to the light source module.

20 Claims, 51 Drawing Sheets

(30) Foreign Application Priority Data

| | | |
|---|---|---|
| Feb. 28, 2013 | (KR) | 10-2013-0021979 |
| Apr. 4, 2013 | (KR) | 10-2013-0036697 |
| Apr. 4, 2013 | (KR) | 10-2013-0036698 |
| May 16, 2013 | (KR) | 10-2013-0055419 |
| Jun. 13, 2013 | (KR) | 10-2013-0067594 |
| Jun. 13, 2013 | (KR) | 10-2013-0067596 |

(51) Int. Cl.

| | |
|---|---|
| *F21V 29/503* | (2015.01) |
| *F21V 29/71* | (2015.01) |
| *F21V 29/76* | (2015.01) |
| *F21V 3/04* | (2018.01) |
| *F21K 9/237* | (2016.01) |
| *F21K 9/235* | (2016.01) |
| *F21V 23/00* | (2015.01) |
| *F21V 29/70* | (2015.01) |
| *F21V 29/74* | (2015.01) |
| *F21V 29/77* | (2015.01) |
| *F21V 29/83* | (2015.01) |
| *F21V 29/85* | (2015.01) |
| *F21K 9/23* | (2016.01) |
| *F21V 29/00* | (2015.01) |
| *F21V 3/00* | (2015.01) |
| *F21V 29/507* | (2015.01) |
| *F21V 29/89* | (2015.01) |
| *F21Y 101/00* | (2016.01) |
| *F21Y 115/10* | (2016.01) |

(52) U.S. Cl.
CPC ............ *F21K 9/238* (2016.08); *F21V 3/0625* (2018.02); *F21V 23/006* (2013.01); *F21V 29/503* (2015.01); *F21V 29/70* (2015.01); *F21V 29/713* (2015.01); *F21V 29/74* (2015.01); *F21V 29/763* (2015.01); *F21V 29/773* (2015.01); *F21V 29/83* (2015.01); *F21V 29/85* (2015.01); *F21V 3/00* (2013.01); *F21V 29/00* (2013.01); *F21V 29/20* (2013.01); *F21V 29/507* (2015.01); *F21V 29/89* (2015.01); *F21Y 2101/00* (2013.01); *F21Y 2115/10* (2016.08); *Y02B 20/30* (2013.01)

(56) References Cited

U.S. PATENT DOCUMENTS

| | | |
|---|---|---|
| 2010/0109499 A1 | 5/2010 | Vilgiate et al. |
| 2011/0068687 A1 | 3/2011 | Takahasi et al. |
| 2011/0109217 A1 | 5/2011 | Kang et al. |
| 2011/0193463 A1 | 8/2011 | Daniel |
| 2012/0161627 A1 | 6/2012 | Chang et al. |
| 2012/0161630 A1 | 6/2012 | Miki et al. |
| 2012/0218743 A1 | 8/2012 | Ioka et al. |
| 2012/0293057 A1* | 11/2012 | Yamamoto ............ F21V 29/004 313/45 |

* cited by examiner

Fig. 17
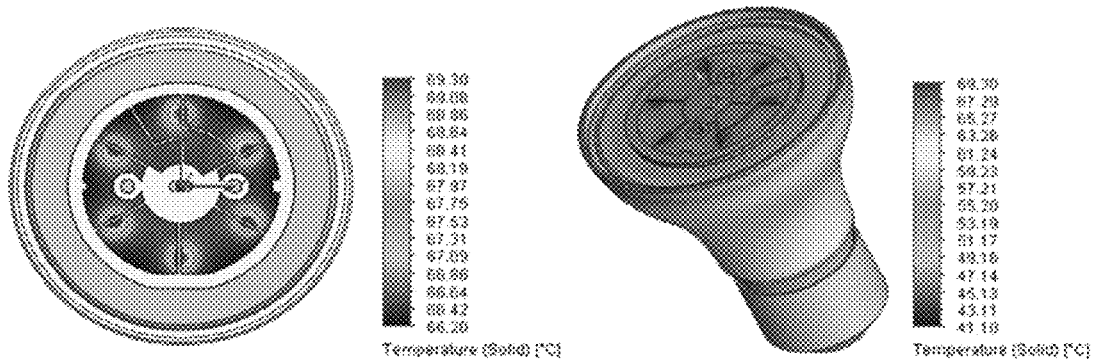
Fig. 18
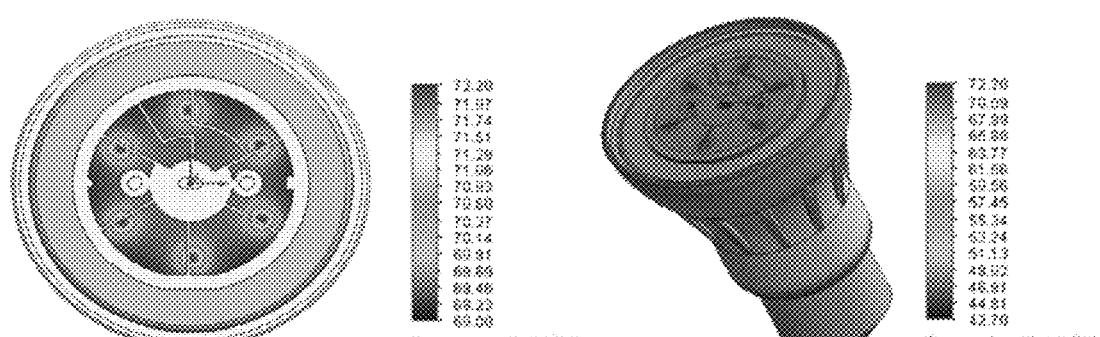
Fig. 19

Fig. 62
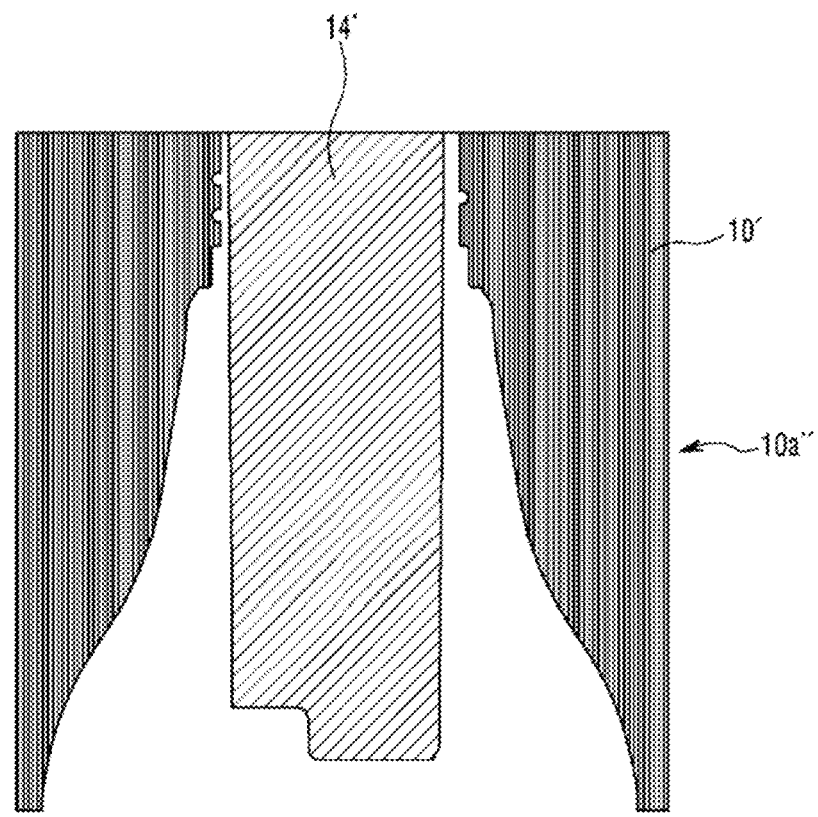
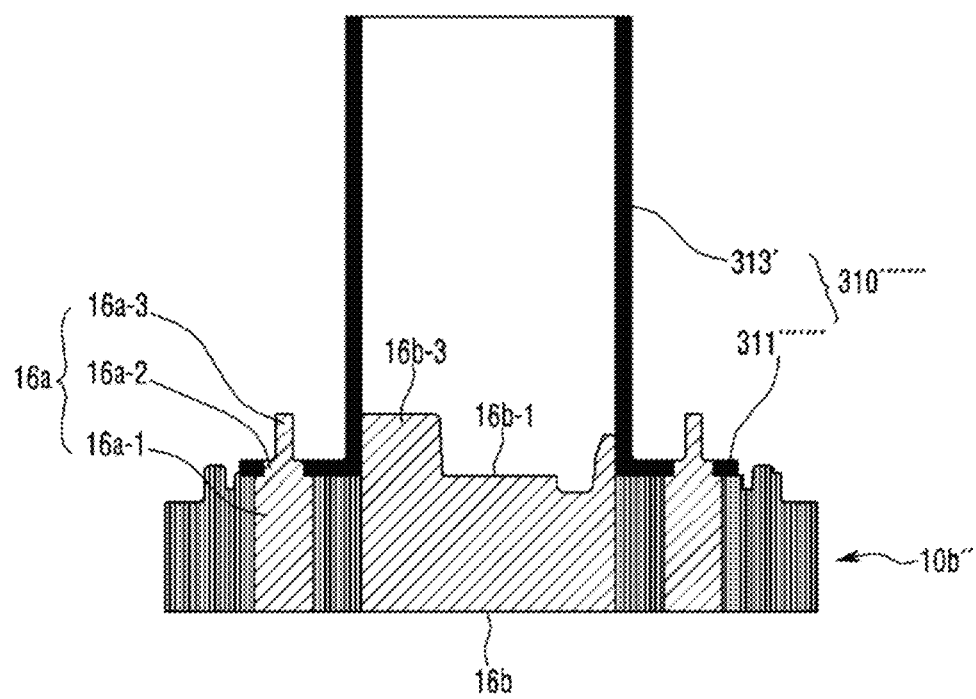

LIGHTING DEVICE

CROSS-REFERENCE TO RELATED APPLICATIONS

This Application is a Continuation of copending application Ser. No. 14/177,453, filed on Feb. 11, 2014, which claims priority under 35 U.S.C. § 119(a) of Korean Patent Application No. 10-2013-0021977 filed Feb. 28, 2013, No. 10-2013-0021978 filed Feb. 28, 2013, No. 10-2013-0021979 filed Feb. 28, 2013, No. 10-2013-0036697 filed Apr. 4, 2013, No. 10-2013-0036698 filed Apr. 4, 2013, No. 10-2013-0055419 filed May 16, 2013, No. 10-2013-0067594 filed Jun. 13, 2013, and No. 10-2013-0067596 filed Jun. 13, 2013, the subject matters of which are incorporated herein by reference.

BACKGROUND OF THE INVENTION

Embodiments may relate to a lighting device. A light emitting diode (LED) is an energy device for converting electric energy into light energy. Compared with an electric bulb, the LED has higher conversion efficiency, lower power consumption and a longer life span. As the advantages are widely known, more and more attentions are now paid to a lighting apparatus using the LED

SUMMARY OF THE INVENTION

One embodiment is a lighting device. The lighting device includes: a heat sink including a first heat radiation part and a second heat radiation part; a light source module including a substrate disposed on the first heat radiation part of the heat sink, and a light emitting device disposed on the substrate; and a power supply unit which is disposed within the second heat radiation part of the heat sink and supplies power to the light source module. The second heat radiation part of the heat sink includes an inner portion receiving the power supply unit therewithin, an outer portion enclosing the inner portion, and a first receiver disposed between the inner portion and the outer portion. The first heat radiation part of the heat sink includes an upper portion which is disposed on the inner portion of the second heat radiation part and on which the substrate of the light source module is disposed, and a lower portion disposed in the first receiver of the second heat radiation part.

Another embodiment is a lighting device. The lighting device includes: a heat sink including a first heat radiation part and a second heat radiation part; and a light source module including a substrate disposed on the first heat radiation part of the heat sink, and a light emitting device disposed on the substrate. The first heat radiation part of the heat sink includes a lower portion and an upper portion which is disposed on the lower portion and on which the substrate of the light source module is disposed. The second heat radiation part of the heat sink includes an inner portion enclosed by the lower portion of the first heat radiation part, and an outer portion enclosing the lower portion of the first heat radiation part. The first heat radiation part of the heat sink has a first thermal conductivity. The second heat radiation part of the heat sink has a second thermal conductivity less than the first thermal conductivity. The first and second heat radiation parts are limited to separate from each other.

BRIEF DESCRIPTION OF THE DRAWINGS

Arrangements and embodiments may be described in detail with reference to the following drawings in which like reference numerals refer to like elements and wherein:

FIGS. 16 and 17 are simulation results showing a heat radiation performance of the lighting device according to the first embodiment shown in FIG. 1;

FIGS. 18 and 19 are simulation results showing a heat radiation performance of the heat sink 300 with a fin in the lighting device according to the first embodiment shown in FIG. 1;

FIG. 57 is a view for describing traces of a sliding portion 12 shown in FIG. 55;

FIGS. 62 to 63 are views for describing a method for manufacturing the heat sink 300''''' shown in FIG. 59.

DETAILED DESCRIPTION OF THE INVENTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

A thickness or size of each layer is magnified, omitted or schematically shown for the purpose of convenience and clearness of description. The size of each component does not necessarily mean its actual size.

In description of embodiments of the present invention, when it is mentioned that an element is formed "on" or "under" another element, it means that the mention includes a case where two elements are formed directly contacting with each other or are formed such that at least one separate element is interposed between the two elements. The "on" and "under" will be described to include the upward and downward directions based on one element.

Hereafter, a lighting device according to various embodiments of the present invention will be described with reference to the accompanying drawings.

First Embodiment

Figure 1:
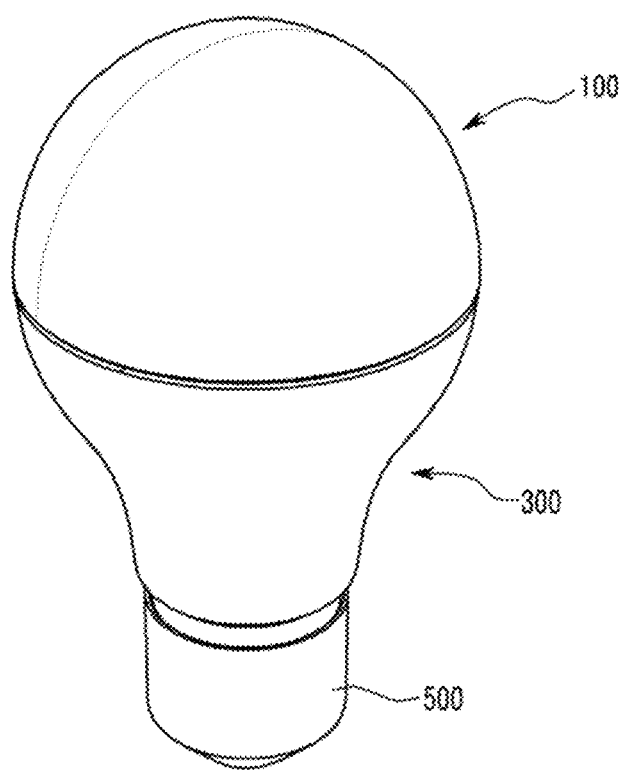
FIG. 1 is a perspective view of a lighting device according to a first embodiment.
Figure 2:
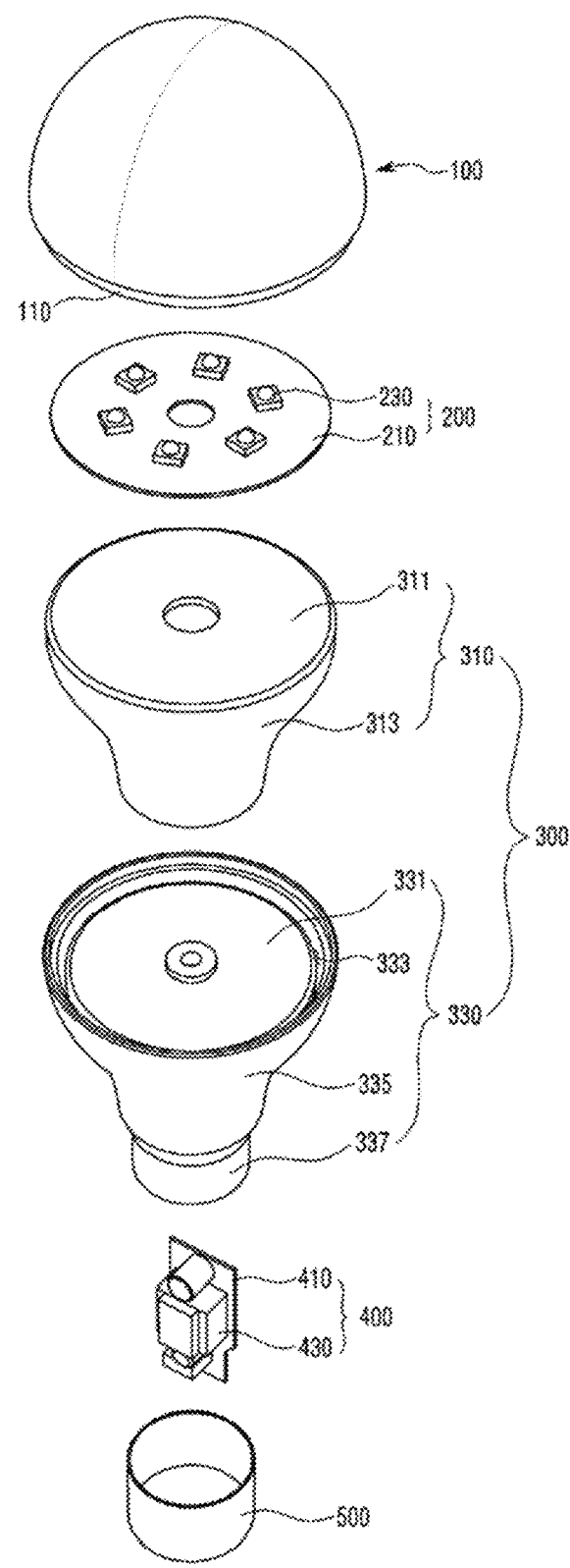
FIG. 2 is a top exploded perspective view showing the lighting device shown in FIG. 1.
Figure 3:
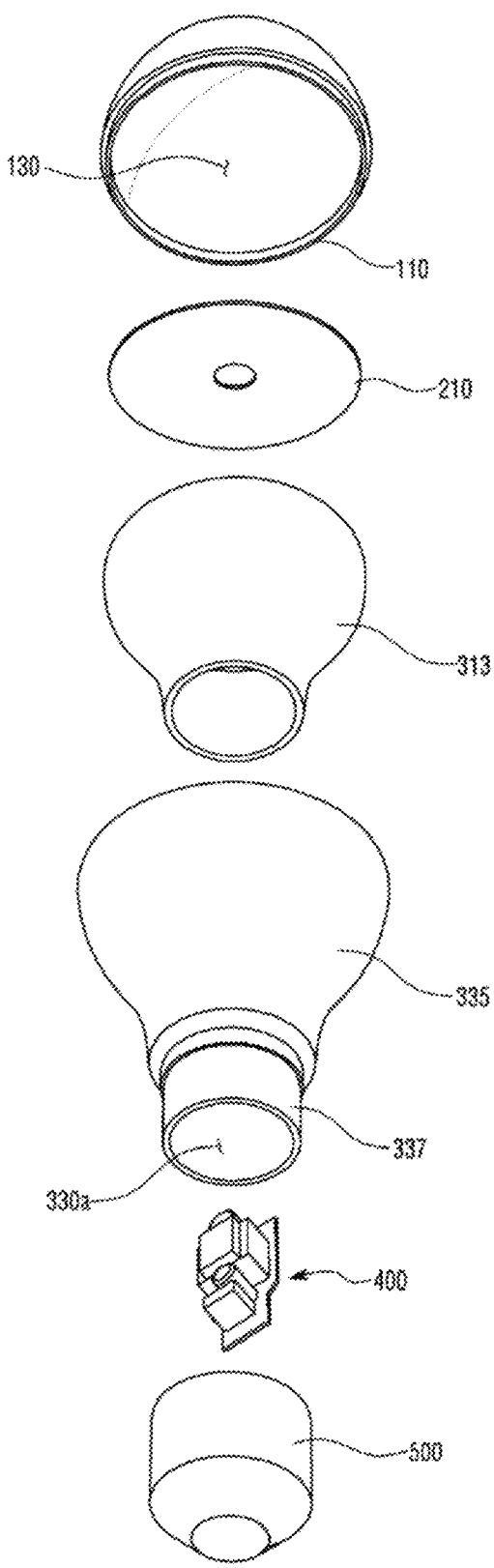
FIG. 3 is a bottom exploded perspective view showing the lighting device shown in FIG. 1.
Figure 4:
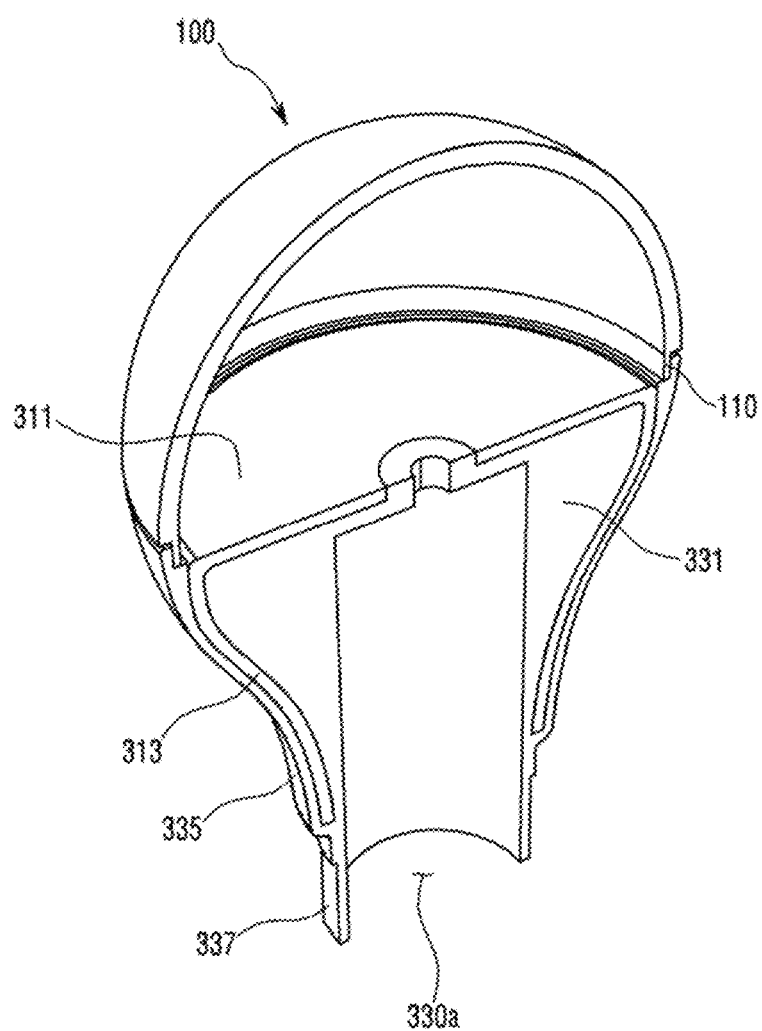
FIG. 4 is a sectional perspective view of a cover and a heat sink alone in the lighting device shown in FIG. 1.
Figure 5:
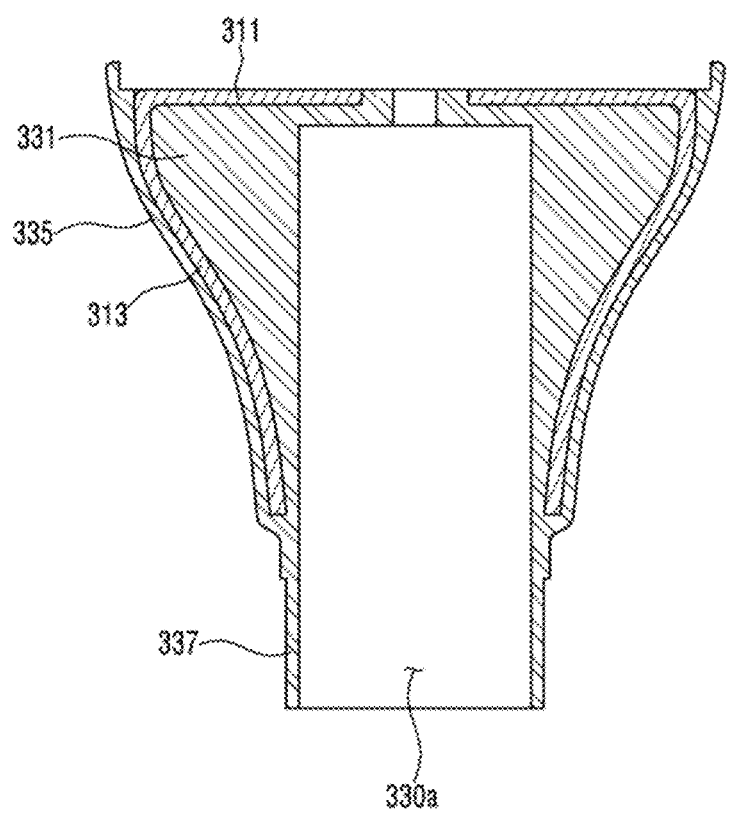
FIG. 5 is a cross sectional view of the heat sink alone in the lighting device shown in FIG. 1.

FIG. 1 is a perspective view of a lighting device according to a first embodiment. FIG. 2 is a top exploded perspective view showing the lighting device shown in FIG. 1. FIG. 3 is a bottom exploded perspective view showing the lighting device shown in FIG. 1. FIG. 4 is a sectional perspective view of a cover and a heat sink alone in the lighting device shown in FIG. 1. FIG. 5 is a cross sectional view of the heat sink alone in the lighting device shown in FIG. 1.

Referring to FIGS. 1 to 5, the lighting device according to the first embodiment may include a cover 100, a light source module 200, a heat sink 300, a power supply unit 400 and a base 500. Hereafter, the respective components will be described in detail.

<Cover 100>

The cover 100 has a hemispherical shape or a bulb shape, and includes an opening 130.

The cover 100 is disposed on the light source module 200 and is optically coupled to the light source module 200. For example, the cover 100 may diffuse, scatter or excite light emitted from the light source module 200.

The cover 100 is coupled to the heat sink 300. For this, the cover 100 may include a coupling portion 110. The coupling portion 110 may be coupled to a second heat radiation part 330 of the heat sink 300. The coupling portion 110 may have a screw thread-shaped coupling structure corresponding to a screw groove structure of the second heat radiation part 330. Due to the screw groove structure of the second heat radiation part 330 and the screw thread structure of the coupling portion 110, the cover 100 and the heat sink 300 are easily coupled to each other, thereby improving the work efficiency of a worker.

The material of the cover 100 may be a polycarbonate (PC) used to diffuse light for the purpose of preventing a user from feeling glare caused by light emitted from the light source module 200. Moreover, the cover 100 may be formed of any one of glass, plastic, polypropylene (PP), and polyethylene (PE).

The inner surface of the cover 100 may be anti-corrosion treated, or a predetermined pattern may be applied on the outer surface of the cover 100. The cover 100 may scatter the light emitted from the light source module 200, thereby alleviating the user's glare.

The cover 100 may be manufactured by a blow molding process for the sake of rear light distribution.

<Light Source Module 200>

The light source module 200 includes a light emitting device 230 which emits predetermined light.

The light source module 200 is disposed on the heat sink 300.

The light source module 200 may include a substrate 210 and the light emitting device 230 disposed on the substrate 210.

The substrate 210 may be formed by printing a circuit pattern on an insulator. For example, the substrate 210 may include a printed circuit board (PCB), a metal core PCB, a flexible PCB, a ceramic PCB and the like.

The substrate 210 may be formed by printing a predetermined circuit pattern on a transparent or opaque resin. Here, the resin may be a thin insulating sheet having the circuit pattern.

The substrate 210 may have a circular plate shape. However, there is no limit to this. The substrate 210 may have a polygonal plate shape, an elliptical plate shape and other various plate shapes.

The surface of the substrate 210 may be coated with a material capable of efficiently reflecting light or may be coated with a color, for example, white, silver and the like.

A plurality of the light emitting devices 230 may be disposed on one side of the substrate 210. The light emitting device 230 may be a light emitting diode chip emitting red, green and blue light or a light emitting diode chip emitting ultraviolet light. Here, the light emitting diode chip may have a lateral type or vertical type The light emitting device 230 may be a high-voltage (HV) LED package. A HV LED chip within the HV LED package is driven by a DC power supplier and is turned on at a voltage higher than 20V. The HV LED package has a high power consumption of about 1 W. For reference, while a conventional common LED chip is turned on at a voltage of 2V to 3V, since the light emitting device 230 which is the HV LED package instead of the conventional common LED chip has the high power consumption of about 1 W, the performance equivalent to or similar to that of the conventional common LED chip can be obtained only by a small number of the light emitting devices 230, so that it is possible to reduce the production cost of the lighting device according to the embodiment.

A lens may be disposed on the light emitting device 230. The lens is disposed to cover the light emitting device 230. The lens is able to adjust the orientation angle or direction of the light emitted from the light emitting device 230. The lens has a hemispherical shape and may be formed of a light-transmitting resin such as a silicone resin or an epoxy resin. The light-transmitting resin may include an entirely or partially distributed phosphor.

When the light emitting device 230 is a blue light emitting diode, the phosphor included in the light-transmitting resin may include at least one of garnet based phosphor (YAG, TAG), silicate based phosphor, nitride based phosphor and oxynitride based phosphor.

It is possible to create natural light (white light) by including only yellow phosphor to the light-transmitting resin. Additionally, green phosphor or red phosphor may be further included in order to improve a color rendering index and to reduce a color temperature.

When many kinds of fluorescent materials are mixed in the light-transmitting resin, an addition ratio of the color of the phosphor may be formed such that the green phosphor is more used than the red phosphor, and the yellow phosphor is more used than the green phosphor. The garnet based phosphor (YAG), the silicate based phosphor and the oxynitride based phosphor may be used as the yellow phosphor. The silicate based phosphor and the oxynitride based phosphor may be used as the green phosphor. The nitride based phosphor may be used as the red phosphor. The light-transmitting resin may be mixed with various kinds of the phosphors or may be configured by a layer including the red phosphor, a layer including the green phosphor and a layer including the yellow phosphor, which are formed separately from each other.

<Heat Sink 300>

The light source module 200 is disposed on the heat sink 300. The heat sink 300 may receive heat radiated from the light source module 200 and radiate the heat.

The power supply unit 400 is disposed in the heat sink 300. The heat sink 300 may receive heat radiated from the power supply unit 400 and radiate the heat.

The heat sink 300 may include a first heat radiation part 310 and the second heat radiation part 330.

The material of the first heat radiation part 310 is different from that of the second heat radiation part 330. Specifically, the first heat radiation part 310 may be formed of a non-insulating material, and the second heat radiation part 330 may be formed of an insulating material. The first heat radiation part 310 formed of the non-insulating material is able to quickly radiate the heat emitted from the light source module 200. The outer surface of the heat sink 300 becomes insulating due to the second heat radiation part 330 formed of the insulating material, thereby improving a withstand voltage characteristic of the lighting device and protecting a user from electrical accidents such as electric shock. For example, the first heat radiation part 310 may be formed of a metallic material such as aluminum, copper, magnesium and the like, and the second heat radiation part 330 may be formed of a resin material such as Polycarbonate (PC), and Acrylonitrile (AN), Butadiene (BD) and styrene (SM) (ABS). Here, the resin-made second heat radiation part 330 may include metal powder. It is easier to form the external appearance of the resin-made second heat radiation part 330 than to form the external appearance of a conventional metallic heat sink. Also, poor appearance caused by coating or anodizing the conventional heat sink does not occur in the resin-made second heat radiation part 330. When the first heat radiation part 310 is formed of a metallic material and the second heat radiation part 330 is formed of a resin material, the metallic material is less used than that of a conventional heat sink of which the first and second heat radiat ion parts 310 and 330 are formed of the metallic material. Accordingly, a manufacturing cost of the lighting device can be reduced.

Here, the second heat radiation part 330 may be formed of a heat radiating resin or a heat radiating plastic which is formed by including a heat radiating filler to the resin material. Here, the heat radiating filler may be an insulating material or a non-insulating material. Specifically, the heat radiating filler may be an insulating material, for example, ceramic, or may be a non-insulating material, for example, carbon fiber, graphene, and carbon nano-tube.

A first thermal conductivity (W/(mk) or W/m° C.) of the material constituting the first heat radiation part 310 may be greater than a second thermal conductivity of the material constituting the second heat radiation part 330. Since the light source module 200 is disposed on the first heat radiation part 310, when the first thermal conductivity of the first heat radiation part 310 is greater than the second thermal conductivity of the second heat radiation part 330, it is advantageous for the improvement of heat radiation performance. For example, the first heat radiation part 310 may be formed of aluminum having a high thermal conductivity, and the second heat radiation part 330 may be formed of polycarbonate (PC) having a thermal conductivity less than that of the first heat radiation part 310. Here, the first heat radiation part 310 is not limited to the aluminum, and the second heat radiation part 330 is not limited to the Polycarbonate (PC).

The light source module 200 may be disposed on the first heat radiation part 310. The first heat radiation part 310 may be disposed or received within the second heat radiation part 330.

The first heat radiation part 310 may include an upper portion 311 and a lower portion 313.

The upper portion 311 may have a flat plate shape. However, the upper portion 311 is not limited to this and may have a plate shape of which a portion, especially, the central portion is upwardly or downwardly convex, or may have a hemispherical shape. Also, the upper portion 311 may have a polygonal or elliptical plate shape as well as a circular plate shape.

The substrate 210 of the light source module 200 is disposed on the upper portion 311. Therefore, the upper portion 311 may directly receive heat from the light source module 200 and may radiate the heat received from the light source module 200 to the outside or transfer to the lower portion 313.

In a top opening and a bottom opening of the lower portion 313, the upper portion 311 may be disposed in the top opening.

The upper portion 311 may be disposed on an inner portion 331 of the second heat radiation part 330. Specifically, the upper portion 311 may be disposed on the top surface of the inner portion 331 of the second heat radiation part 330.

The upper portion 311 may be disposed in a first receiver 333 of the second heat radiation part 330. Specifically, portions other than the top surface of the upper portion 311 may be received in the first receiver 333.

A heat radiating plate (not shown) or a thermal grease may be disposed between the upper portion 311 and the substrate 210 of the light source module 200 in order to quickly conduct the heat from the light source module 200 to the upper portion 311.

The lower portion 313 may be disposed within the second heat radiation part 330. Specifically, the lower portion 313 may be disposed in the first receiver 333 of the second heat radiation part 330. When the lower portion 313 is disposed in the first receiver 333 of the second heat radiation part 330, the lower portion 313 formed of the metallic material or the non-insulating material does not form the appearance of the lighting device according to the first embodiment. Accordingly, it is possible to protect users from electrical accidents.

The lower portion 313 may be enclosed by the second heat radiation part 330. When the lower portion 313 is enclosed by an outer portion 335 of the second heat radiation part 330, the lower portion 313 formed of the metallic material or the non-insulating material does not form the appearance of the lighting device according to the first embodiment. Accordingly, it is possible to protect users from electrical accidents.

The lower portion 313 may have a cylindrical shape with an empty interior. Here, the lower portion 313 may have a cylindrical shape of which the diameter is decreased toward the bottom from the top or becomes less toward the lower portion thereof from the upper portion thereof. When the diameter of the lower portion 313 is decreased toward the lower portion thereof from the upper portion thereof, the lower portion 313 has a heat radiating area greater than that of the lower portion 313 having a constant diameter. As a result, the heat radiation performance can be more improved.

The lower portion 313 may have the top opening and the bottom opening. The upper portion 311 may be disposed in the top opening.

The shape of the lower portion 313 may correspond to an outer surface shape of the outer portion 335 of the second heat radiation part 330. The lower portion 313 may be disposed adjacent to the outer surface the outer portion 335 of the second heat radiation part 330. When the shape of the lower portion 313 corresponds to an outer surface shape of the outer portion 335 of the second heat radiation part 330, and when the lower portion 313 is disposed adjacent to the outer surface the outer portion 335, a distance (a heat radiation path) from the lower portion 313 to the outer portion 335 is short. As a result, the heat radiation performance of the heat sink 300 can be improved.

A thickness of the lower portion 313 of the first heat radiation part 310 may be from 1.0 T (mm) to 2.0 T. When the thickness of the lower portion 313 of the first heat radiation part 310 is from 1.0 T to 2.0 T, the lower portion 313 has an advantage of being easily molded. That is, when the thickness of the lower portion 313 is less than 1.0 T, the shape of the formed lower portion 313 is difficult to maintain as it is, and when the thickness of the lower portion 313 is larger than 2.0 T, the shape of the lower portion 313 is difficult to process. Therefore, it is preferable that the thickness of the lower portion 313 is from 1.0 T to 2.0 T.

A thickness of the outer portion 335 of the second heat radiation part 330 may be from 0.5 T to 2.0 T. When the thickness of the outer portion 335 of the second heat radiation part 330 is less than 0.5 T, a withstand voltage characteristic is degraded and a flammability grade is difficult to comply with, and when the thickness of the outer portion 335 of the second heat radiation part 330 is larger than 2.0 T, the heat radiation performance of the heat sink 300 is degraded. Therefore, it is preferable that the thickness of the thickness of the outer portion 335 of the second heat radiation part 330 is from 0.5 T to 2.0 T.

A ratio of the thickness of the lower portion 313 of the first heat radiation part 310 to the thickness of the outer portion 335 of the second heat radiation part 330 may be from 1:1 to 2:1. When the thickness of the lower portion 313 of the first heat radiation part 310 is less than the thickness of the outer portion 335 of the second heat radiation part 330, the heat radiation performance of the heat sink 300 is degraded. When the thickness of the lower portion 313 of the first heat radiation part 310 exceeds two times the thickness of the outer portion 335 of the second heat radiation part 330, the withstand voltage characteristic is degraded. Therefore, the ratio of the thickness of the lower portion 313 of the first heat radiation part 310 to the thickness of the outer portion 335 of the second heat radiation part 330 is from 1:1 to 2:1.

The length (or height) of the lower portion 313 may extend from the top to the bottom of the outer portion 335 of the second heat radiation part 330, or may extend from the top to the middle of the outer portion 335 of the second heat radiation part 330. Therefore, the length of the lower portion 313 is not limited to what is shown in the drawings. The heat radiation performance may be enhanced with the increase of the length of the lower portion 313.

A fin or an embossed structure may be further included on at least one of the outer surface and the inner surface of the lower portion 313. When the fin or the embossed structure is included on the lower portion 313, the surface area of the lower portion 313 itself is increased, so that the heat radiating area is increased. As a result, the heat radiation performance of the heat sink 300 can be improved.

The upper portion 311 and the lower portion 313 may be integrally formed with each other. In the present specification, it may mean that the individual upper portion 311 and the individual lower portion 313 are not connected by welding or bonding them, but the upper portion 311 and the lower portion 313 are connected as one to each other without being physically separated. When the upper portion 311 and the lower portion 313 are integrally formed with each other, the contact resistance between the upper portion 311 and the lower portion 313 is close to 0. Therefore, a heat transfer rate or a heat transfer speed from the upper portion 311 to the lower portion 313 is higher than that when the upper portion 311 and the lower portion 313 are not integrally formed with each other. Also, when the upper portion 311 and the lower portion 313 are integrally formed with each other, a process of coupling them, for example, a press processing and the like, is not required, so that the cost in the manufacturing process can be reduced.

The upper portion 311 and the lower portion 313 of the first heat radiation part 310 may be integrally formed of aluminum having excellent heat radiation performance by sequentially performing a pressing process, a spinning process and an extrusion process The second heat radiation part 330, together with the cover 100, may form the appearance of the lighting device according to the first embodiment and may receive the first heat radiation part 310 and the power supply unit 400.

The first heat radiation part 310 is disposed within the second heat radiation part 330. Specifically, the second heat radiation part 330 may include the first receiver 330 in which the upper portion 311 and the lower portion 313 of the first heat radiation part 310 are received. Also, the second heat radiation part 330 may include a second receiver 330a receiving the power supply unit 400.

The first receiver 333 may be disposed between the inner portion 331 and the outer portion 335. Specifically, the first receiver 333 may be a gap formed between the inner portion 331 and the outer portion 335. The shape of the first receiver 333 may correspond to that of the first heat radiation part 310.

The second receiver 330a may be disposed in the inner portion 331. Specifically, the second receiver 330a may be a recess having a predetermined depth toward the top surface from the bottom surface of the inner portion 331. Unlike a receiver of the heat sink of a conventional lighting device, the second receiver 330a is formed in the second heat radiation part 330 formed of an insulating material or a resin material. Therefore, the power supply unit 400 received in the second receiver 330a can be used as a non-insulating PSU. The manufacturing cost of the non-insulating PSU is lower than that of an insulating PSU, so that the manufacturing cost of the lighting device can be reduced.

The second heat radiation part 330 may include the inner portion 331, the outer portion 335, and a connection portion 337.

The inner portion 331 may be disposed within the first heat radiation part 310. The inner portion 331 may be enclosed by the first heat radiation part 310. Here, the inner portion 331 may have a shape corresponding to the shapes of the upper portion 311 and the lower portion 313 of the first heat radiation part 310.

The light source module 200 may be disposed on the inner portion 331.

The inner portion 331 may have the second receiver 330a receiving the power supply unit 400.

The outer portion 335 is disposed to enclose the first heat radiation part 310. Here, the outer portion 335 may have a shape corresponding to the external shape of the first heat radiation part 310.

The outer portion 335 may have a fin shape or an embossed shape. The fin shape or the embossed shape increases the surface area of the outer portion 335, so that the heat radiation performance of the heat sink 300 can be improved.

The connection portion 337 may be connected to the lower portions of the inner portion 331 and the outer portion 335. The connection portion 337 may be coupled the base 500. The connection portion 337 may have a screw thread corresponding to a screw groove formed in the base 500. The connection portion 337, together with the inner portion 331, may have the second receiver 330a.

The first heat radiation part 310 and the second heat radiation part 330 may be integrally formed with each other. Also, the mutually coupled first and second heat radiation parts 310 and 330 may be limited to separate from each other. Specifically, the first heat radiation part 310 and the second heat radiation part 330 are in a state of being stuck together by a predetermined process. Therefore, the first heat radiation part 310 and the second heat radiation part 330 are difficult to separate. Here, it is noted that the first heat radiation part 310 and the second heat radiation part 330 have been separated in FIGS. 2 to 3 for the sake of convenience of the description. In the present specification, it should be understood that the fact that first heat radiation part 310 and the second heat radiation part 330 are integrally formed with each other or limited to separate from each other does not mean that they are not separated by any force, but means that it is possible to separate them by a predetermined force relatively greater than the force of human, for example, a mechanical force, and means that it is difficult to return to the previous state of having been coupled if the first heat radiation part 310 and the second heat radiation part 330 are separated from each other by the predetermined force.

When the first heat radiation part 310 and the second heat radiation part 330 are integrally formed with each other or limited to separate from each other, a contact resistance between the metallic first heat radiation part 310 and the resin made-second heat radiation part 330 may be less than a contact resistance in a case where the first heat radiation part 310 and the second heat radiation part 330 are not integrally formed with each other. Thanks to the reduced contact resistance, it is possible to obtain a heat radiation performance same as or similar to that of the conventional heat sink (entirely formed of a metallic material). Further, the integrally formed first and second heat radiation parts 310 and 330 are stronger to external impact than the first heat radiation part 310 and the second heat radiation part 330 which are not integrally formed with each other.

An insert injection process may be used to integrally form the first heat radiation part 310 and the second heat radiation part 330. The insert injection process is formed as follows. After, the previously manufactured first heat radiation part 310 is put into a mold (frame) for molding the second heat radiation part 330, a material constituting the second heat radiation part 330 is molten and put into the mold, and then is injected.

<Power Supply Unit 400>

The power supply unit 400 may include a support plate 410 and a plurality of parts 430 which are mounted on the support plate 410.

The support plate 410 supports the plurality of the parts 430. The support plate 410 may be a printed circuit board allowing the plurality of the parts 430 to be electrically connected.

The parts 430 may include, for example, a DC converter converting AC power supply supplied by an external power supply into DC power supply, a driving chip controlling the driving of the light source module 200, and an electrostatic discharge (ESD) protective device for protecting the light source module 200. However, there is no limit to this.

As described above, the power supply unit 400 may be the non-insulating PSU when walls defining the second receiver 330a of the second heat radiation part 330 are formed of an insulating material or a resin material. If the power supply unit 400 is formed of the non-insulating PSU, the manufacturing cost of the lighting device can be reduced.

<Base 500>

The base 500 is coupled to the heat sink 300. Specifically, the base 500 may be coupled to the connection portion 337 of the second heat radiation part 330 of the heat sink 300.

The base 500 is electrically connected to the power supply unit 400. The base 500 transmits external AC power to the power supply unit 400.

The base 500 may have the same size and shape as those of the base of a conventional incandescent bulb. In this case, the lighting device according to the embodiment can take the place of the conventional incandescent bulb.

Second Embodiment

Figure 6:
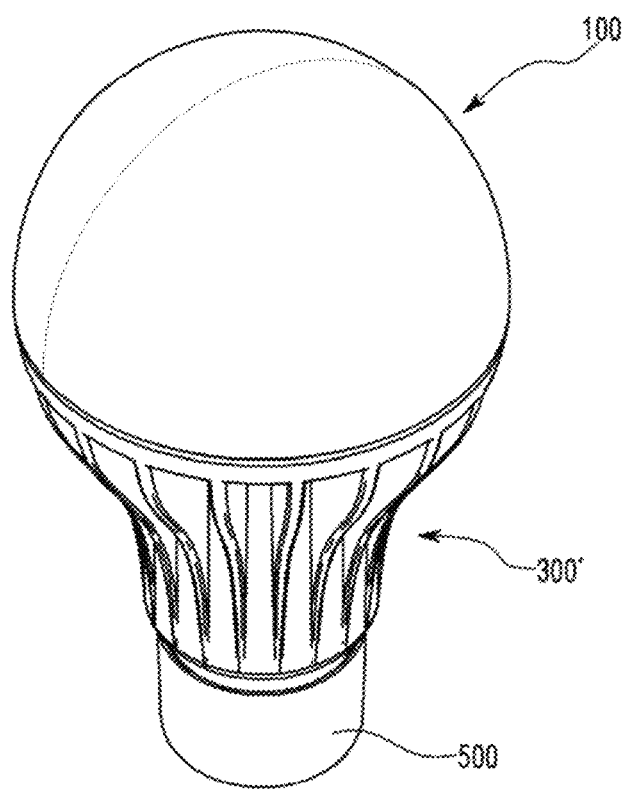
FIG. 6 is a perspective view of a lighting device according to a second embodiment.
Figure 7:
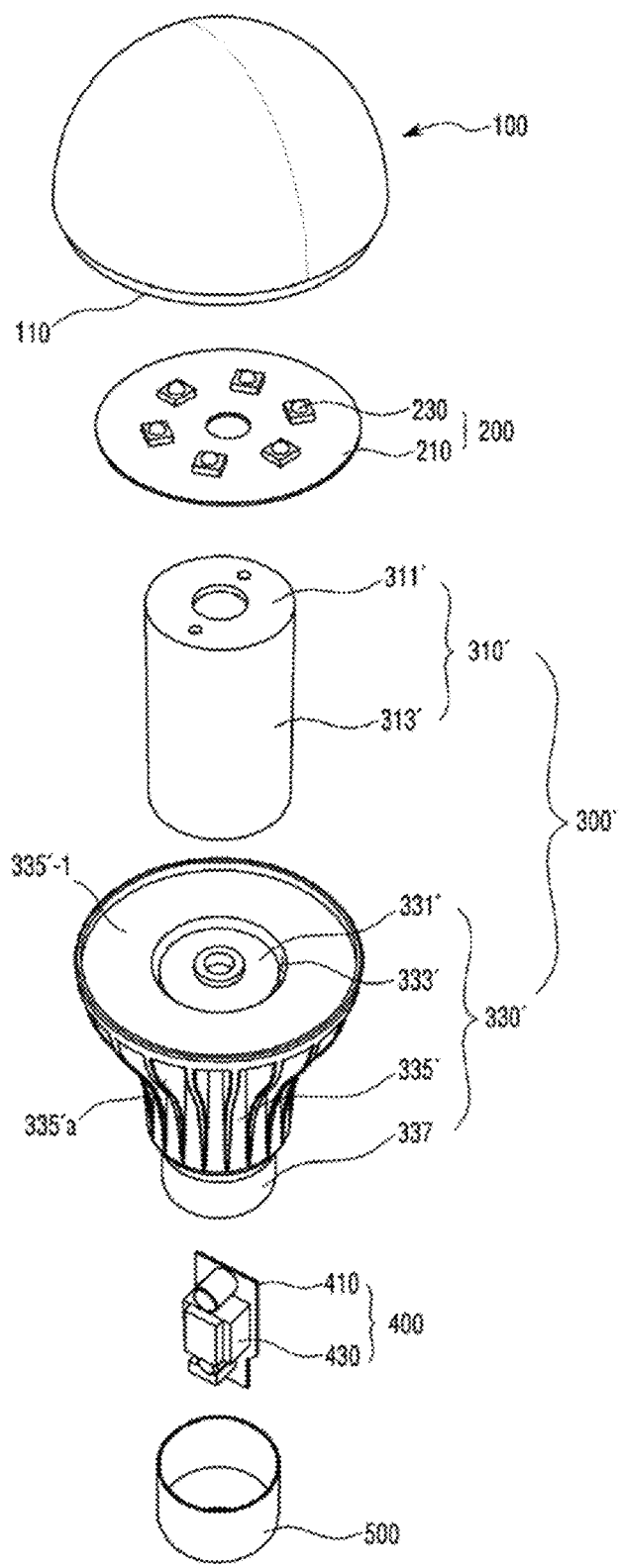
FIGS. 7 to 8 are exploded perspective views of the lighting device shown in FIG. 6.
Figure 8:
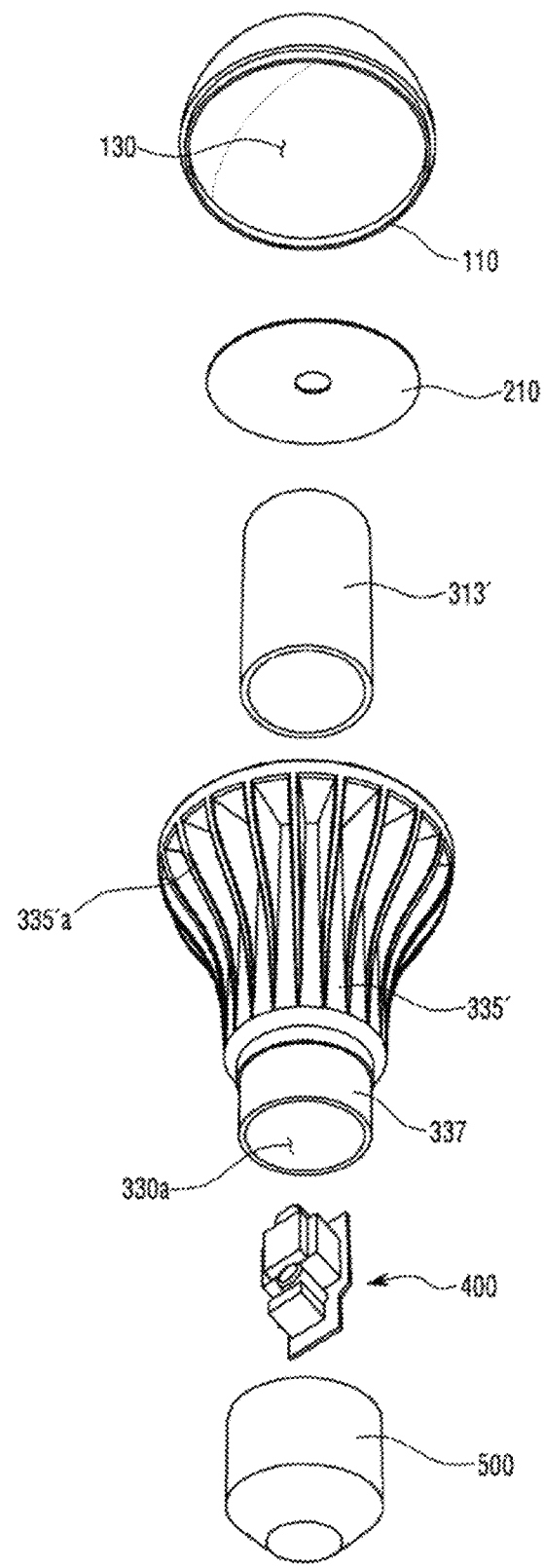
Figure 9:
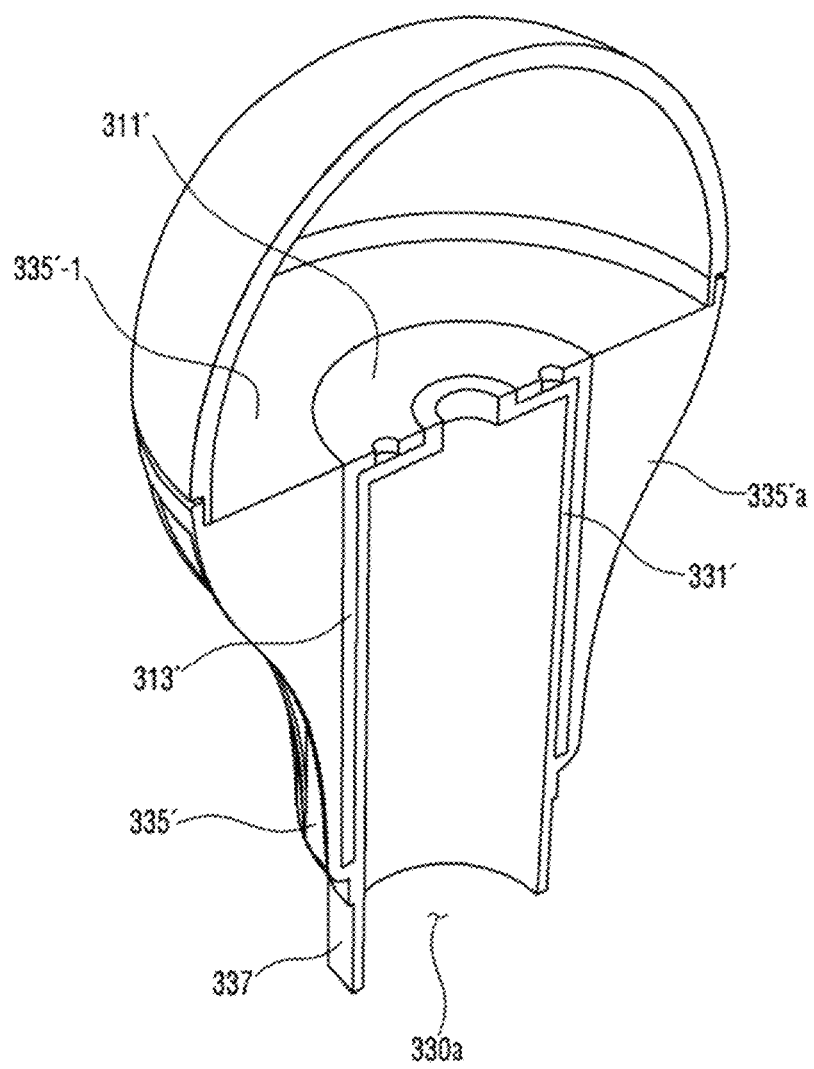
FIG. 9 is a sectional perspective view of a cover and a heat sink which are shown in FIG. 6.
Figure 10:
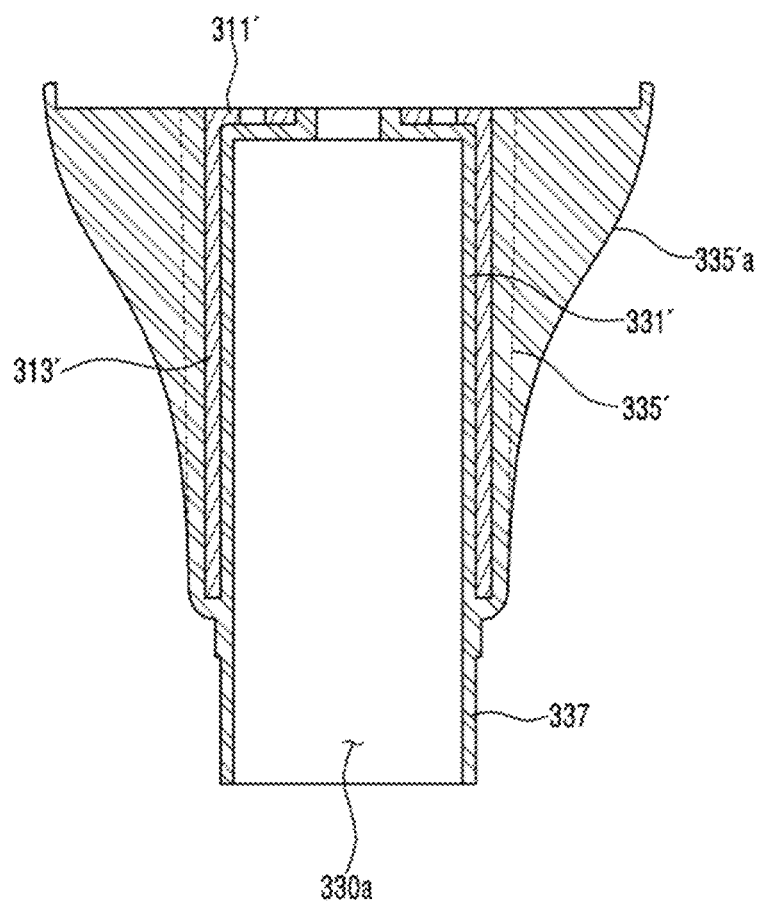
FIG. 10 is a cross sectional view of the heat sink shown in FIG. 6.

FIG. 6 is a perspective view of a lighting device according to a second embodiment. FIGS. 7 to 8 are exploded perspective views of the lighting device shown in FIG. 6. FIG. 9 is a sectional perspective view of a cover and a heat sink which are shown in FIG. 6. FIG. 10 is a cross sectional view of the heat sink shown in FIG. 6.

In the lighting device according to the second embodiment shown in FIGS. 6 to 10, the same reference numerals are assigned to the same components as those of the lighting device according to the first embodiment shown in FIGS. 1 to 5. Therefore, in the lighting device according to the second embodiment shown in FIGS. 6 to 10, detailed descriptions of the same components as those of the lighting device according to the first embodiment shown in FIGS. 1 to 5 will be replaced by the foregoing descriptions.

The substrate 210 may be disposed on an upper portion 311' of a first heat radiation part 310' and on an outer portion 335' of a second heat radiation part 330'. Specifically, the central portion of the substrate 210 may be disposed on a top surface of the upper portion 311' of the first heat radiation part 310', and the outer portion of the substrate 210 may be disposed on a top surface 335'-1 of the outer portion 335' of the second heat radiation part 330'.

A heat sink 300' includes the first heat radiation part 310' and the second heat radiation part 330'. Characteristics other than the shapes of the first heat radiation part 310' and the second heat radiation part 330' are the same as those of the first heat radiation part 310 and the second heat radiation part 330 shown in FIGS. 1 to 5.

The shape of the first heat radiation part 310' is different from that of the first heat radiation part 310 shown in FIGS. 1 to 5. Specifically, a lower portion 313' of the first heat radiation part 310' has a cylindrical shape having a constant diameter. The cylindrical lower portion 313' may be manufactured by a pipe process.

The top surface of the upper portion 311' may be disposed on the same plane with a top surface 335'-1 of the outer portion 335' of the second heat radiation part 330'. In other words, the top surface of the upper portion 311' may not have a level difference with respect to the top surface 335'-1 of the outer portion 335' of the second heat radiation part 330'. When the top surface of the upper portion 311' is disposed on the same plane with a top surface 335'-1 of the outer portion 335' of the second heat radiation part 330', heat transferred to the upper portion 311' may be directly conducted to the outer portion 335' not through the lower portion 313', thereby making it easier to conduct the heat between the first heat radiation part 310' and the second heat radiation part 330'. As a result, the heat radiation performance of the heat sink 300' can be more improved.

Since the lower portion 313' has a cylindrical shape having a constant diameter, the first heat radiation part 310' and the second heat radiation part 330' may not be integrally formed with each other. That is, the first heat radiation part 310' may be separated from the second heat radiation part 330'. However, for the purpose of reducing the contact resistance between the first heat radiation part 310' and the second heat radiation part 330', it is more preferable that the first heat radiation part 310' and the second heat radiation part 330' should be formed by using the insert injection process.

The second heat radiation part 330' may include an inner portion 331', the outer portion 335' and the connection portion 337. Also, the second heat radiation part 330' may include a first receiver 333' and the second receiver 330a.

The inner portion 331' has a shape corresponding to the shape of the first heat radiation part 310'. Specifically, the inner portion 331' has a cylindrical shape corresponding to the shape of the first heat radiation part 310' in order to be disposed in an inner empty space formed by the upper portion 311' and the lower portion 313'of the first heat radiation part 310'.

The outer portion 335' is disposed to enclose the inner portion 331'. Here, the outer portion 335' may have a shape corresponding to the external shape of the first heat radiation part 310'.

The outer portion 335' may have the top surface 335'-1 which is disposed on the same plane with the top surface of the upper portion 311' of the first heat radiation part 310'. The substrate 210 of the light source module 200 may be disposed on the top surface 335'-1.

The outer portion 335' may include a heat radiating fin 335'a. The heat radiating fin 335'a may protrude or extend outwardly from the outer surface of the outer portion 335'.

The first receiver 333' may have a shape corresponding to the shape of the first heat radiation part 310'. Specifically, the first receiver 333' may be a predetermined empty space corresponding to the shapes of the upper portion 311' and the lower portion 313' in such a manner as to receive the upper portion 311' and the lower portion 313' of the first heat radiation part 310'.

Third Embodiment

Figure 11:
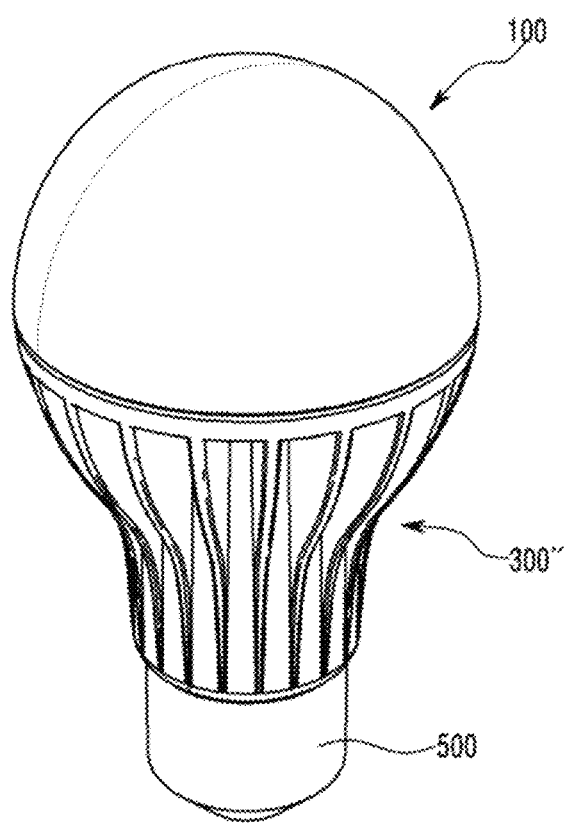
FIG. 11 is a perspective view of a lighting device according to a third embodiment.
Figure 12:
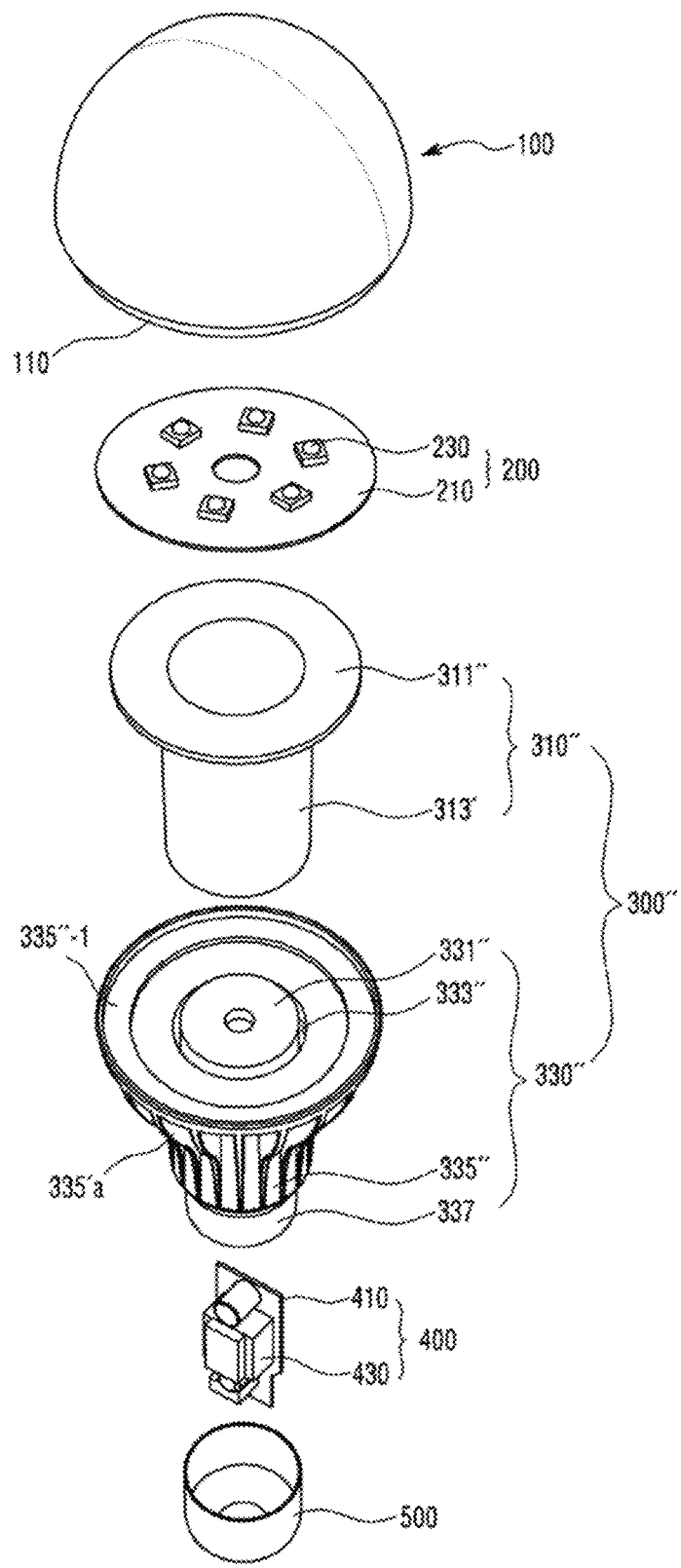
FIGS. 12 to 13 are exploded perspective views of the lighting device shown in FIG. 11.
Figure 13:
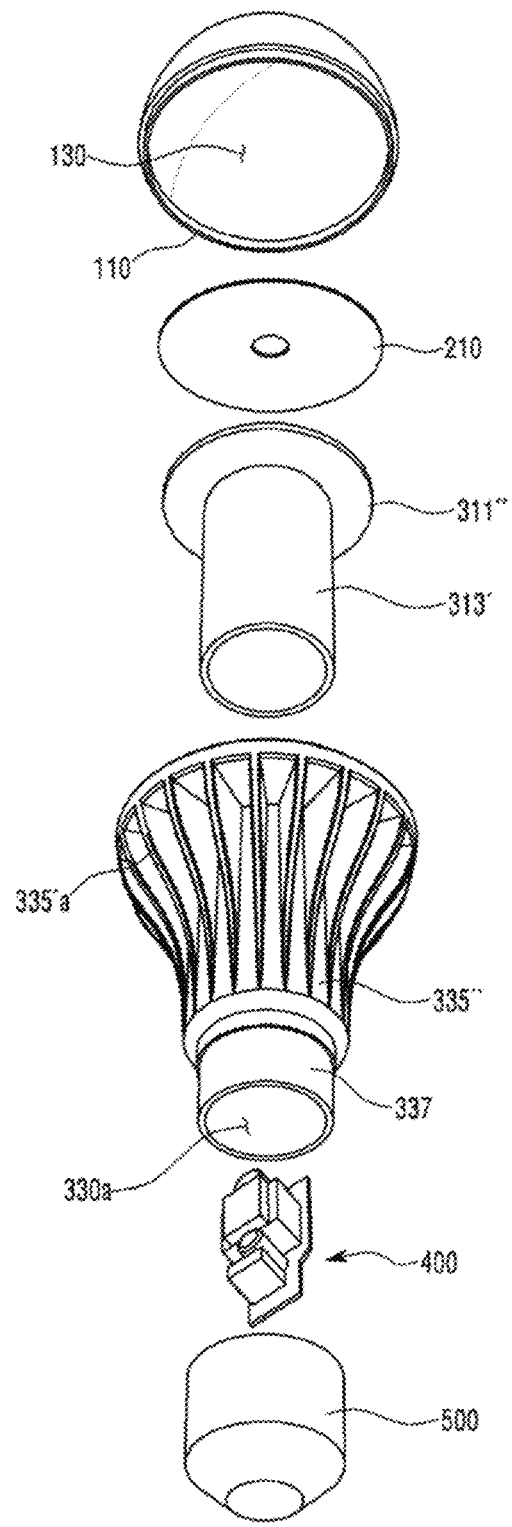
Figure 14:
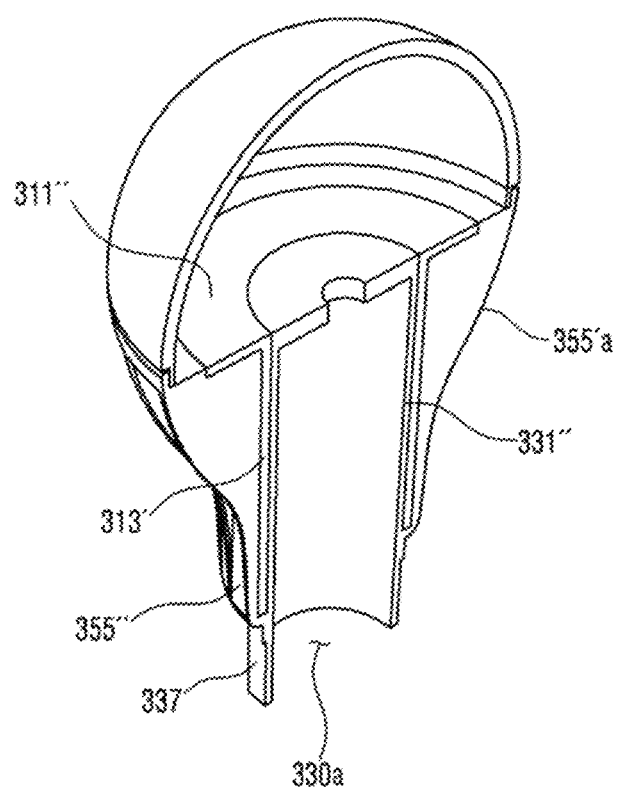
FIG. 14 is a sectional perspective view of a cover and a heat sink which are shown in FIG. 11.
Figure 15:
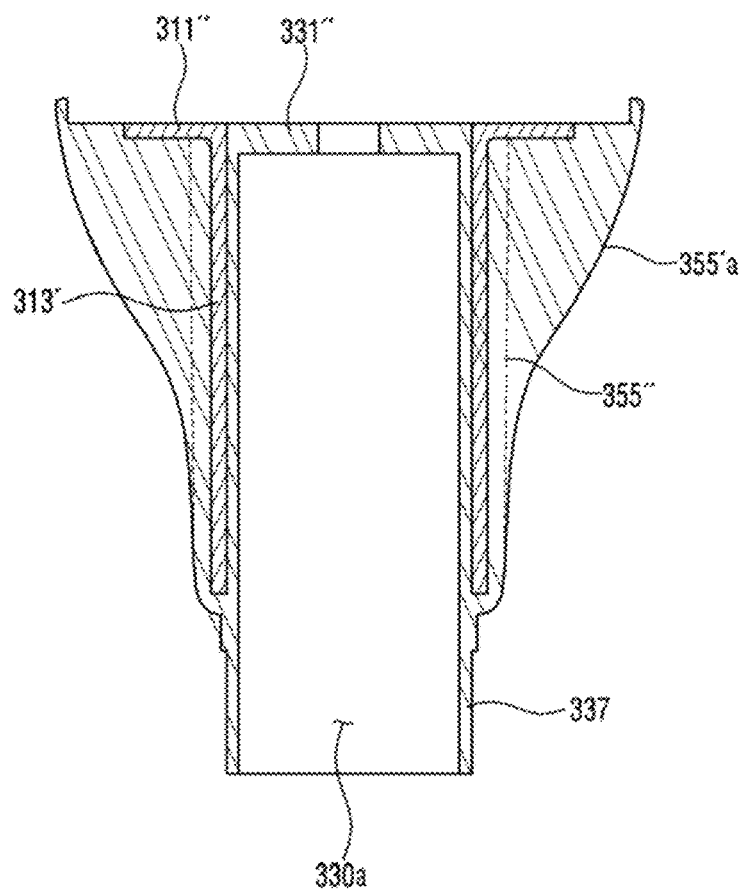
FIG. 15 is a cross sectional view of the heat sink shown in FIG. 11.

FIG. 11 is a perspective view of a lighting device according to a third embodiment. FIGS. 12 to 13 are exploded perspective views of the lighting device shown in FIG. 11. FIG. 14 is a sectional perspective view of a cover and a heat sink which are shown in FIG. 11. FIG. 15 is a cross sectional view of the heat sink shown in FIG. 11.

In the lighting device according to the third embodiment shown in FIGS. 11 to 15, the same reference numerals are assigned to the same components as those of the lighting devices according to the first to second embodiments shown in FIGS. 1 to 10. Therefore, in the lighting device according to the third embodiment shown in FIGS. 11 to 15, detailed descriptions of the same components as those of the lighting devices according to the first to second embodiments shown in FIGS. 1 to 10 will be replaced by the foregoing descriptions.

The substrate 210 may be disposed on a top surface of an upper portion 311" of a first heat radiation part 310" and on a top surface 335"-1 of an outer portion 335" of a second heat radiation part 330".

The light emitting devices 230 may be disposed on the substrate 210, in particular, on the top surface of the upper portion 311" of the first heat radiation part 310".

A heat sink 300" includes the first heat radiation part 310" and the second heat radiation part 330". Characteristics other than the shapes of the first heat radiation part 310" and the second heat radiation part 330" are the same as those of the first heat radiation part 310' and the second heat radiation part 330' shown in FIGS. 5 to 10.

The shape of the first heat radiation part 310" is different from that of the first heat radiation part 310' shown in FIGS. 5 to 10. Specifically, while the lower portion 313' of the first heat radiation part 310" has a shape the same as that of the lower portion 313' shown in FIGS. 5 to 10, the upper portion 311" has a shape different from that of the upper portion 311' shown in FIGS. 5 to 10.

The upper portion 311" is not disposed in a top opening of the lower portion 313'. Therefore, the entire top surface of an inner portion 331" of the second heat radiation part 330" is exposed through the top opening of the lower portion 313'.

The upper portion 311" is disposed on the top of the lower portion 313'. The upper portion 311" may extend outwardly from the top of the lower portion 313'. The upper portion 311" may have a ring shape. The diameter of the upper portion 311" is larger than that of the lower portion 313'. As a whole, the cross sections of the upper portion 311" and the lower portion 313' may have a "T" shape.

The second heat radiation part 330" may include the inner portion 331", the outer portion 335" and the connection portion 337. Also, the second heat radiation part 330" may have a first receiver 333" and the second receiver 330a.

The inner portion 331" may have a shape corresponding to that of the first heat radiation part 310". Specifically, the inner portion 331" may have a cylindrical shape corresponding to the shape of the first heat radiation part 310" in order to be disposed in an inner empty space formed by the lower portion 313' of the first heat radiation part 310".

The outer portion 335" is disposed to enclose the inner portion 331". Here, the outer portion 335" may have a shape corresponding to the external shape of the first heat radiation part 310".

The outer portion 335" may have the top surface 335"-1 which is disposed on the same plane with the top surface of the upper portion 311" of the first heat radiation part 310". The substrate 210 of the light source module 200 may be disposed on the top surface 335"-1.

The first receiver 333" may have a shape corresponding to the shape of the first heat radiation part 310". Specifically, the first receiver 333" may be a predetermined empty space corresponding to the shapes of the upper portion 311" and the lower portion 313' in such a manner as to receive the upper portion 311" and the lower portion 313' of the first heat radiation part 310".

The heat sink 300" including the upper portion 311" according to the third embodiment has a heat radiation performance better than that of the heat sink 300' including the upper portion 311' according to the second embodiment, because the upper portion 311" according to the third embodiment has a surface area greater than that of the heat sink 300' including the upper portion 311' according to the second embodiment, and has a structure allowing heat to be more easily emitted to the outside. Accordingly, it is recommended that the upper portion 311" according to the third embodiment should be used when the light source module 200 emits light of a high power.

Contrarily, the processing cost of the first heat radiation part 310' including the upper portion 311' according to the second embodiment is lower than that of the first heat radiation part 310" including the upper portion 311" according to the third embodiment, because the manufacturing process of the first heat radiation part 310' including the upper portion 311' according to the second embodiment is easier than that of the first heat radiation part 310" including the upper portion 311" according to the third embodiment, and the volume of the upper portion 311' according to the second embodiment is less than that of the upper portion 311" according to the third embodiment. Accordingly, it is recommended that the upper portion 311' according to the second embodiment should be used when the light source module 200 emits light of a low power.

Simulation Result

Figure 16:
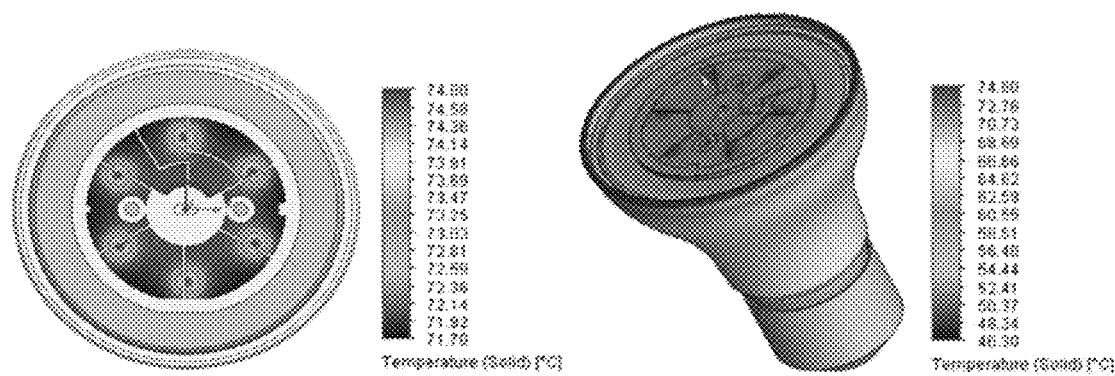

FIGS. 16 and 17 are simulation results showing a heat radiation performance of the lighting device according to the first embodiment shown in FIG. 1. FIG. 16 shows the result by using the power supply unit 400 shown in FIG. 2, and FIG. 17 shows the result without using the power supply unit 400 shown in FIG. 2.

In FIGS. 16 and 17, it is assumed that the maximum width of the heat sink is 57.4 mm and the height of the heat sink is 60 mm. It is also assumed that the thickness of the first heat radiation part is 1.5 T, the maximum width of the first heat radiation part 52.2 mm, and the height of the first heat radiation part is 39.5 mm.

In FIG. 16, a highest temperature (Tsolder max) measured at a solder of the light emitting device is approximately 74.8° C. In FIG. 17, a highest temperature (Tsolder max) measured at a solder of the light emitting device is 69.3° C.

According to the simulation results of FIGS. 16 and 17, since the Tsolder max of the lighting device according to the first embodiment shown in FIG. 1 is within a range of 70 to 80° C., the lighting device can meet an LM-80 test of Energy star.

FIGS. 18 and 19 are simulation results showing a heat radiation performance of the heat sink 300 with a fin in the lighting device according to the first embodiment shown in FIG. 1. FIG. 18 shows the result by using the power supply unit 400 shown in FIG. 2, and FIG. 19 shows the result without using the power supply unit 400 shown in FIG. 2.

In FIGS. 18 and 19, it is assumed that the maximum width of the heat sink is 57.4 mm and the height of the heat sink is 69.2 mm. It is also assumed that the thickness of the first heat radiation part is 1.5 T, the maximum width of the first heat radiation part 51.9 mm, and the height of the first heat radiation part is 45.9 mm.

In FIG. 18, a highest temperature (Tsolder max) measured at a solder of the light emitting device is approximately 72.2° C. In FIG. 19, a highest temperature (Tsolder max) measured at a solder of the light emitting device is 66.8° C.

According to the simulation results of FIGS. 18 and 19, it can be found that the heat radiation performance is more improved by adding the fins to the heat sink of the lighting device according to the first embodiment shown in FIG. 1. Also, since the Tsolder max of the lighting device is within a range of 70 to 80° C., the lighting device can meet the LM-80 test of Energy star.

Figure 20:
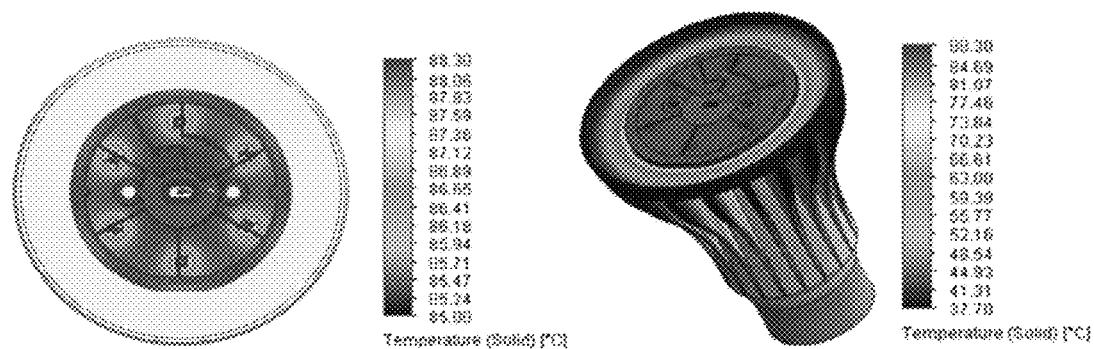
FIG. 20 is a simulation result showing a heat radiation performance of the lighting device according to the second embodiment shown in FIG. 6.
Figure 21:
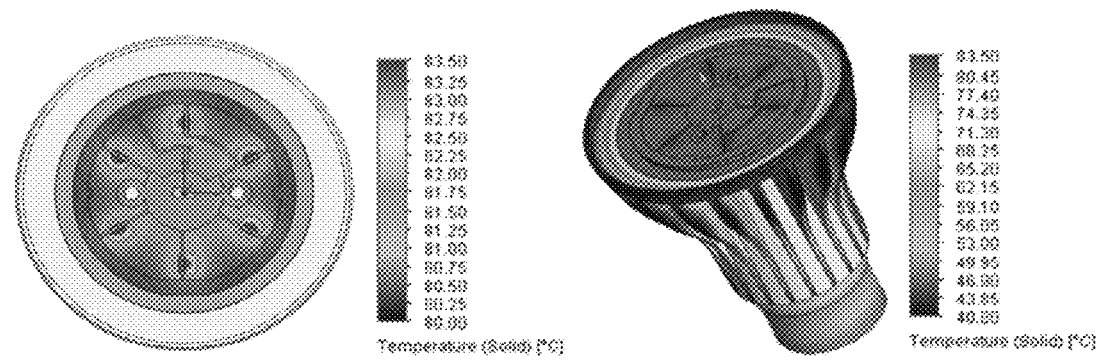
FIG. 21 is a simulation result showing a heat radiation performance of the lighting device according to the third embodiment shown in FIG. 11.

FIG. 20 is a simulation result showing a heat radiation performance of the lighting device according to the second embodiment shown in FIG. 6. FIG. 21 is a simulation result showing a heat radiation performance of the lighting device according to the third embodiment shown in FIG. 11.

In FIG. 20, it is assumed that the maximum width of the heat sink is 57.4 mm and the height of the heat sink is 66 mm. It is also assumed that the thickness of the first heat radiation part is 1.5 T, the maximum width of the first heat radiation part 27 mm, and the height of the first heat radiation part is 46 mm. In FIG. 21, it is assumed that the maximum width of the heat sink is 57.4 mm and the height of the heat sink is 66 mm. It is also assumed that the thickness of the first heat radiation part is 1.5 T, the maximum width of the first heat radiation part 44 mm, and the height of the first heat radiation part is 46 mm.

In FIG. 20, a highest temperature (Tsolder max) measured at a solder of the light emitting device is approximately 88.3° C. In FIG. 21, a highest temperature (Tsolder max) measured at a solder of the light emitting device is 83.3° C.

Referring to FIGS. 20 and 21, a heat radiation performance of the lighting devices of the second and third embodiments can be improved by changing the sizes of the first heat radiation parts 310' and 310" and by optimizing the fin structures of the heat sinks 300' and 300".

Fourth Embodiment

Figure 22:
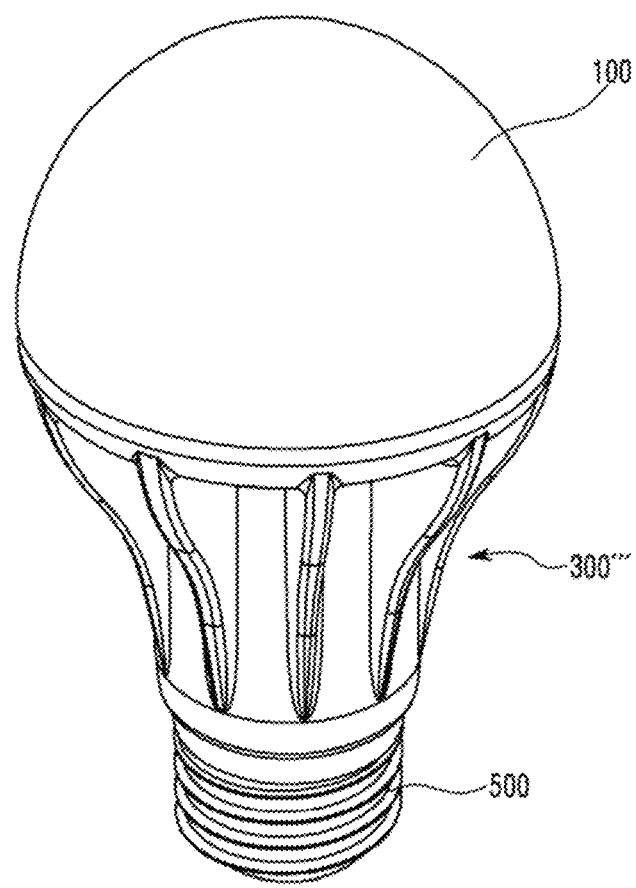
FIG. 22 is a perspective view of a lighting device according to a fourth embodiment.
Figure 23:
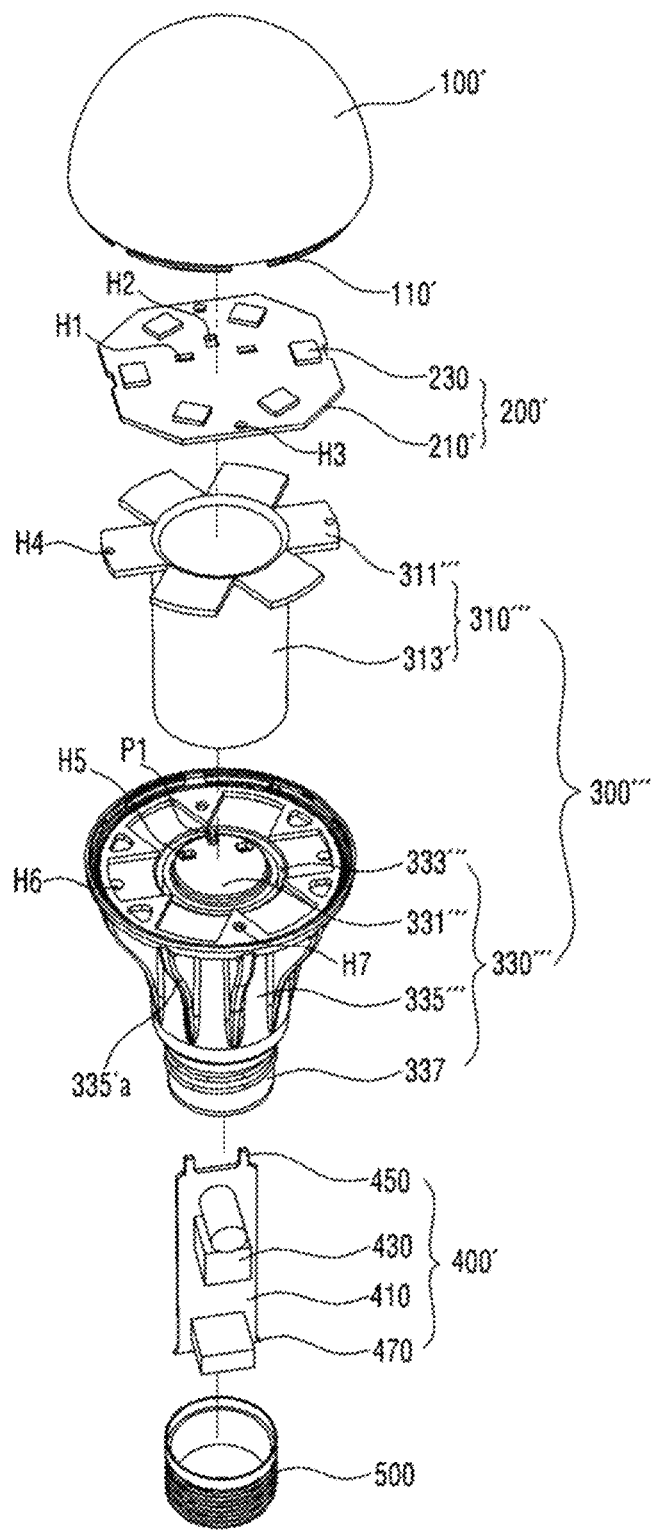
FIGS. 23 to 24 are exploded perspective views of the lighting device shown in FIG. 22.
Figure 24:
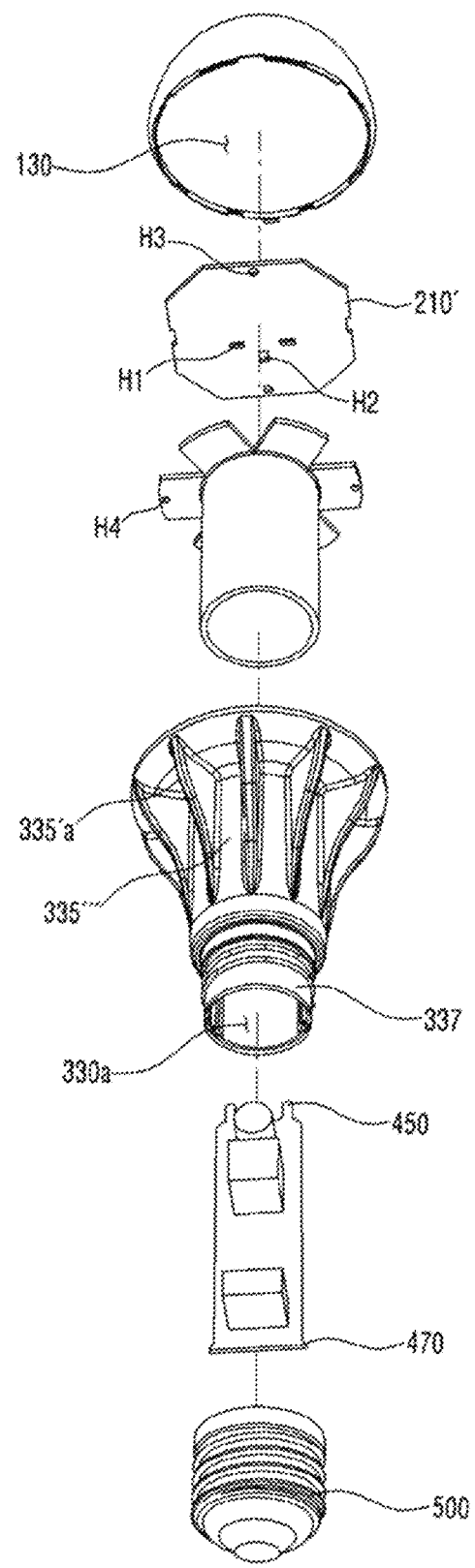
Figure 25:
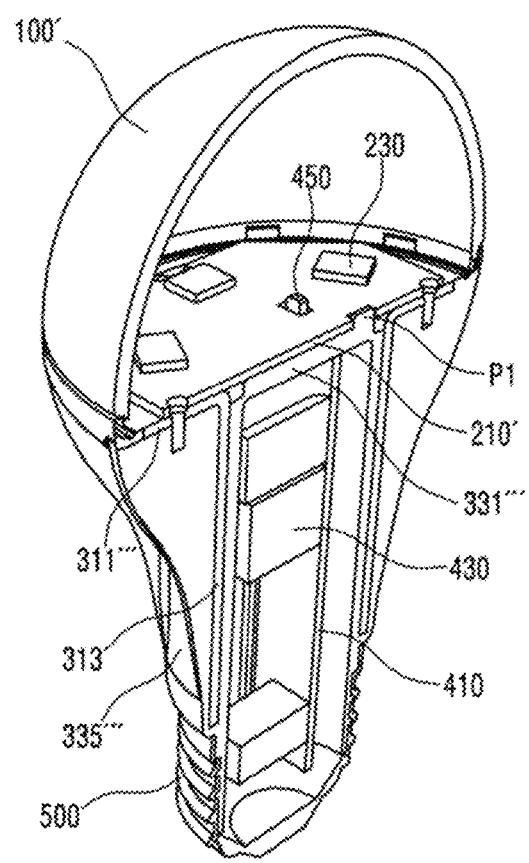
FIG. 25 is a sectional perspective view of the lighting device shown in FIG. 22.

FIG. 22 is a perspective view of a lighting device according to a fourth embodiment. FIGS. 23 to 24 are exploded perspective views of the lighting device shown in FIG. 22. FIG. 25 is a sectional perspective view of the lighting device shown in FIG. 22.

In the lighting device according to the fourth embodiment shown in FIGS. 22 to 25, the same reference numerals are assigned to the same components as those of the lighting devices according to the first to third embodiments shown in FIGS. 1 to 15. Therefore, in the lighting device according to the fourth embodiment shown in FIGS. 22 to 25, detailed descriptions of the same components as those of the lighting devices according to the first to third embodiments shown in FIGS. 1 to 15 will be replaced by the foregoing descriptions.

A cover 100' is coupled to a heat sink 300'''. Specifically, the cover 100' may be coupled to a second heat radiation part 330''' of the heat sink 300'''.

The cover 100' may include a coupling portion 110'. The coupling portion 110' may be coupled to the heat sink 300'. Specifically, the coupling portion 110' protrudes from an end of the cover 100', which forms the opening 130. A plurality of the coupling portions 110' are provided. The plurality of the coupling portions 110' may be spaced apart from each other at a predetermined interval instead of being connected to each other. When the plurality of the coupling portions 110' are spaced apart from each other at a predetermined interval, it is possible to prevent the coupling portions 110' from being damaged due to a force (a horizontal pressure or tension) generated at the time of inserting and fixing the coupling portion 110' to the heat sink 300'''.

A substrate 210' of a light source module 200' is disposed on an inner portion 331''' of the second heat radiation part 330''', on an upper portion 311''' of a first heat radiation part 310''', and on an outer portion 335''' of the second heat radiation part 330'''.

The substrate 210' may have a first hole H1 allowing the substrate 210' to be coupled to a power supply unit 400'. Specifically, this will be described with reference to FIGS. 26 to 28.

Figure 26:
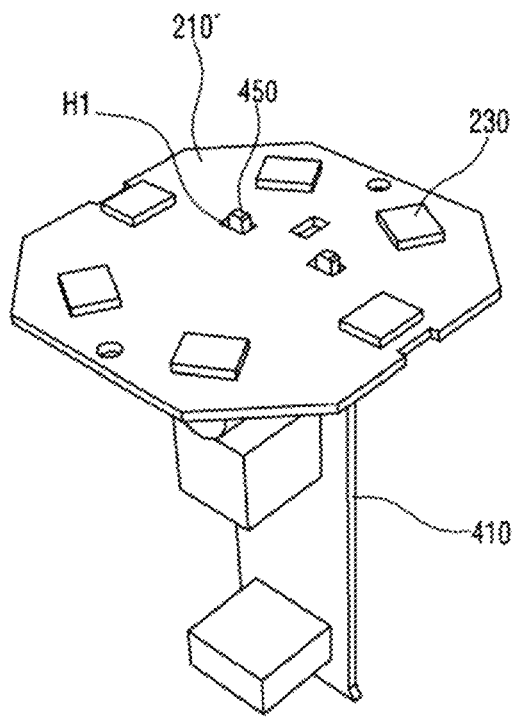
FIG. 26 is a perspective view showing a state where a light source module 200' and a power supply unit 400', which are shown in FIG. 23, have been coupled to each other.
Figure 27:
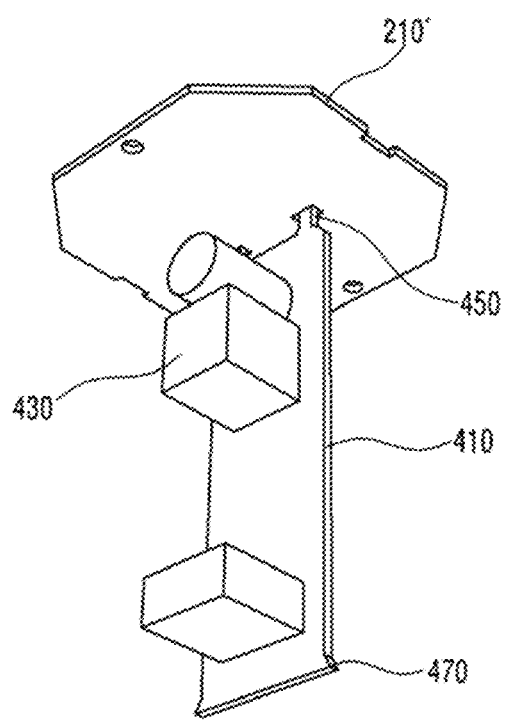
FIG. 27 is a perspective view showing a state where the light source module 200' and the power supply unit 400', which are shown in FIG. 24, have been coupled to each other.
Figure 28:
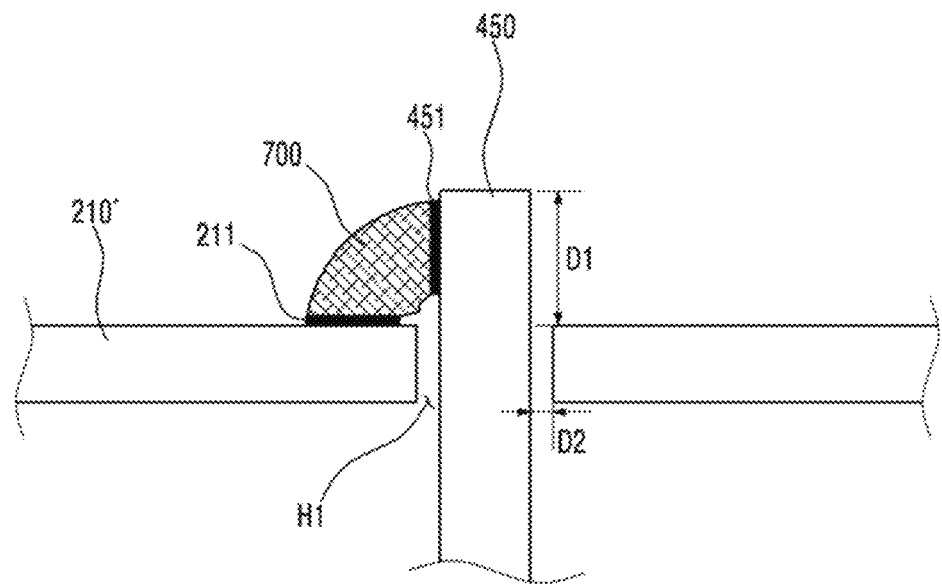
FIG. 28 is a conceptual diagram for describing an electrical connection between a substrate 210' and an extended substrate 450 which are shown in FIGS. 23 and 24.

FIG. 26 is a perspective view showing a state where the light source module 200' and the power supply unit 400', which are shown in FIG. 23, have been coupled to each other. FIG. 27 is a perspective view showing a state where the light source module 200' and the power supply unit 400', which are shown in FIG. 24, have been coupled to each other. FIG. 28 is a conceptual diagram for describing an electrical connection between the substrate 210' and an extended substrate 450 which are shown in FIGS. 23 and 24.

Referring to FIGS. 22 to 28, the substrate 210' has the first hole H1. The extended substrate 450 of the power supply unit 400' is disposed in the first hole H1.

A height D1 from the top surface of the substrate 210' to the end of the extended substrate 450 which has passed through the first hole H1 of the substrate 210', that is to say, a length D1 of a portion of the extended substrate 450, which has passed through the first hole H1 of the substrate 210' may be from 1.5 mm to 2.0 mm. If the D1 is less than 1.5 mm, it is difficult to electrically connect the substrate 210' and the extended substrate 450, so that poor contact may occur between the substrate 210' and the extended substrate 450. Specifically, the electrical connection between the substrate 210' and the extended substrate 450 can be performed by soldering. For the sake of the soldering process, a terminal 211 of the substrate 210' and a terminal 451 of the extended substrate 450 are required to contact with a soldering portion 700. If the D1 is less than 1.5 mm, it is difficult for the terminal 451 of the extended substrate 450 to sufficiently contact with the soldering portion 700. In this case, the poor contact may occur between the substrate 210' and the extended substrate 450. On the other hand, if the D1 is greater than 2.0 mm, a dark portion may be generated at the time of driving the light source module 200. Specifically, the dark portion may be generated in the substrate 210' in the vicinity of the extended substrate 450. The dark portion may degrade an optical efficiency of the lighting device and give an unpleasant appearance to users. Therefore, it is recommended that the D1 should be from 1.5 mm to 2.0 mm.

The shape of the first hole H1 may correspond to the shape of the extended substrate 450. The diameter of the first hole H1 may be larger than the diameter of the extended substrate 450. That is, the size of the first hole H1 may be so large that the extended substrate 450 is inserted into the first hole H1. Therefore, the extended substrate 450 inserted into the first hole H1 may not contact with the substrate 210'. In the first hole H1, an interval D2 between the substrate 210' and the extended substrate 450 may be greater than 0 and equal to or less than 0.2 mm. If the D2 is 0, the it may be difficult to insert the extended substrate 450 into the first hole H1 of the substrate 210', and an unintended electrical short-circuit may occur between the extended substrate 450 and the substrate 210'. On the other hand, if the D2 is greater than 0.2 mm, soldering materials may pass through the first hole H1 and flow down to the support plate 410 while performing the soldering process. In this case, a printed circuit formed in the support plate 410 may be electrically short-circuited by the soldering materials, and it may be difficult to accurately place the extended substrate 450 at a point where the extended substrate 450 is expected to be disposed in the first hole H1. Therefore, it is recommended that the D2 should be greater than 0 and equal to or less than 0.2 mm.

Referring back to FIGS. 22 to 25, the substrate 210' may have a second hole H2 for identifying the exact location of the substrate 210' at the time of mounting the substrate 210' in the heat sink 300'''. A protrusion P1 of the heat sink 300''' is disposed in the second hole H2. The protrusion P1 is disposed on the top surface of the inner portion 331''' of the heat sink 300'''. The protrusion P1 is able to guide the location of the substrate 210' in the heat sink 300'''.

The substrate 210' may have a third hole H3 for fixing the substrate 210' to the heat sink 300'''. A coupling means like a rivet, a screw or the like, passes through the third hole H3 of the substrate 210' and is inserted into a seventh hole H7 of the heat sink 300''', thereby fixing the substrate 210' to the heat sink 300'''.

The heat sink 300''' includes the first heat radiation part 310''' and the second heat radiation part 330'''. Characteristics other than the shapes of the first heat radiation part 310''' and the second heat radiation part 330''' are the same as those of the first heat radiation part 310'' and the second heat radiation part 330'' shown in FIGS. 11 to 15.

Figure 29:
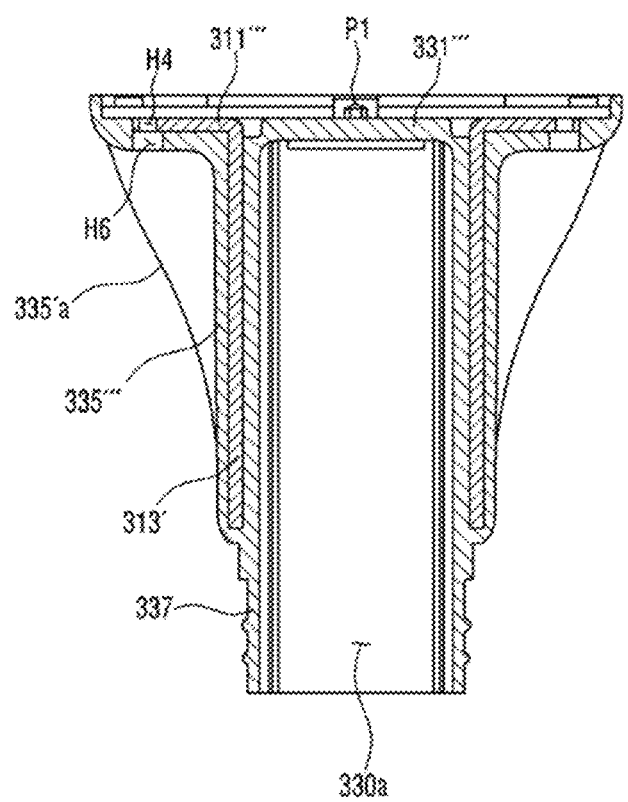
FIG. 29 is a cross sectional view of the heat sink shown in FIGS. 22 to 25.

FIG. 29 is a cross sectional view of the heat sink shown in FIGS. 22 to 25.

Referring to FIGS. 22 to 25 and 29, the shape of the first heat radiation part 310''' is different from that of the first heat radiation part 310'' shown in FIGS. 11 to 15. Specifically, the upper portion 311''' of the first heat radiation part 310''' may be comprised of a plurality of flat plates.

The upper portion 311''' may extend from the top of the lower portion 313' in such a manner as to form a predetermined angle with the longitudinal direction of the lower portion. Here, the angle between the upper portion 311''' and the lower portion 313' may be a right angle, an acute angle or an obtuse angle.

A plurality of the upper portions 311''' may be provided. Specifically, the number of the upper portions 311''' may be the same as the number of the light emitting devices 230. That is, one light emitting device 230 may be disposed on the one upper portion 311'''. Here, the number of the upper portions 311''' may not correspond to the number of the light emitting devices 230. For example, the number of the upper portions 311''' may be greater or less than the number of the light emitting devices 230.

A fourth hole H4 for fixing the first heat radiation part 310''' to the second heat radiation part 330''' may be formed in at least two of the plurality of the upper portions 311'''. The fourth hole H4, together with a sixth hole H6 of the second heat radiation part 330''', is a component required for manufacturing the heat sink 300'''. Hereafter, this will be described with reference to FIGS. 30 to 32.

Figure 30:
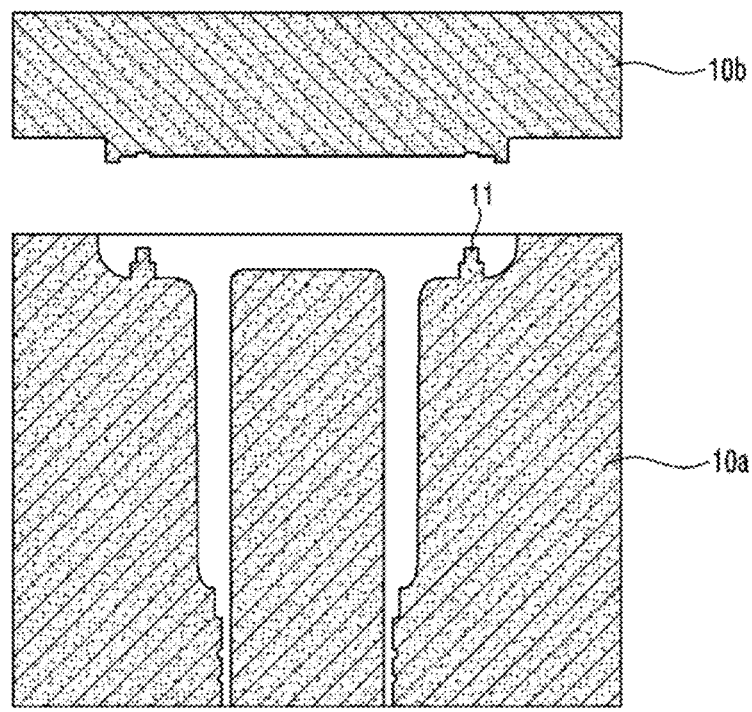
FIGS. 30 to 32 are views for describing a method for manufacturing the heat sink shown in FIG. 29.
Figure 31:
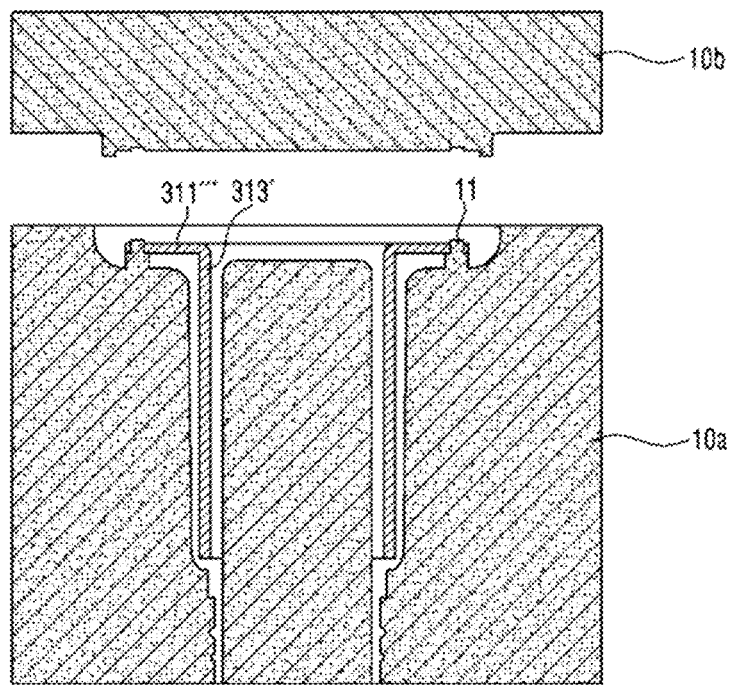
Figure 32:
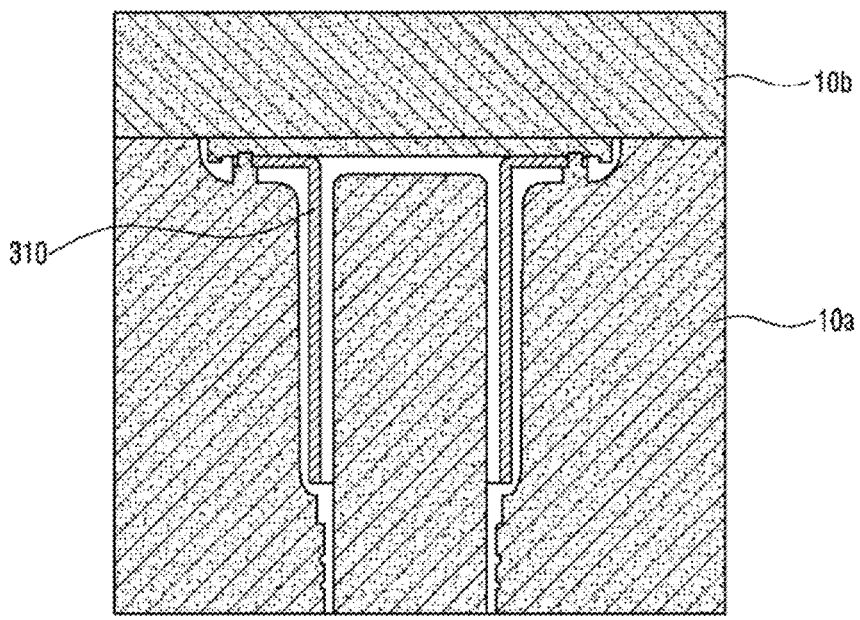

FIGS. 30 to 32 are views for describing a method for manufacturing the heat sink shown in FIG. 29.

The heat sink 300''' shown in FIG. 29 may be manufactured through the insert injection process. Specifically, first, as shown in FIG. 30, a first mold 10a and a second mold 10b are provided. The first mold 10a and the second mold 10b provide a frame for manufacturing the appearance of the heat sink 300' shown in FIG. 23 and the second receiver 330a of the heat sink 300 shown in FIG. 24. Here, a fixing pin 11 is disposed within the first mold 10a.

Specifically, the fixing pin 11 includes an upper portion which is disposed in the fourth hole H4 of the first heat radiation part 310''' and includes a lower portion which forms the sixth hole H6 of the second heat radiation part 330'''. The width of the upper portion of the fixing pin 11 is less than the width of the lower portion of the fixing pin 11. That is, a level difference is formed between the upper portion and the lower portion of the fixing pin 11. Since the width the upper portion of the fixing pin 11 is less than the width of the lower portion of the fixing pin 11, when the upper portion of the fixing pin 11 is inserted into the fourth hole H4 of the first heat radiation part 310''', the upper portion 311''' of the first heat radiation part 310''' is supported on the lower portion of the fixing pin 11. Therefore, as shown in FIG. 31, the upper portion 311''' and the lower portion 313' of the first heat radiation part 310''' may be disposed within the first mold 10a. Also, since the width the upper portion of the fixing pin 11 is less than the width of the lower portion of the fixing pin 11, consequently, the diameter of the fourth hole H4 of the first heat radiation part 310''' is less than the diameter of the sixth hole H6 of the second heat radiation part 330'''. The fact that the diameter of the fourth hole H4 of the first heat radiation part 310''' is less than the diameter of the sixth hole H6 of the second heat radiation part 330''' may be one of methods for identifying that the first heat radiation part 310''' and the second heat radiation part 330''' have been manufactured through the insert injection process.

Next, as shown in FIG. 32, the first mold 10a and the second mold 10b become in contact with each other by moving the second mold 10b toward the first mold 10a. Then, though not shown in the drawings, a liquefied material constituting the second heat radiation part 330''' shown in FIG. 23, for example, a liquefied resin, is injected through an inlet (not shown) formed in one of the first mold 10a and the second mold 10b. The liquefied resin fills inner empty spaces of the first mold 10a and the second mold 10b, and then a predetermined time is elapsed. As a result, the liquefied resin is cured. The cured resin corresponds to the second heat radiation part 330''' shown in FIGS. 23, 24 and 29.

Lastly, the second heat radiation part 330''' cured together with the first heat radiation part 310''' is separated from the first mold 10a and the second mold 10b. Through this process, the heat sink 300''' including the integrally formed first and second heat radiation parts 310''' and 330''' shown in FIGS. 22 to 25 and 29 may be obtained, and the second heat radiation part having the sixth hole H6 formed therein may be obtained.

Figure 33:
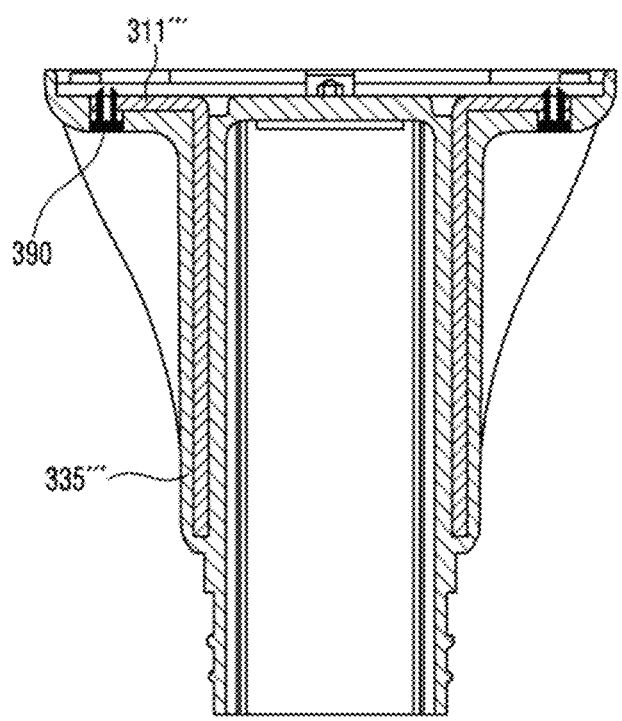
FIG. 33 is a cross sectional view showing a state where a cap 390 has been installed in a fourth hole H4 and a sixth hole H6 of the heat sink shown in FIG. 29.

FIG. 33 is a cross sectional view showing a state where a cap 390 has been installed in the fourth hole H4 and the sixth hole H6 of the heat sink shown in FIG. 29.

Referring to FIGS. 29 and 33, the cap 390 is disposed in the fourth hole H4 of the upper portion 311''' of the first heat radiation part and in the sixth hole H6 of the outer portion 335''' of the second heat radiation part. Specifically, after the cap 390 is inserted into the fourth hole H4 and the sixth hole H6, and then may be bonded. As such, due to the disposition of the cap 390 in the fourth hole H4 and the sixth hole H6, it is possible to prevent water and impurities from being introduced into the inside of the lighting device according to the embodiment through the fourth hole H4 and the sixth hole H6 of the heat sink. The water and impurities which are introduced through the fourth hole H4 and the sixth hole H6 of the heat sink cause a gap between the first heat radiation part and the second heat radiation part. As a result, the first heat radiation part and the second heat radiation part may be separated from each other, and the light source module 200' shown in FIG. 23 may be damaged or broken.

The cap 390 may include a first cap part disposed in the sixth hole H6 and a second cap part disposed in the fourth hole H4. The first cap part has a shape corresponding to that of the sixth hole H6, and thereby blocking the sixth hole H6. The second cap part has a shape capable of fixing the cap 930 which has been inserted into the fourth hole H4 and the sixth hole H6. For example, the second cap part may have a hook structure which passes through the fourth hold H4 and then is disposed on the top surface of the upper portion 311'''. Also, the second cap part may have the two hook structures. The two hook structures may have a predetermined elasticity causing them to be farther away from each other.

The cap 390 may be made of rubber or plastic.

In order to flintily fix the cap 390 to the fourth hole H4 and the sixth hole H6 of the heat sink, a predetermined adhesive material (not shown) is applied to the fourth hole H4 and the sixth hole H6, and then the cap 390 is inserted and fixed into the fourth hole H4 and the sixth hole H6 of the heat sink.

Referring again to FIGS. 22 to 25 and 29, the plurality of the upper portions 311''' may be disposed on the outer portion 335''' of the second heat radiation part 330'''. Specifically, the upper portions 311''' may be disposed on the top surface of the outer portion 335''' of the second heat radiation part 330'''.

The total surface area of the plurality of the upper portions 311''' may be equal to or greater than the surface area of the lower portion 313'. Specifically, the total surface area of the plurality of the upper portions 311''' may be equal to or greater than 1 time and equal to or less than 2 times the surface area of the lower portion 313'. If the total surface area of the plurality of the upper portions 311''' is less than 1 time the surface area of the lower portion 313', a heat transfer efficiency may be deteriorated because the total surface area of the upper portions 311''' which directly receives from the light source module 200' is less than the surface area of the lower portion 313'. Meanwhile, if the total surface area of the plurality of the upper portions 311''' is greater than 2 times the surface area of the lower portion 313', most of the heat is gathered in the upper portion 311''', so that a heat radiation efficiency may be deteriorated.

The first heat radiation part 310''', that is to say, the upper portion 311''' and the lower portion 313' may be manufactured by the following method. A cylindrical aluminum (Al) pipe is provided and is cut by a designer's favorite length. One end of the cut aluminum pipe is cut by a predetermined length toward the other end in the longitudinal direction of the aluminum pipe. The cutting process is repeated as many as the number of the upper portions 311'''. Finally, the cut portions of the aluminum pipe are bent outwardly. As a result, the first heat radiation part 310''' is completed.

The first heat radiation part 310''' is disposed within the second heat radiation part 330'''. Specifically, The second heat radiation part 330''' may have a first receiver 333''' receiving the first heat radiation part 310'''. The first receiver 333''' may be an empty space having a shape corresponding to the shape of the first heat radiation part 310'''.

The second heat radiation part 330''' may include the inner portion 331''', the outer portion 335''', and the connection portion 337. Also, the second heat radiation part 330''' may have the first receiver 333''' and the second receiver 330a.

The inner portion 331''' has a shape corresponding to that of the first heat radiation part 310'''. Specifically, the inner portion 331''' has a cylindrical shape corresponding to the shape of the first heat radiation part 310''' in order to be disposed in an inner empty space formed by the upper portion 311''' and the lower portion 313' of the first heat radiation part 310'''.

The inner portion 331''' may have a fifth hole H5 through which the extended substrate 450 of the power supply unit 400' disposed in the second receiver 330a passes.

The protrusion P1 which is inserted into the second hole H2 of the substrate 210' may be disposed on the top surface of the inner portion 331'''.

The outer portion 335''' is disposed to enclose the inner portion 331'''. Here, the outer portion 335''' may have a shape corresponding to the external shape of the first heat radiation part 310'''.

The upper portion 311''' of the first heat radiation part 310''', and the substrate 210' and the light emitting device 230 of the light source module 200' are sequentially disposed on the outer portion 335'''.

The outer portion 335''' may have the sixth hole H6 for fixing the upper portion 311''' of the first heat radiation part 310''', and the seventh hole H7 for fixing the substrate 210' of the light source module 200'.

The connection portion 337 is coupled to the power supply unit 400', and thereby firmly fixing the power supply unit 400' within the second receiver 330a. Hereafter, this will be described with reference to FIG. 34.

Figure 34:
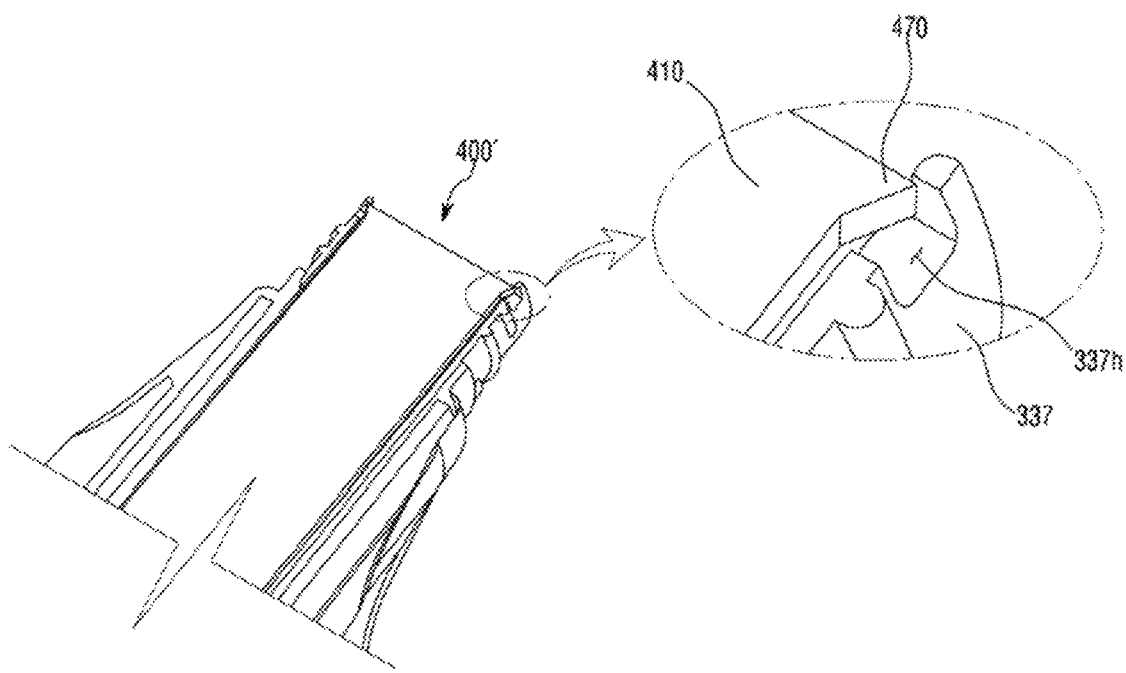
FIG. 34 is a view for describing a coupling structure between a connection portion 337 and the power supply unit 400'.

FIG. 34 is a view for describing a coupling structure between the connection portion 337 and the power supply unit 400'.

Referring to FIG. 34, the connection portion 337 has a coupling recess 337h. The coupling recess 337h has a predetermined diameter allowing a protrusion 470 of the support plate 410 to be inserted into the coupling recess 337h. The protrusion 470 may be formed in accordance with the number of the protrusions 470 of the support plate 410.

The support plate 410 of the power supply unit 400' has the protrusion 470 which is coupled to the coupling recess 337h of the connection portion 337. The protrusion 470 may extend outwardly from both corners of the lower portion of the support plate 410. The protrusion 470 has a shape in such manner that it is easy for the support plate 410 to be received in the second receiver 330a and it is hard for the support plate 410 to come out of the second receiver 330a. For example, the protrusion 470 may have a hook shape.

When the protrusion 470 of the support plate 410 is coupled to the coupling recess 337h of the connection portion 337, it is hard for the support plate 410 to come out of the second receiver 330a, thereby firmly fixing the support plate 410 within the second receiver 330a. Therefore, a separate additional process, for example, a molding process of the power supply unit 400' is not required, so that the manufacturing cost of the lighting device can be reduced.

Referring back to FIGS. 23 to 25 and 29, the first receiver 333''' may have a predetermined depth as much as the length of the lower portion 313' of the first heat radiation part 310'''. Here, the first receiver 333''' does not completely separate the inner portion 331''' and the outer portion 335'''. That is, it is intended that the first receiver 333''' is not formed between the lower portion of the inner portion 331''' and the lower portion of the outer portion 335''', so that the inner portion 331''' and the outer portion 335''' may be connected to each other.

The support plate 410 of the power supply unit 400' may have a quadrangular plate shape. The support plate 410 is received in the second receiver 330a of the second heat radiation part 330'''. Specifically, this will be described with reference to FIGS. 35 to 36.

Figure 35:
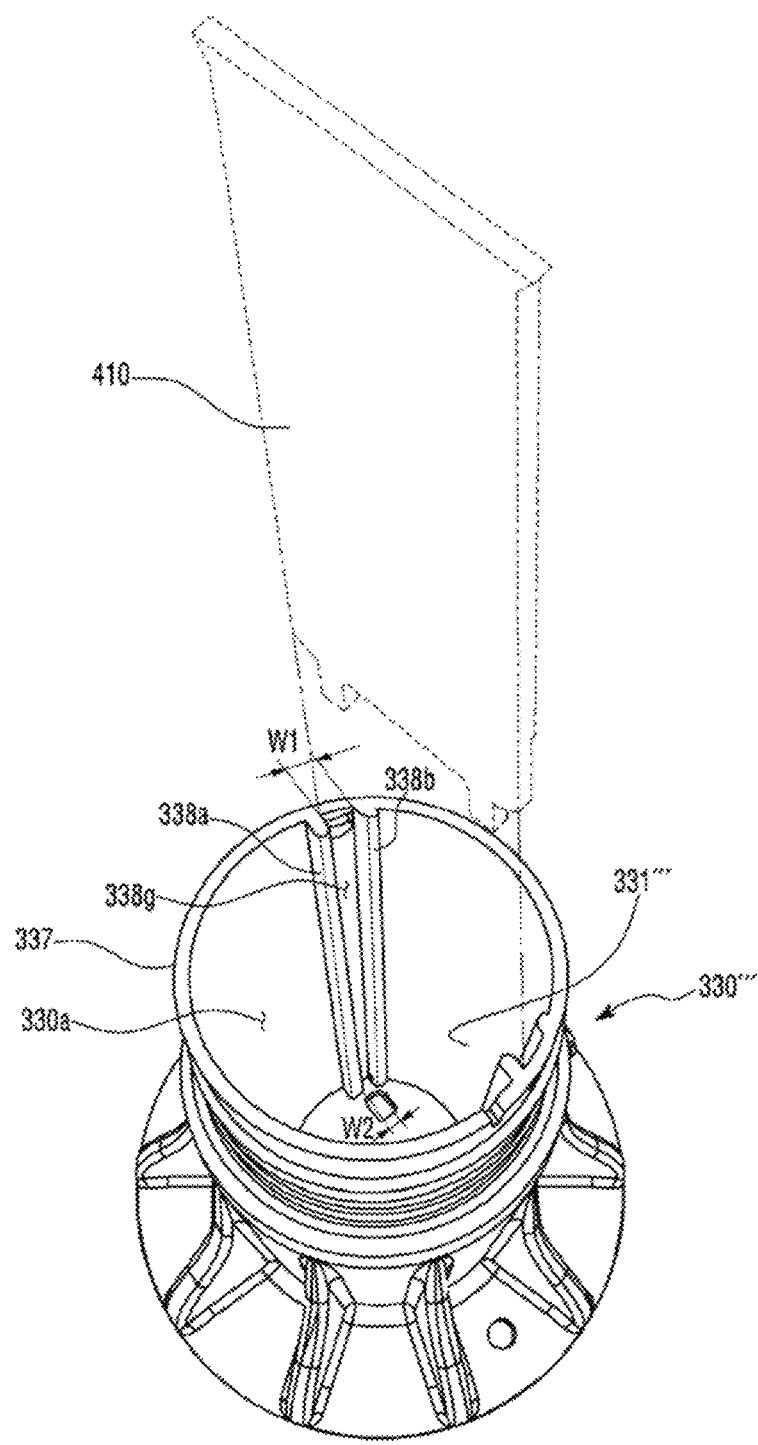
FIGS. 35 to 36 are views for describing a coupling structure between a support plate 410 and a heat sink 300'"
Figure 36:
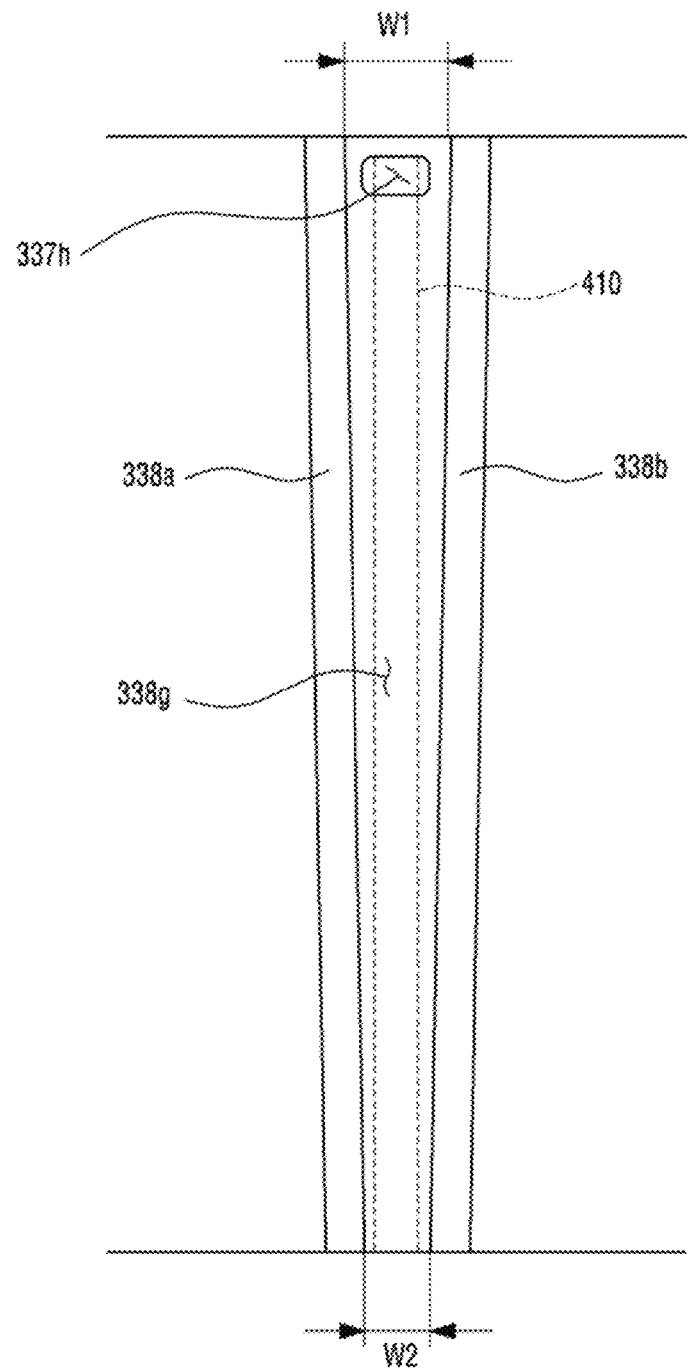

FIGS. 35 to 36 are views for describing a coupling structure between the support plate 410 and the heat sink 300'''.

Referring to FIGS. 35 to 36, the second heat radiation part 330''' may include a first and a second guides 338a and 338b which guide both sides of one edge of the support plate 410 respectively. The first and second guides 338a and 338b are disposed within the second receiver 330a of the heat sink 300'''. The first and second guides 338a and 338b have a predetermined length toward the bottom surface of the second receiver 330a from the entrance of the second receiver 330a. The first and second guides 338a and 338b may protrude upwardly from the inner surface of the second heat radiation part 330''' which forms the second receiver 330a. A guide recess 338g into which one side of the support plate 410 is inserted may be formed between the first guide 338a and the second guide 338b.

An interval between the first guide 338a and the second guide 338b may be reduced toward the inside of the second receiver 330a (W1>W2). In other words, a diameter of the guide recess 338g may be reduced toward the inside of the second receiver 330a (W1>W2). As such, when the interval between the first guide 338a and the second guide 338b or the diameter of the guide recess 338g is reduced toward the inside of the second receiver 330a (W1>W2), a process of inserting the support plate 410 into the second receiver 330a becomes easier, and the support plate 410 can be accurately coupled to the inside of the heat sink 300'''.

In the entrance of the second receiver 330a, for the purpose of allowing the support plate 410 to be easily inserted into the second receiver 330a, it is recommended that the interval W1 between the first guide 338a and the second guide 338b should be greater than a value obtained by adding 1 mm to the thickness of the support plate 410. In other words, it is recommended that an interval between the first guide 338a and one surface of the support plate 410 should be greater than 0.5 mm.

In the bottom surface of the second receiver 330a, for the purpose of accurately disposing the support plate 410 at a designed position, it is recommended that the interval W2 between the first guide 338a and the second guide 338b should be greater than the thickness of the support plate 410 and less than a value obtained by adding 0.1 mm to the thickness of the support plate 410. In other words, it is recommended that the interval between the first guide 338a and one surface of the support plate 410 should be greater than 0.05 mm.

The coupling recess 337h into which the protrusion 470 of the support plate 410 is inserted is formed between the first guide 338a and the second guide 338b. Since the coupling recess 337h is formed between the first guide 338a and the second guide 338b, the support plate 410 can be disposed at a more accurate position and prevented from being separated.

The support plate 410 may include the extended substrate 450. The extended substrate 450 extends outwardly from the top of the support plate 410. The extended substrate 450 passes through the fifth hole H5 of the heat sink 300''' and the first hole H1 of the substrate 210', and then is electrically connected to the substrate 210' through the soldering process.

The support plate 410 may include the protrusion 470. The protrusion 470 extends outwardly from both corners of the lower portion of the support plate 410. The protrusion 470 is coupled to the connection portion 337.

Fifth Embodiment

Figure 37:
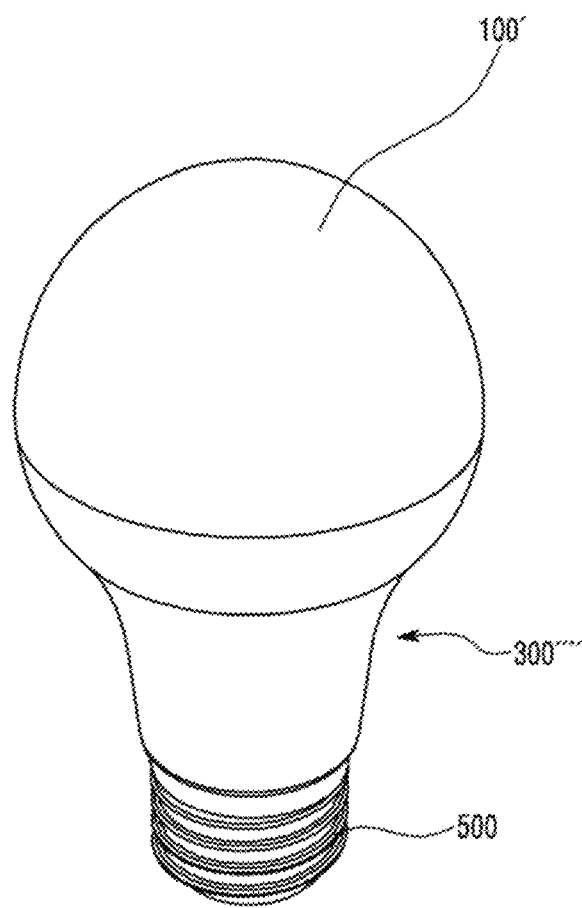
FIG. 37 is a top perspective view of a lighting device according to a fifth embodiment.
Figure 38:
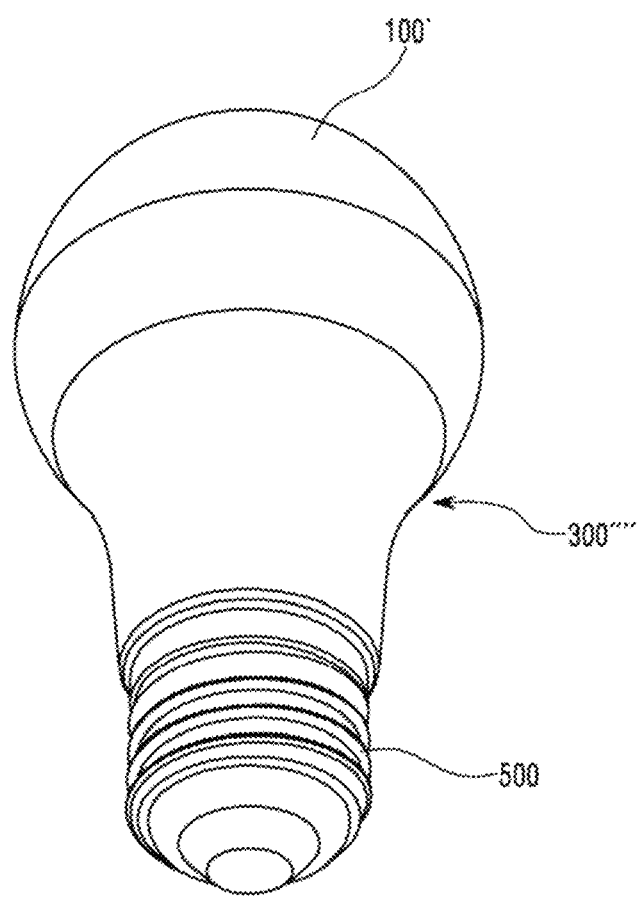
FIG. 38 is a bottom perspective view of the lighting device shown in FIG. 37.
Figure 39:
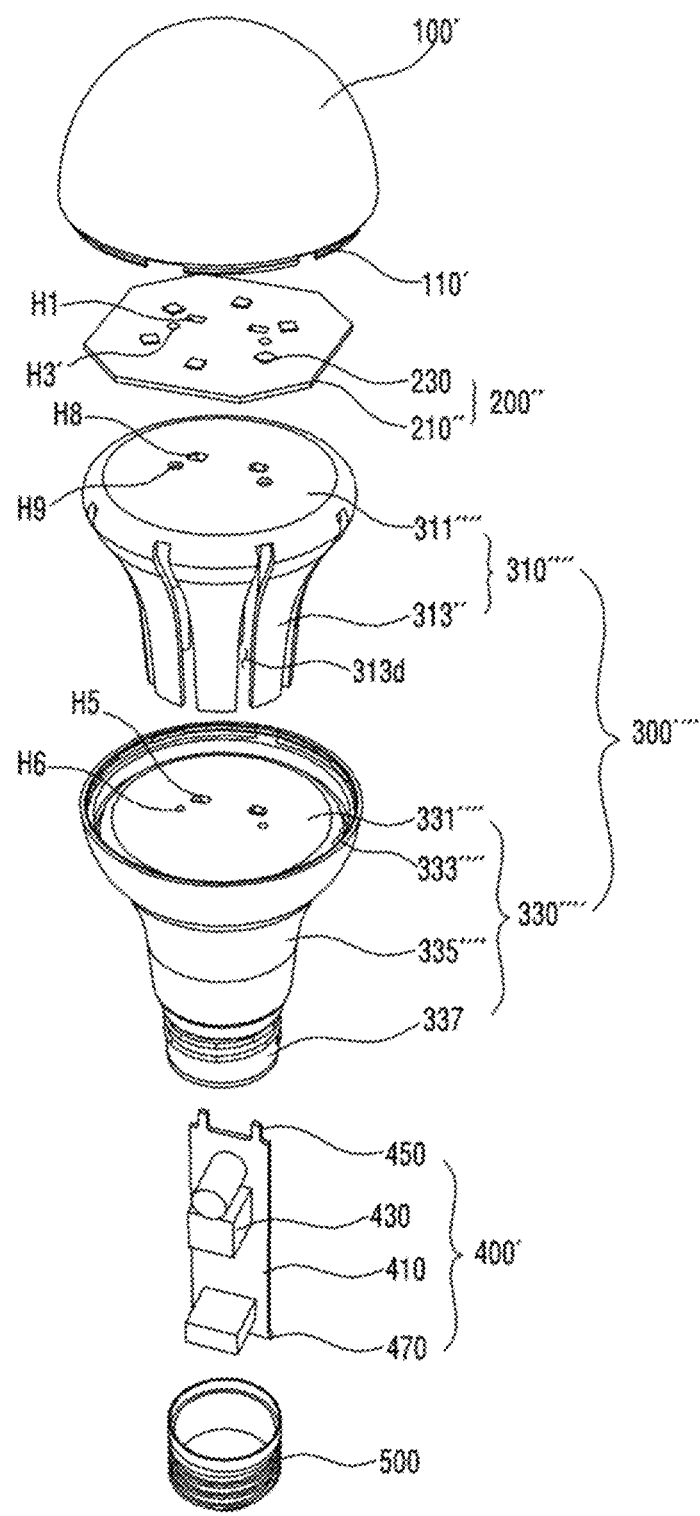
FIG. 39 is an exploded perspective view of the lighting device shown in FIG. 37.
Figure 40:
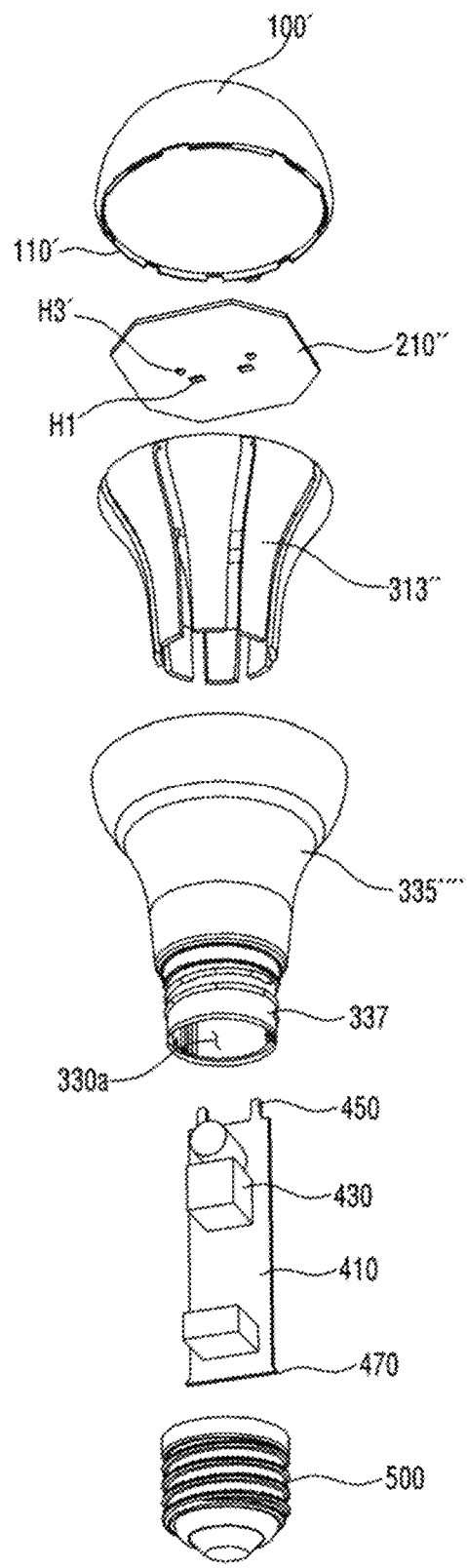
FIG. 40 is an exploded perspective view of the lighting device shown in FIG. 38.
Figure 41:
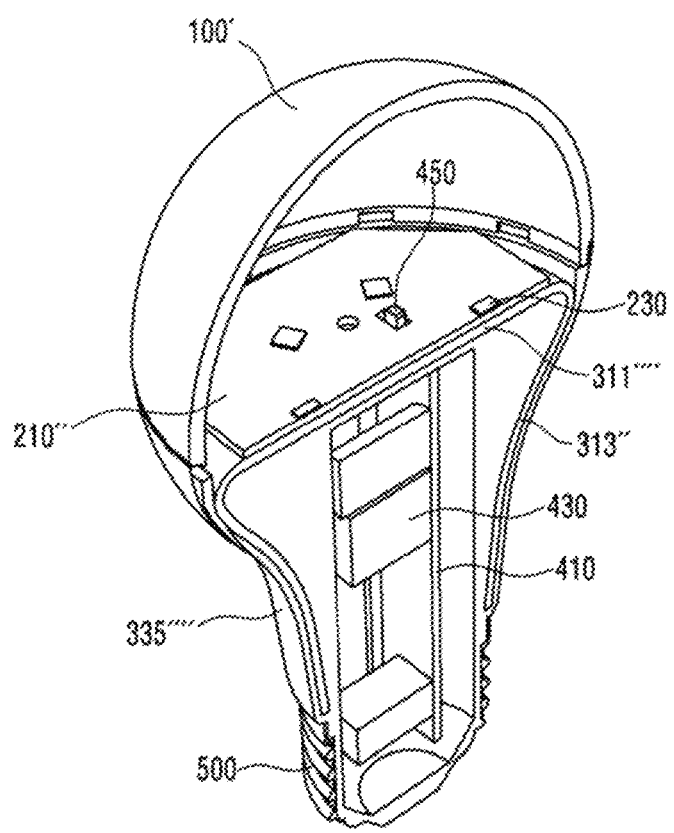
FIG. 41 is a cross sectional view of the lighting device shown in FIG. 37.

FIG. 37 is a top perspective view of a lighting device according to a fifth embodiment. FIG. 38 is a bottom perspective view of the lighting device shown in FIG. 37. FIG. 39 is an exploded perspective view of the lighting device shown in FIG. 37. FIG. 40 is an exploded perspective view of the lighting device shown in FIG. 38. FIG. 41 is a cross sectional view of the lighting device shown in FIG. 37.

In description of the lighting device according to the fifth embodiment shown in FIGS. 37 to 41, the same reference numerals are assigned to the same components as those according to the first to the fourth embodiments shown in FIGS. 1 to 36. Therefore, in the lighting device according to the fifth embodiment shown in FIGS. 37 to 41, detailed descriptions of the same reference numerals are assigned to the same components as those according to the first to the fourth embodiments shown in FIGS. 1 to 36 will be replaced by the foregoing descriptions.

A light source module 200" includes a substrate 210" and the light emitting device 230. Unlike the substrate 210' shown in FIGS. 23 to 24, the substrate 210" does not have the second hole H2 and has a third hole H3' which is formed in a position different from the position where the third hole H3 of the substrate 210' shown in FIGS. 23 to 24 has been formed.

A heat sink 300"" includes a first heat radiation part 310"" and a second heat radiation part 330"". Characteristics other than the shapes of the first heat radiation part 310"" and the second heat radiation part 330"" are the same as those of the first heat radiation part 310 and the second heat radiation part 330 shown in FIGS. 1 to 5.

The shape of the first heat radiation part 310"" is different from that of the first heat radiation part 310 shown in FIGS. 1 to 5. Specifically, an upper portion 311"" of the first heat radiation part 310"" has a circular plate shape similar to the shape of the upper portion 311 of the first heat radiation part 310 shown in FIGS. 1 to 5. The upper portion 311"" has an eighth hole H8 through which the extended substrate 450 of the power supply unit 400' passes and may further have a ninth hole H9 corresponding to the third hole H3' of the substrate 210".

A lower portion 313" of the first heat radiation part 310"" extends downwardly from the edge of the upper portion 311"". A plurality of the lower portions 313" may be provided.

The lower portion 313" may have a flat plate shape or a plate shape of which a portion has a predetermined curvature.

The top and bottom widths of the lower portion 313" may be different from each other. Specifically, the top width of the lower portion 313" may be greater than the bottom width of the lower portion 313". When the top width of the lower portion 313" is greater than the bottom width of the lower portion 313", the shapes of the plurality of the lower portions 313" can be caused to correspond to the shape of an outer portion 335"" of the second heat radiation part 330"".

The plurality of the lower portions 313" may be provided. The plurality of the lower portions 313" may be spaced apart from each other. A predetermined gap 313d may be formed between the two adjacent lower portions 313". The gap 313d may be created during the manufacturing process of the first heat radiation part 310"". When it is designed that the lower portion of the first heat radiation part is manufactured to have no gap 313d, a drawing process should be used, which requires a lot of manufacturing cost and time. However, since the lower portion 313" of the first heat radiation part 310"" has the gap 313d, it is possible to manufacture the lower portion 313" of the first heat radiation part 310"" by using a bending method which requires less manufacturing cost and time. Specifically, the manufacturing method of the first heat radiation part 310"" is as follows. Development figures of the upper portion 311"" and the plurality of the lower portions 313" are previously prepared on an aluminum plate, and then the plurality of the lower portions 313" may be manufactured by bending the aluminum plate in accordance with the design.

The number of the lower portion 313" may be changed according to the shape and size of the upper portion 311"". For example, if the shape of the upper portion 311"" is circular, the appropriate number of the lower portion 313" may be selected according to the size of the shape of the upper portion 311"". If the shape of the upper portion 311""

is polygonal, the number of the lower portion 313" may be selected according to the number of the sides of the polygon.

The surface area of the upper portion 311"" may be equal to or greater than the total surface area of the plurality of the lower portions 313". Specifically, the surface area of the upper portion 311"" may be equal to or greater than 1 time and equal to or less than 2 times the total surface area of the plurality of the lower portions 313". If the surface area of the upper portion 311"" is less than 1 time the total surface area of the plurality of the lower portions 313", a heat transfer efficiency may be deteriorated because the surface area of the upper portions 311"" which directly receives the heat from the light source module 200" is less than the total surface area of the plurality of the lower portions 313". Meanwhile, if the surface area of the upper portion 311"" is greater than 2 times the total surface area of the plurality of the lower portions 313", most of the heat is gathered in the upper portion 311"", so that a heat radiation efficiency may be deteriorated.

The lower portion 313" is received in a first receiver 333"" of the second heat radiation part 330"".

The shape of the lower portion 313" may correspond to an outer surface shape of the outer portion 335"" of the second heat radiation part 330"". Specifically, the lower portion 313" may have a predetermined curvature in accordance with the shape of the outer portion 335"". As shown in FIG. 41, the lower portion 313" may be disposed adjacent to the outer portion 335"" of the second heat radiation part 330"".

When the shape of the lower portion 313" corresponds to an outer surface shape of the outer portion 335"" of the second heat radiation part 330"", and when the lower portion 313" is disposed adjacent to the outer surface the outer portion 335"", a distance (a heat radiation path) from the lower portion 313" to the outer surface of the outer portion 335"" becomes shorter. As a result, the heat radiation performance of the heat sink 300"" can be more improved.

A thickness of the lower portion 313" may be from 1.0 T (mm) to 2.0 T. When the thickness of the lower portion 313" is from 1.0 T to 2.0 T, the lower portion 313" has an advantage of being the most easily molded. That is, when the thickness of the lower portion 313" is less than 1.0 T or larger than 2.0 T, the lower portion 313" is difficult to process and the shape of the lower portion 313" is difficult to maintain as it is.

The second heat radiation part 330"" may include an inner portion 331"", the outer portion 335"", and the connection portion 337. The second heat radiation part 330"" may have the first receiver 333"" and the second receiver 330*a*.

The inner portion 331"" may be disposed within the first heat radiation part 310"". The inner portion 331"" may be enclosed by the first heat radiation part 310"". Here, the inner portion 331"" may have a shape corresponding to the shapes of the upper portion 311"" and the lower portion 313" of the first heat radiation part 310"".

The inner portion 331"" may have the fifth hole H5 in which the extended substrate 450 of the power supply unit 400' is disposed and may have the sixth hole H6 corresponding to the third hole H3' of the substrate 210" and to the ninth hole H9 of the upper portion 311"" of the first heat radiation part 310"".

The outer portion 335"" is disposed to enclose the first heat radiation part 310"". Here, the outer portion 335"" may have a shape corresponding to the external shape of the first heat radiation part 310"".

A thickness of the outer portion 335"" may be from 0.5 T to 2.0 T. When the thickness of the outer portion 335"" is less than 0.5 T, a heat radiation path between the outside and the lower portion 313" of the first heat radiation part 310"" becomes shorter, so that a withstand voltage characteristic is degraded and a flammability grade is difficult to comply with. When the thickness of the outer portion 335"" is greater than 2.0 T, the heat radiation performance of the heat sink 300"" is degraded.

A ratio of the thickness of the lower portion 313" of the first heat radiation part 310"" to the thickness of the outer portion 335"" of the second heat radiation part 330"" may be from 1:1 to 2:1. When the thickness of the lower portion 313" of the first heat radiation part 310"" is less than the thickness of the outer portion 335"" of the second heat radiation part 330"", the heat radiation performance of the heat sink 300"" is degraded. When the thickness of the lower portion 313" of the first heat radiation part 310"" exceeds two times the thickness of the outer portion 335"" of the second heat radiation part 330"", the withstand voltage characteristic is degraded.

The first heat radiation part 310"" and the second heat radiation part 330"" are integrally formed with each other. The mutually coupled first and second heat radiation parts 310"" and 330"" may be limited to separate from each other.

The insert injection process may be used to integrally form the first heat radiation part 310"" and the second heat radiation part 330"".

Sixth Embodiment

Figure 42:
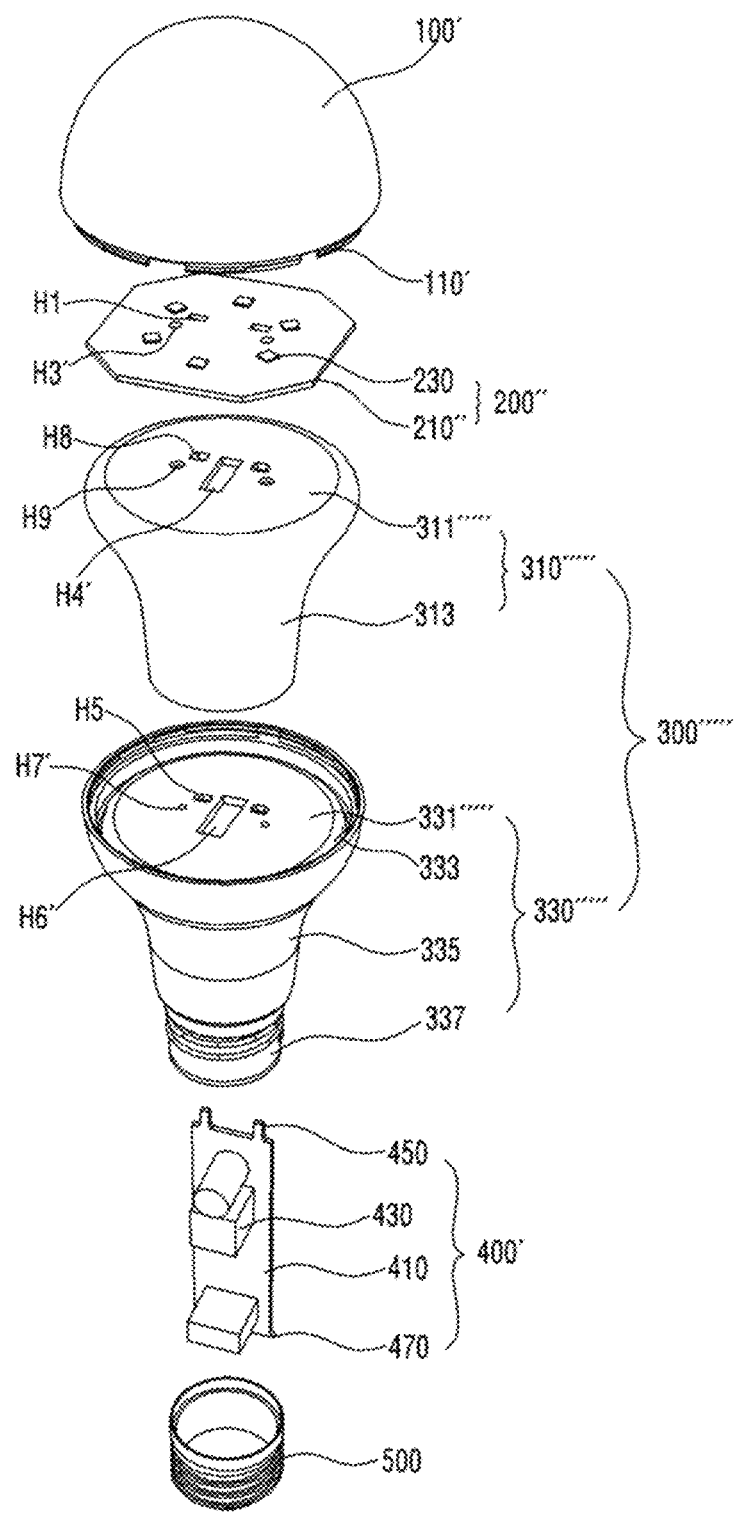
FIGS. 42 to 43 are exploded perspective views of a lighting device according to a sixth embodiment.
Figure 43:
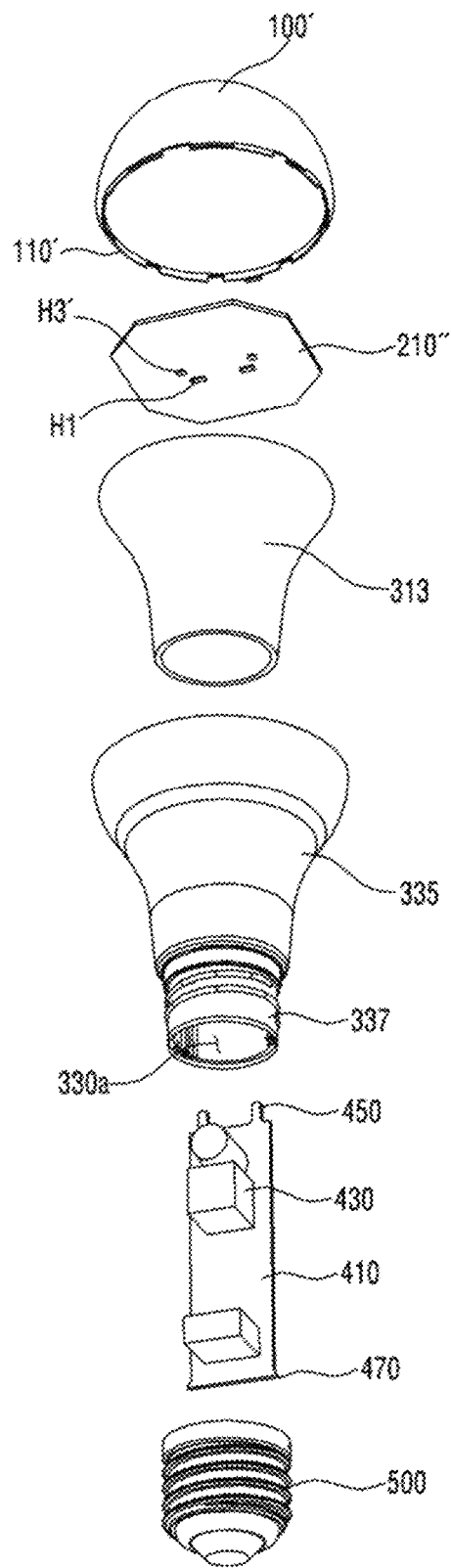
Figure 44:
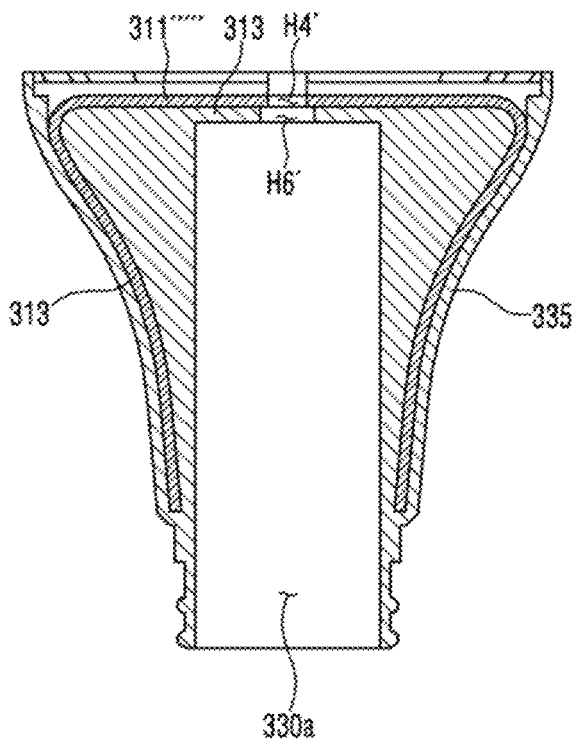
FIG. 44 is a cross sectional view of the lighting device shown in FIG. 42.

FIGS. 42 to 43 are exploded perspective views of a lighting device according to a sixth embodiment. FIG. 44 is a cross sectional view of the lighting device shown in FIG. 42.

In description of the lighting device according to the sixth embodiment shown in FIGS. 42 to 44, the same reference numerals are assigned to the same components as those according to the first to the fifth embodiments shown in FIGS. 1 to 41. Therefore, in the lighting device according to the sixth embodiment shown in FIGS. 42 to 44, detailed descriptions of the same reference numerals are assigned to the same components as those according to the first to the fifth embodiments shown in FIGS. 1 to 41 will be replaced by the foregoing descriptions.

A heat sink 300'"" includes a first heat radiation part 310'"" and a second heat radiation part 330'"". Characteristics other than the shapes of the first heat radiation part 310'"" and the second heat radiation part 330'"" are the same as those of the first heat radiation part 310 and the second heat radiation part 330 shown in FIGS. 1 to 5.

An upper portion 311'"" of the first heat radiation part 310'"" has the eighth hole H8 in which the extended substrate 450 of the power supply unit 400' is disposed and the ninth hole H9 corresponding to the third hole H3' of the substrate 210". Also, the upper portion 311'"" of the first heat radiation part 310'"" has a fourth hole H4'.

The second heat radiation part 330'"" may include an inner portion 331'"", the outer portion 335, and the connection portion 337. The second heat radiation part 330'"" may have the first receiver 333 and the second receiver 330*a*.

The inner portion 331'"" may have the fifth hole H5 in which the extended substrate 450 of the power supply unit 400' is disposed and a seventh hole H7' corresponding to the ninth hole H9 of the upper portion 311'"" of the first heat radiation part 310'"". Also, the inner portion 331'"" may have a sixth hole H6'.

The fourth hole H4' of the first heat radiation part 310'"" and the sixth hole H6' of the second heat radiation part 330'"" are components required for manufacturing the heat sink 300'"". Hereafter, these will be described with reference to FIG. 45.

Figure 45:
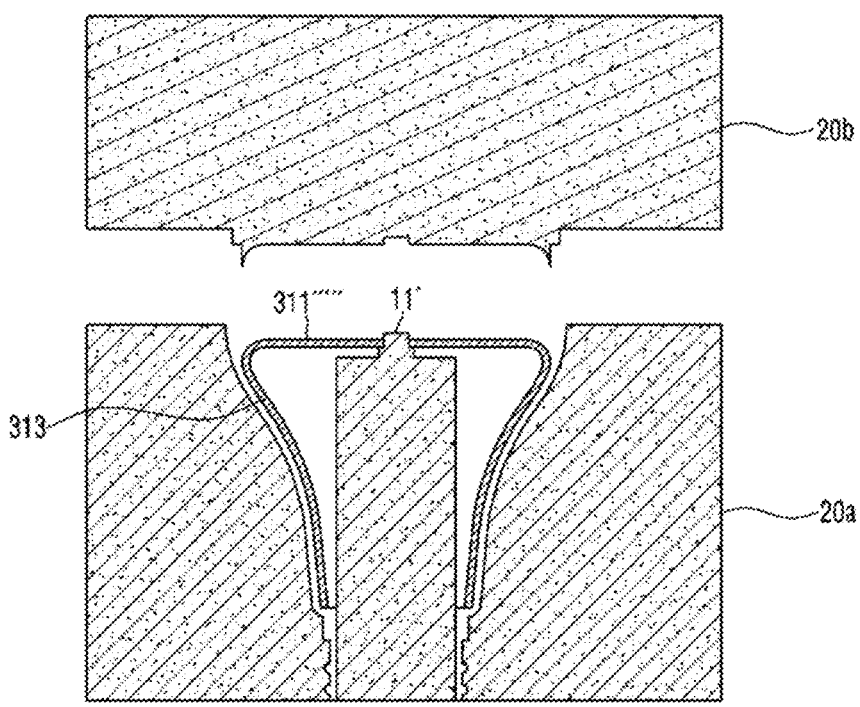
FIG. 45 is a view for describing a method for manufacturing the heat sink shown in FIGS. 42 to 44.

FIG. 45 is a view for describing a method for manufacturing the heat sink shown in FIGS. 42 to 44.

The heat sink 300'''''' shown in FIGS. 42 to 44 may be manufactured by a process similar to the insert injection process shown in FIGS. 30 to 32.

Specifically, referring to FIG. 45, a first mold 20a and a second mold 20b, which are used to manufacture the heat sink 300'''''' shown in FIGS. 42 to 44, are provided. The previously produced first heat radiation part 310'''''' (311'''''', 313) is disposed in a fixing pin 11' within the first mold 20a. Here, the fixing pin 11' is inserted into the fourth hole H4' of the upper portion 311'''''' of the first heat radiation part 310'''''' (311'''''', 313). Next, the first mold 20a and the second mold 20b become in contact with each other, and a liquefied material constituting the second heat radiation part is injected through an inlet (not shown) formed in the first mold 20a or the second mold 20b. After the liquefied material fills an empty space between the first mold 20a and the second mold 20b, the liquefied material is cured. After the liquefied material is cured, the first mold 20a and the second mold 20b are removed, so that the heat sink 300'''''' shown in FIGS. 42 to 44 may be obtained.

Due to the shape of the fixing pin 11', a diameter of the fourth hole H4' of the first heat radiation part 310'''''' may be different from a diameter of the sixth hole H6' of the second heat radiation part 330''''''. Specifically, the diameter of the fourth hole H4' of the first heat radiation part 310'''''' may be less than the diameter of the sixth hole H6' of the second heat radiation part 330''''''. The fact that the diameter of the fourth hole H4' of the first heat radiation part 310'''''' is less than the diameter of the sixth hole H6' of the second heat radiation part 330'''''' may be one of methods for identifying that the first heat radiation part 310'''''' and the second heat radiation part 330'''''' have been manufactured through the insert injection process.

Figure 46:
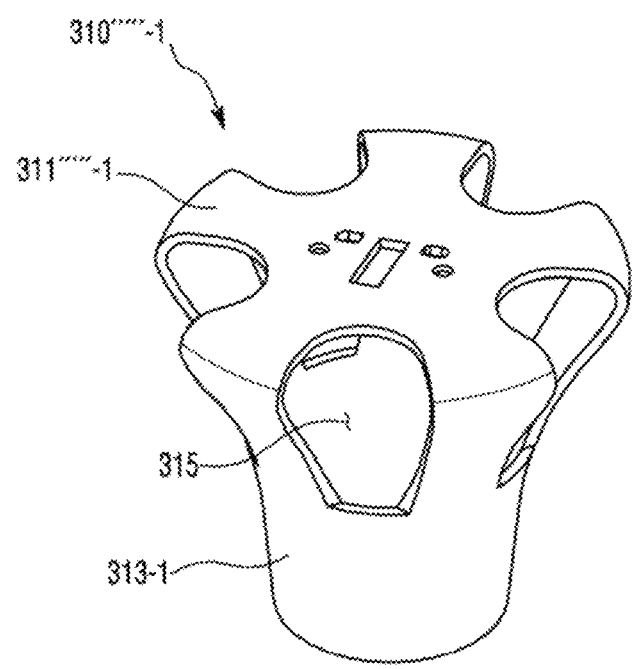
FIG. 46 is a perspective view showing a modified example 310''''-1 of a first heat radiation part 310'''' shown in FIG. 42.

FIG. 46 is a perspective view showing a modified example 310''''''-1 of the first heat radiation part 310'''''' shown in FIG. 42.

A first heat radiation part 310''''''-1 shown in FIG. 46 includes an upper portion 311''''''-1 and a lower portion 313-1 and has at least one opening 315. A portion of the opening 315 may be formed in the upper portion 311''''''-1 and the other portion of the opening 315 may be formed in the lower portion 313-1.

The opening 315 is able to prevent that the shape the first heat radiation part 310''''''-1 from being changed by the expansion of the first heat radiation part 310''''''-1 by the heat applied thereto and the contraction of the first heat radiation part 310''''''-1 by the heat lost therefrom. Specifically, the first heat radiation part 310''''''-1 may be made of a metallic material. Here, when the metallic material receives heat, it is expanded, and when the metallic material loses the heat, it contracts. Continuous expansion and contraction may damage the shape of the first heat radiation part 310''''''-1. Here, the opening 315 is able to reduce the damage.

Here, the opening 315 may be formed only in the upper portion 311''''''-1 or only in the lower portion 313-1.

Seventh Embodiment

Figure 47:
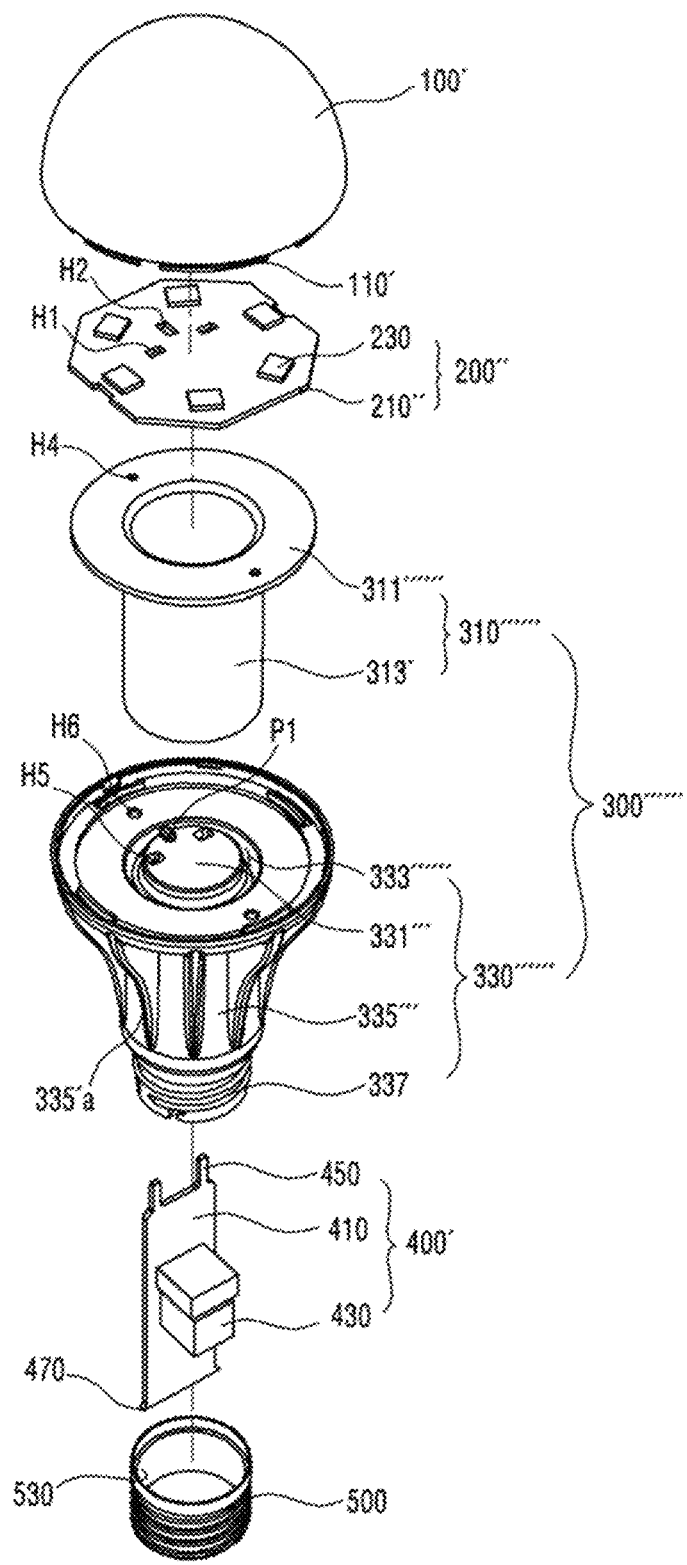
FIGS. 47 to 48 are exploded perspective views of a lighting device according to a seventh embodiment.
Figure 48:
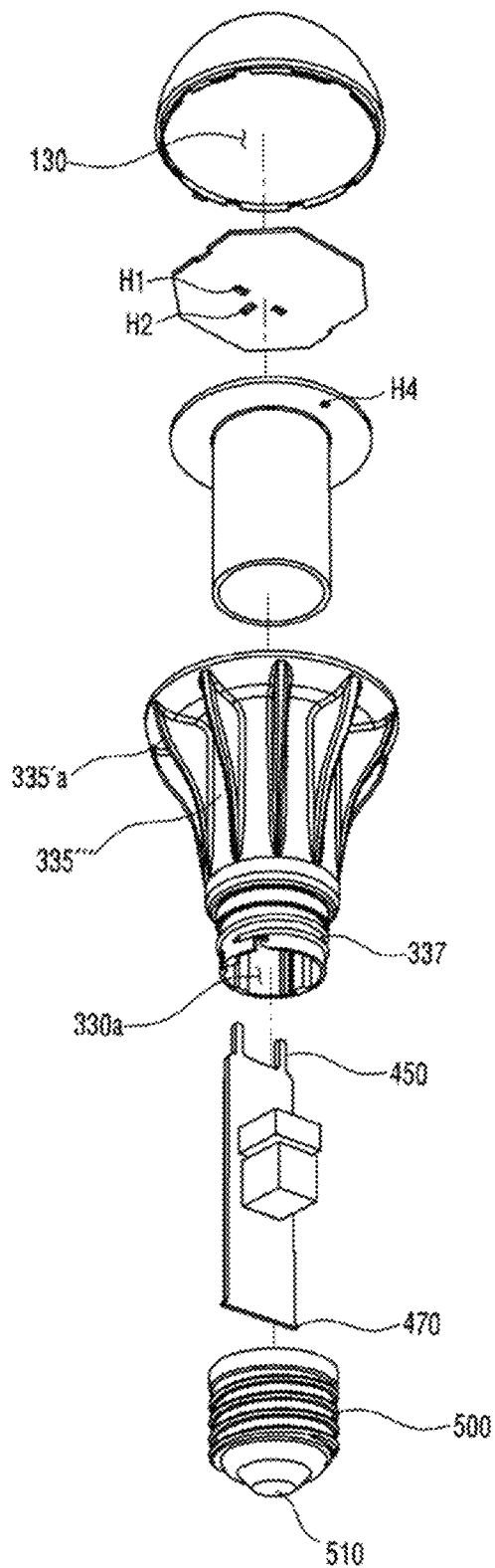

FIGS. 47 to 48 are exploded perspective views of a lighting device according to a seventh embodiment.

In description of the lighting device according to the seventh embodiment shown in FIGS. 47 to 48, the same reference numerals are assigned to the same components as those according to the first to the sixth embodiments shown in FIGS. 1 to 46. Therefore, in the lighting device according to the seventh embodiment shown in FIGS. 47 to 48, detailed descriptions of the same reference numerals are assigned to the same components as those according to the first to the sixth embodiments shown in FIGS. 1 to 46 will be replaced by the foregoing descriptions.

A heat sink 300'''''' includes a first heat radiation part 310'''''' and a second heat radiation part 330''''''. Characteristics other than the shapes of the first heat radiation part 310'''''' and the second heat radiation part 330'''''' are the same as those of the first heat radiation part 310''' and the second heat radiation part 330''' shown in FIGS. 23 to 24.

In the shape of the first and second heat radiation part 310'''''' and 330'''''', the shapes of an upper portion 311'''''', an outer portion 335'''''' and a first receiver 333'''''' are different from the shapes of the upper portion 311''', the outer portion 335''' and the first receiver 333''' of the first and second heat radiation parts 310''' and 330''' shown in FIGS. 23 to 24.

Specifically, the shape of the upper portion 311'''''' of the first heat radiation part 310'''''' is the same as that of the upper portion 311'' of the first heat radiation part 310'' shown in FIGS. 12 to 13. The upper portion 311'''''' has further the fourth hole H4 shown in FIG. 29.

The first receiver 333'''''' of the second heat radiation part 330'''''' may have a shape corresponding to that of the first heat radiation part 310''''''. Therefore, the top surface of the outer portion 335'''''' of the second heat radiation part 330'''''' is different from the top surface of the outer portion 335''' of the second heat radiation part 330''' shown in FIGS. 23 to 24.

The heat sink 300'''''' may be manufactured through the insert injection process shown in FIGS. 30 to 32. In the case where the heat sink 300'''''' is manufactured through the insert injection process, depending on the number and position of the inlets (not shown) formed in the first mold 10a or the second mold 10b shown in FIG. 30, the first heat radiation part 310'''''' is damaged at the time of manufacturing the second heat radiation part 330''''''. Specifically, this will be described with reference to FIGS. 49 to 50.

Figure 49:
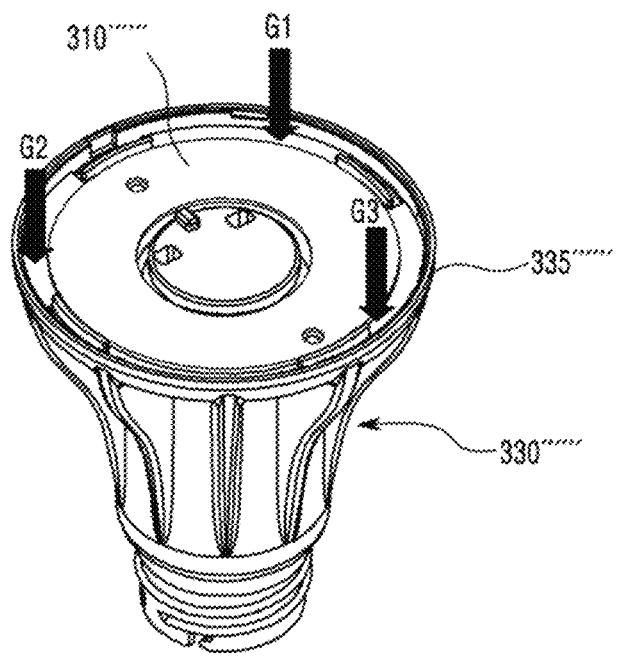
FIGS. 49 to 50 are views for describing that the first heat radiation part 310'''' becomes curved when an insert injection process is performed.
Figure 50:
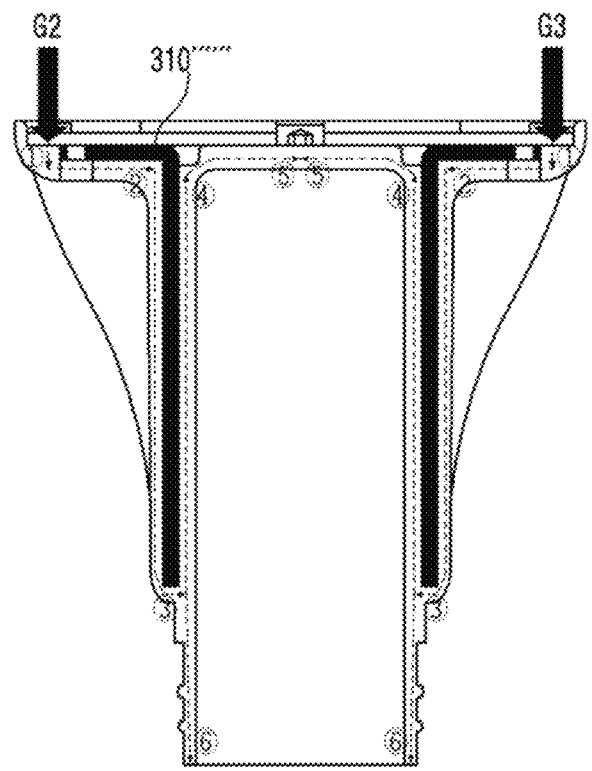

FIGS. 49 to 50 are views for describing that the first heat radiation part 310'''''' becomes curved when an insert injection process is performed. Here, though a plurality of inlets G1, G2 and G3 are indicated above the formed heat sink 300'''''' for convenience of description, the inlets G1, G2 and G3 are actually formed in the first mold 10a or the second mold 10b shown in FIG. 30.

Referring to FIG. 49, when the heat sink 300'''''' is manufactured through the insert injection process, the first to third inlets G1, G2 and G3 through which a liquefied resin constituting the second heat radiation part 330'''''' is injected may be formed in the top surface of the outer portion 335'''''' of the second heat radiation part 330''''''.

The liquefied resin which is injected through the first to third inlets G1, G2 and G3 sequentially moves, as shown in FIG. 50, in the order of ① to ⑥. Here, high pressure is required in order that the liquefied resin which is injected through the second and third inlets G2 and G3 is moved to ⑤ or ⑥. In this case, the liquefied resin which is injected at the high pressure in a ② direction may damage the appearance of the first heat radiation part 310''''''. For example, the first heat radiation part 310'''''' may be curved.

A method for preventing the damage of the first heat radiation part 310'''''' will be described with reference to FIGS. 51 to 52.

Figure 51:
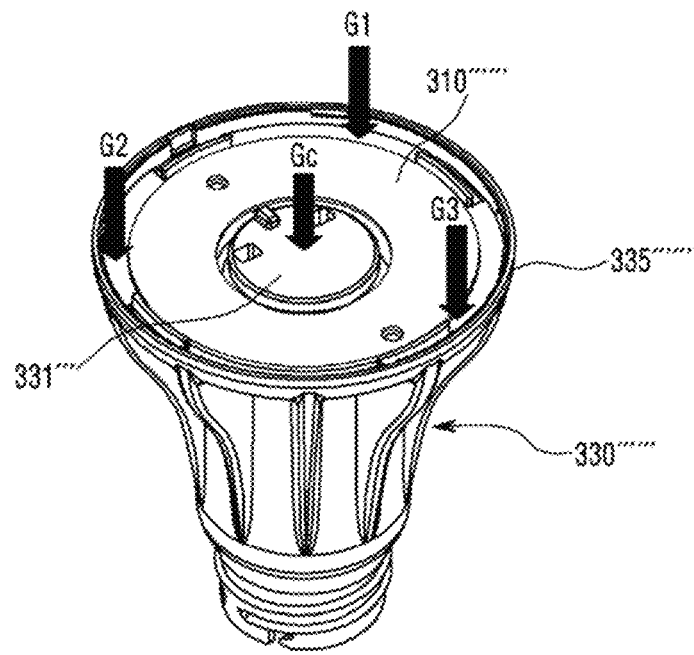
FIGS. 51 to 52 are views for describing an insert injection process for preventing the first heat radiation part from being curved.
Figure 52:
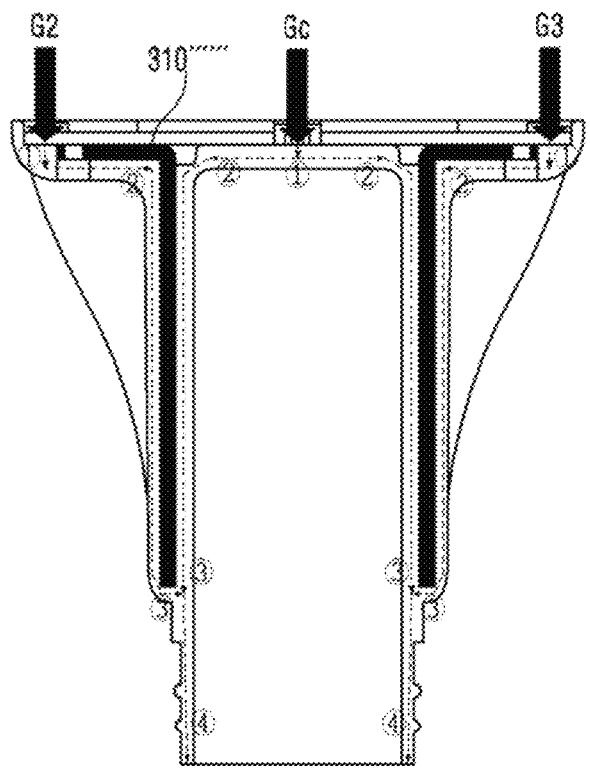

FIGS. 51 to 52 are views for describing the insert injection process for preventing the first heat radiation part from being curved.

For the purpose of preventing the first heat radiation part 310'''''' from being curved, a central inlet Gc is further formed in the second mold 10b shown in FIGS. 30 to 32. After the central inlet Gc is further formed, the liquefied resin constituting the second heat radiation part 330'''' is injected through the first to third inlets G1, G2 and G3 and the central inlet Gc, the liquefied resin, as shown in FIG. 52, sequentially moves in the order of ① to ④. Here, since the liquefied resin is also injected at a high pressure through the central inlet Gc, the first heat radiation part 310'''' is able to cope with the liquefied resin which is injected at a high pressure through the second inlet G2. Accordingly, the first heat radiation part 310'''' can be prevented from being curved.

Also, since the liquefied resin is also injected at a high pressure through the central inlet Gc, the pressure of the liquefied resin which is injected through the second inlet G2 or the third inlet G3 can be more reduced than the pressure of the liquefied resin which is injected through the second inlet G2 or the third inlet G3 shown in FIG. 50, and the heat sink 300'''' can be more quickly manufactured.

Meanwhile, there is another insert injection process as well as the insert injection process shown in FIGS. 51 to 52 for preventing the first heat radiation part 310'''' from being curved. This will be described with reference to FIG. 53.

Figure 53:
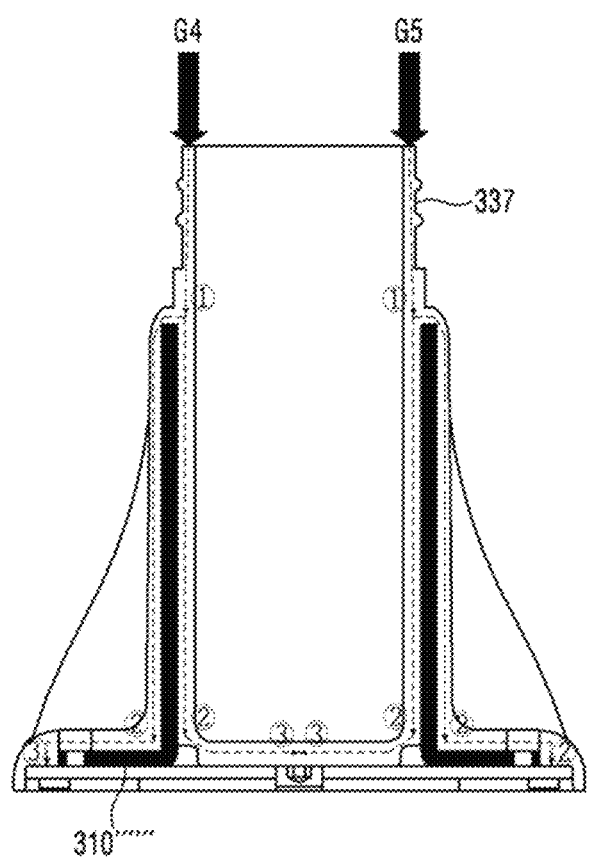
FIG. 53 is a view for describing another insert injection process for preventing the first heat radiation part 310'''' from being curved.

FIG. 53 is a view for describing another insert injection process for preventing the first heat radiation part 310'''' from being curved.

Another insert injection process for preventing the first heat radiation part 310'''' from being curved is that a fourth inlet G4 and a fifth inlet G5 are formed in the first mold 10*a* shown in FIG. 30, and then the liquefied resin is injected through the fourth and fifth inlets G4 and G5. According to this method, the liquefied resin moves from ① to ③. Even though the liquefied resin is injected at a high pressure through the fourth and fifth inlets G4 and G5, the liquefied resin moving toward ① has a small contact area with the first heat radiation part 310''''. Therefore, the first heat radiation part 310'''' may be curved very little. Further, the liquefied resin moving toward ② copes with the first heat radiation part 310''''. However, the pressure of the liquefied resin at this point of time has been much more reduced than the initial pressure, so that the pressure hardly affects the first heat radiation part 310''''. Accordingly, the first heat radiation part 310'''' can be prevented from being curved through the insert injection process shown in FIG. 53.

Meanwhile, traces of the inlets G1, G2, G3, Gc, G4, and G5 shown in FIGS. 51 to 53 can be found in the formed heat sink. This will be described in detail with reference to FIG. 54.

Figure 54:
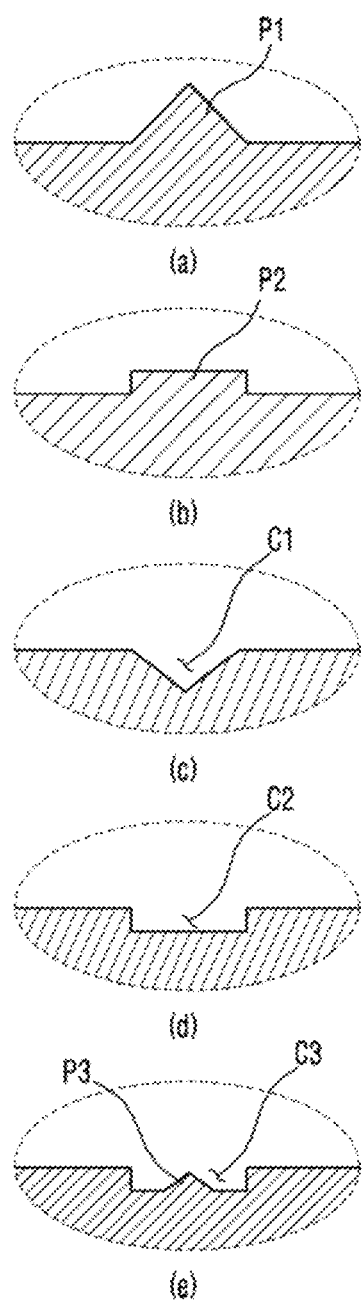
FIG. 54 is a view for describing traces of inlets shown in FIGS. 51 to 53.

FIG. 54 is a view for describing the traces of inlets shown in FIGS. 51 to 53. The cross sections of the detailed examples of the traces are shown in (a) to (e) of FIG. 54.

Referring to (a) to (d) of FIG. 54, the traces of the inlets G1, G2, G3, Gc, G4, and G5 shown in FIGS. 51 to 53 may appear as protrusions P1 and P2 or recesses C1 and C2. The shapes of the protrusions P1 and P2 or the recesses C1 and C2 are not limited to those shown in FIG. 54. This is only an example for description and has no limit.

Also, as shown in (e) of FIG. 54, the traces of the inlets G1, G2, G3, Gc, G4, and G5 may appear as both a recess C3 and a protrusion P3. The shapes of the protrusion P3 and the recess C3 are not limited to what is shown in (e) of FIG. 54. This is only an example for description and has no limit.

Meanwhile, since the fourth hole H4 and the sixth hole H6 shown in FIGS. 47 to 48 require an additional component like the cap 390 shown in FIG. 33, it is complicated to assembly the components and the cost rises due to the cap 390. When the cap 390 is not used, the first heat radiation part 310'''' is exposed outwardly through the sixth hole H6. As a result, an electrical problem (for example, the power supply unit 400' cannot be used as a non-insulating power supply unit, and the like) and a mechanical problem (for example, the first heat radiation part 310'''' and the second heat radiation part 330'''' are separated from each other by impurities, and the like) may occur. Also, even though the cap 390 is used, the cap 390 is not likely to accurately be disposed in the sixth hole H6. Accordingly, hereafter, a method for manufacturing the heat sink which does not use the cap 390, that is, has no sixth hole H6 will be described with reference to FIGS. 55 to 56.

Figure 55:
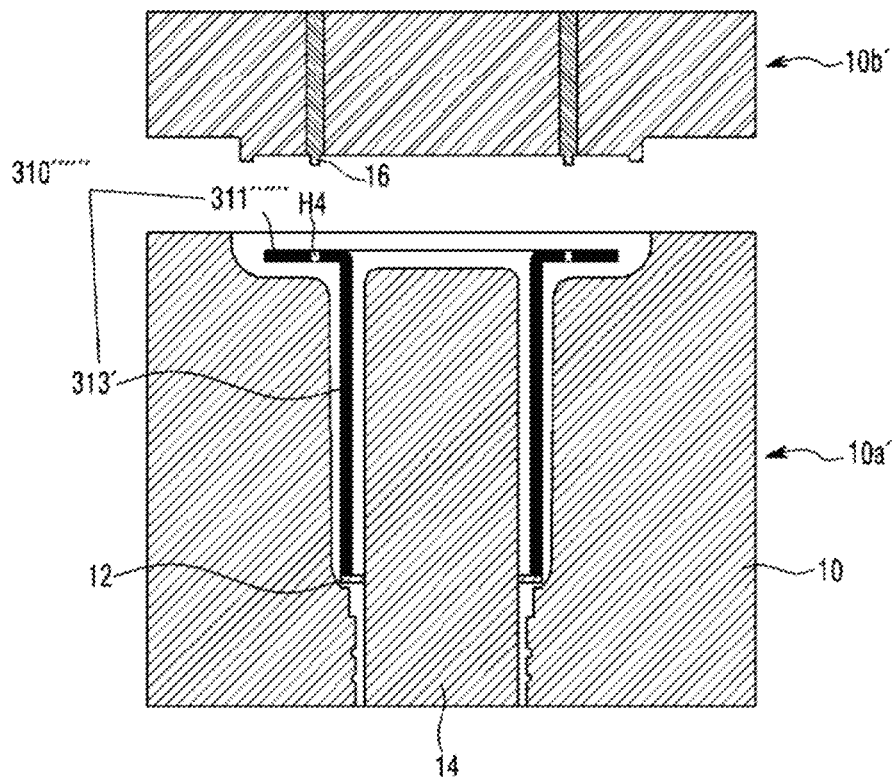
FIGS. 55 to 56 are views for describing another insert injection process for manufacturing the heat sink shown in FIG. 47.
Figure 56:
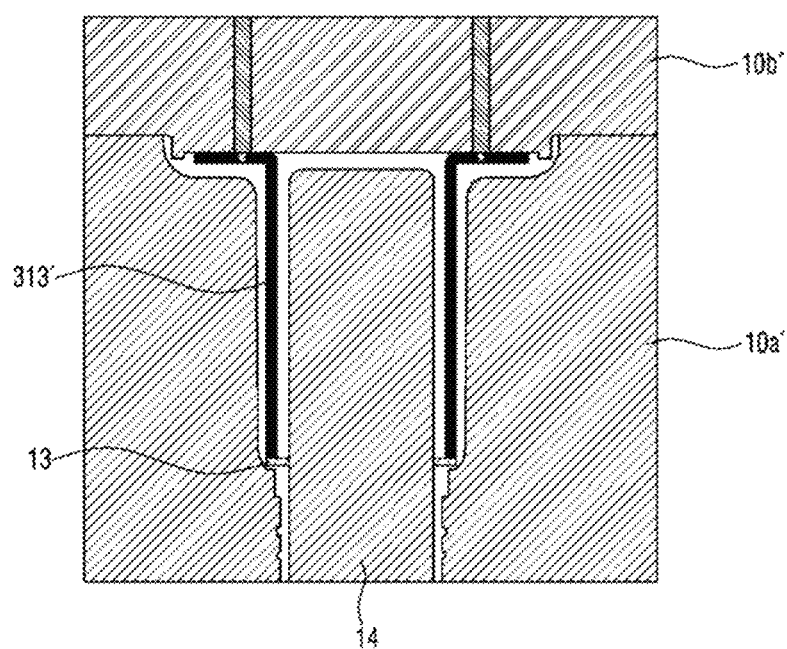
Figure 37:
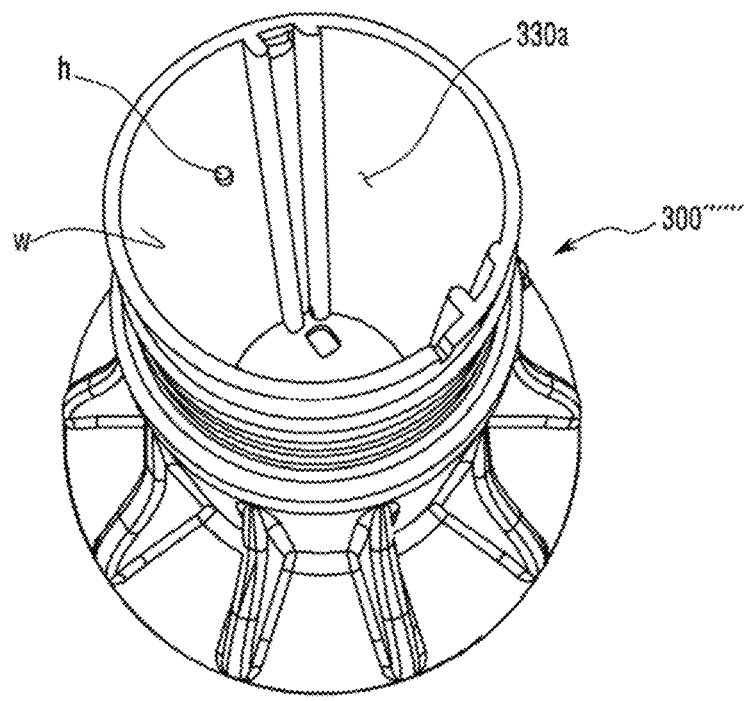

FIGS. 55 to 56 are views for describing another insert injection process for manufacturing the heat sink shown in FIG. 47.

First, as shown in FIG. 55, the upper portion 311'''' and the lower portion 313' of the first heat radiation part 310'''' are disposed within a first mold 10*a'*.

As shown in FIG. 56, a second mold 10*b'* is moved to the first mold 10*a'*, and then the liquefied resin constituting the second heat radiation part is injected through an inlet formed in at least one of the first mold 10*a'* and the second mold 10*b'*. Lastly, the second heat radiation part 330''' cured together with the first heat radiation part 310'''' is separated from the first mold 10*a'* and the second mold 10*b'*. Through this process, the heat sink including the first heat radiation part 310'''' and the second heat radiation part which have been integrally formed can be obtained.

In FIG. 55, the first mold 10*a'* may include a first frame 10 and a second frame 14. The first frame 10 forms the appearance of the heat sink. The second frame 14 is used to form the second receiver 330*a* shown in FIG. 48. The second frame 14 may include a slide 12 for supporting the lower portion 313' of the first heat radiation part 310''''. The slide 12 may protrude outwardly from the second frame 14 or may be inserted into the inside of the second frame 14. When the formed heat sink is pulled out from the first mold 10*a'*, the slide 12 is inserted into the inside of the second frame 14. Accordingly, in the formed heat sink shown in FIG. 57, a predetermined recess "h" is formed in an inner wall W of the second heat radiation part 330'''', which defines the second receiver 330*a*. The fact that the predetermined recess "h" is formed within the second receiver 330*a* of the formed heat sink may be one of methods for identifying that the corresponding heat sink has been manufactured through the insert injection process shown in FIGS. 55 to 56.

The second mold 10*b'* may include a fixing pin 16 for fixing the upper portion 311'''' of the first heat radiation part 310''''. The fixing pin 16 is inserted into the fourth hole H4 formed in the upper portion 311'''' of the first heat radiation part 310''''. Thanks to the fixing pin 16 inserted into the fourth hole H4, the first heat radiation part 310'''' may be more stably fixed within the first mold 10*a'*.

In the insert injection process shown in FIGS. 55 to 56, the predetermined recess "h" is, as shown in FIG. 57, formed within the second receiver 330*a* of the heat sink. However, unlike the insert injection process shown in FIGS. 30 to 32, the sixth hole H6 is not formed in the outer surface of the second heat radiation part 330''''. Therefore, the heat sink shown in FIG. 57 does not require the cap 390 shown in FIG. 29 and does not have the foregoing electrical problem or mechanical problem.

In the meantime, though not shown in the drawings, the support plate 410 of the power supply unit 400' may include at least one wire (not shown) which is electrically connected to the base 500. Specifically, one end of the wire (not shown) may be connected to the support plate 410, and the other end may be connected to the base 500.

The two wires (not shown) may be provided. One wire may be connected to a ground 510 of the base 500, and the other wire may be connected to an inner surface 530 of the base 500. Here, when the base 500 is coupled to the connection portion 337 of the heat sink 300''''', in other words, when the screw thread of the connection portion 337 is inserted and fixed to the screw groove of the base 500, the wire which is connected to the inner surface 530 of the base 500 deviates from the original position. A structure for overcoming this problem will be described with reference to FIG. 58.

Figure 58:
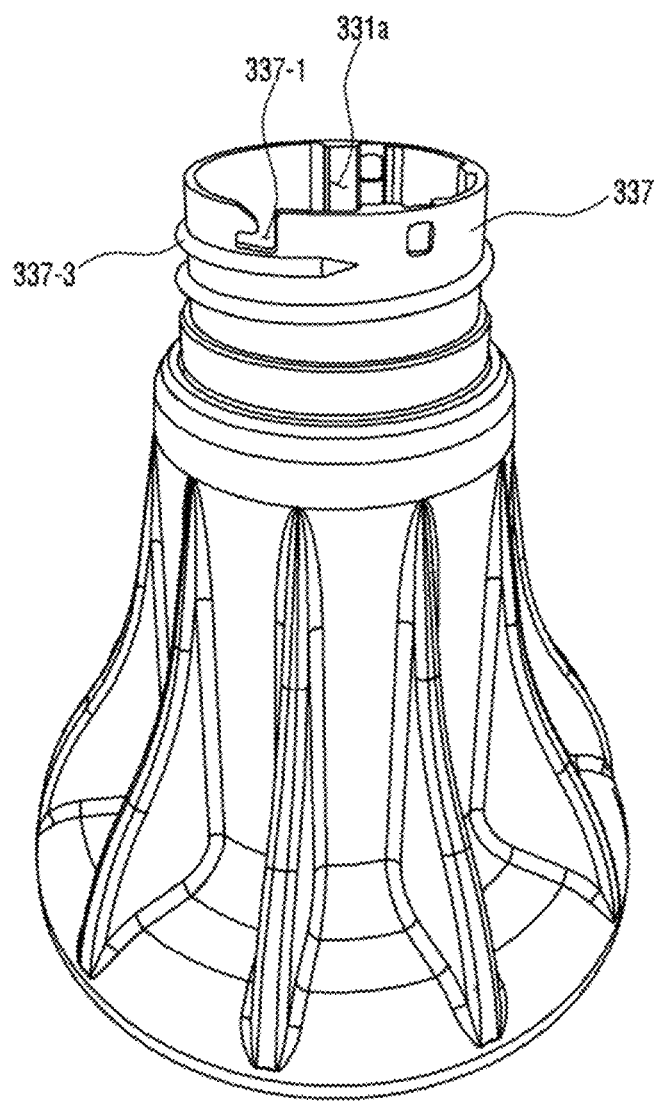
FIG. 58 is a view for describing a structure for preventing a wire from deviating when a base and the heat sink which are shown in FIG. 47 are coupled to each other.

FIG. 58 is a view for describing a structure for preventing the wire from deviating when the base and the heat sink which are shown in FIG. 47 are coupled to each other. FIG. 58 is a perspective view showing the heat sink 300''''' turned upside down, shown in FIG. 47.

Referring to FIG. 58, the connection portion 337 of the heat sink may have a catching recess 337-1 into and by which the wire is inserted and caught. The catching recess 337-1 may be formed toward the inside of a receiving recess 331*a* from the end of the connection portion 337.

The catching recess 337-1 may be comprised of a vertical recess and a horizontal recess.

The diameter of the upper part of the vertical recess may be larger than that of the lower part of the vertical recess. This is advantageous for inserting and fixing the wire in the vertical recess.

The horizontal recess may be formed extending from the vertical recess in a direction perpendicular to the vertical recess. Here, the formation direction of the horizontal recess of the catching recess 337-1 may be the same as a rotation direction of a screw thread 337-3 formed in the outer surface of the connection portion 337. As such, when the horizontal recess of the catching recess 337-1 is formed extending perpendicular to the vertical recess, that is, in the rotation direction of the screw thread 337-3, the wire is difficult to deviate from the horizontal recess of the catching recess 337-1 even though the base 500 is coupled to the connection portion 337 in a rotating manner.

Eighth Embodiment

Figure 59:
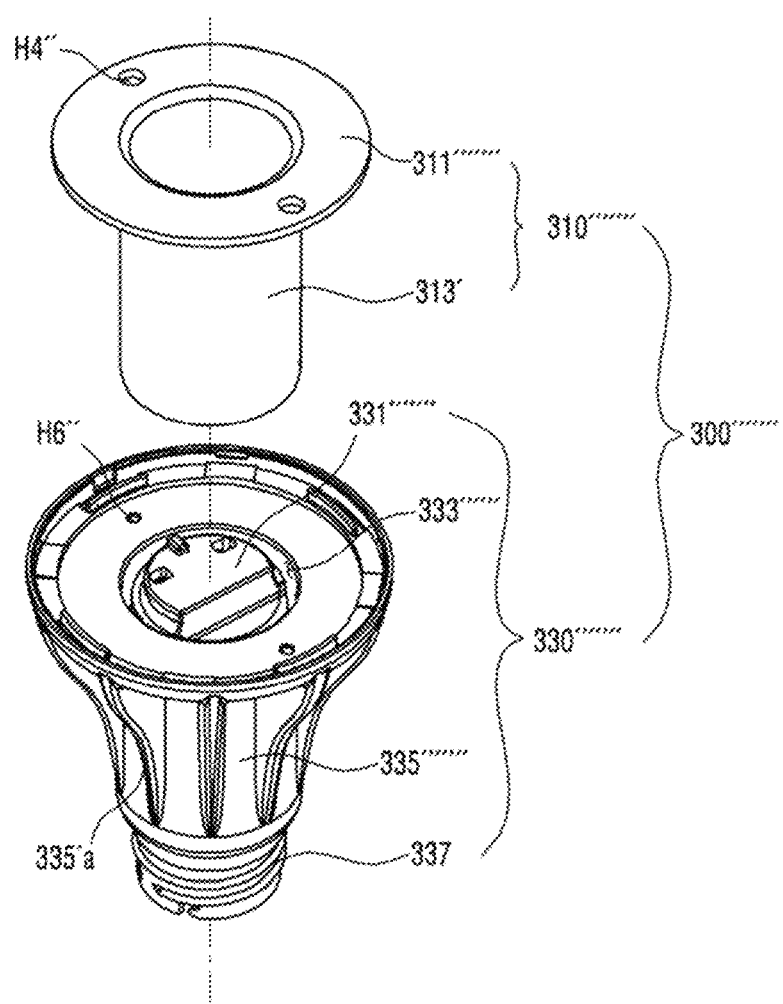
FIG. 59 is an exploded perspective view of a heat sink 300''''' of a lighting device according to an eighth embodiment.
Figure 60:
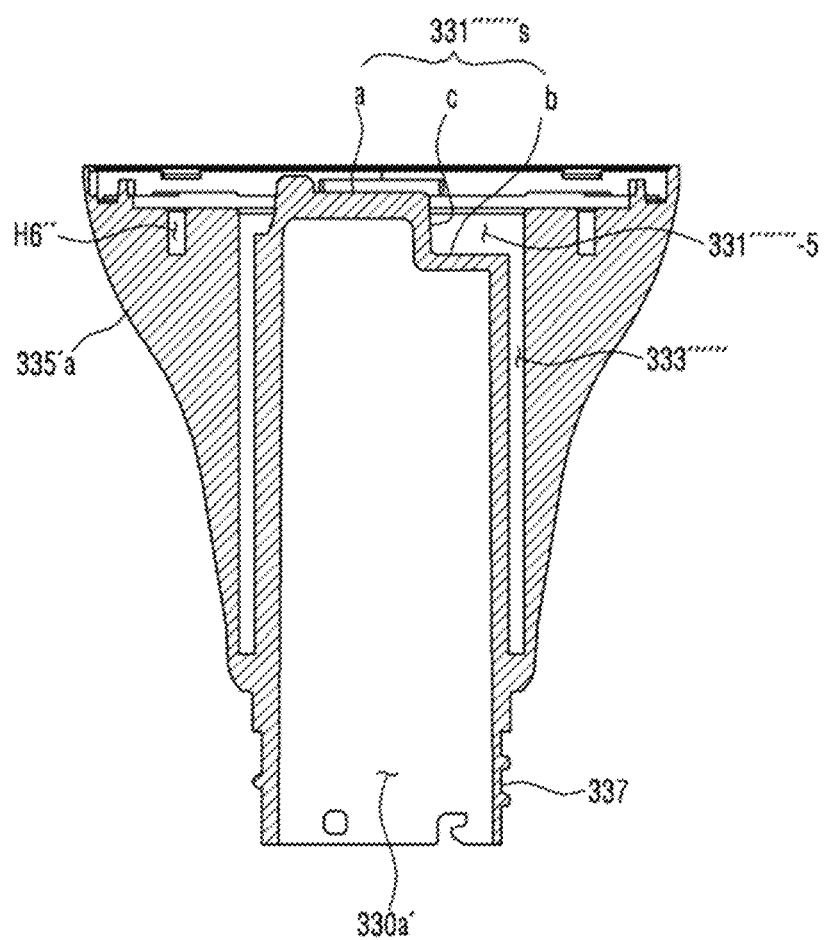
FIG. 60 is a cross sectional view of a second heat radiation part 330''''' shown in FIG. 59.
Figure 61:
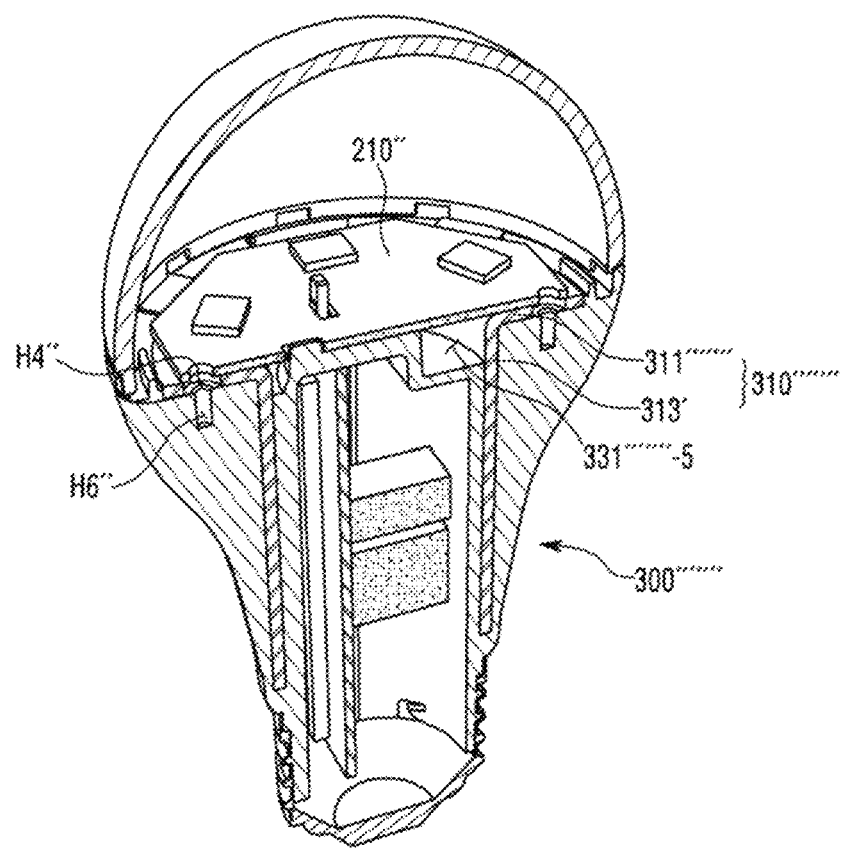
FIG. 61 is a sectional perspective view of the lighting device including the heat sink 300''''' shown in FIG. 59 in accordance with the eighth embodiment.

FIG. 59 is an exploded perspective view of a heat sink 300''''' of a lighting device according to an eighth embodiment. FIG. 60 is a cross sectional view of a second heat radiation part 330''''' shown in FIG. 59. FIG. 61 is a sectional perspective view of the lighting device including the heat sink 300''''' shown in FIG. 59 in accordance with the eighth embodiment.

The lighting device according to the eighth embodiment is the same as the lighting device according to the seventh embodiment shown in FIGS. 47 to 48, with the exception of the heat sink 300'''''.

The heat sink 300''''' may include a first heat radiation part 310''''' and a second heat radiation part 330'''''. Characteristics other than the shapes of the first heat radiation part 310''''' and the second heat radiation part 330''''' are the same as those of the first heat radiation part 310''''' and the second heat radiation part 330''''' shown in FIG. 47.

An upper portion 311''''' of the first heat radiation part 310''''' is the same as the upper portion 311''''' of the first heat radiation part 310''' shown in FIG. 47, with the exception of a fourth hole H4". The fourth hole H4" is different from the fourth hole H4 shown in FIG. 47. Specifically, the diameter of the fourth hole H4" is larger than that of the fourth hole H4 of FIG. 47.

The second heat radiation part 330''''' is the same as the second heat radiation part 330''''' shown in FIG. 47, with the exception of a sixth hole H6" of an inner portion 331''''' and an outer portion 335'''''.

The sixth hole H6" of the second heat radiation part 330''''' is the same as the sixth hole H6 shown in FIG. 47 in that the sixth hole H6" is formed in the outer portion 335'''''. However, the position and size of the sixth hole H6" are different from those of the sixth hole H6 shown in FIG. 47. Specifically, unlike the sixth hole H6 shown in FIG. 47, the sixth hole H6" is not exposed at the outer surface of the second heat radiation part 330'''''. That is, the sixth hole H6" is formed in the top surface of the outer portion 335''''' and not in the outer surface of the outer portion 335'''''. The sixth hole H6" is formed in the fin 335'*a*. The diameter of the sixth hole H6" is less than that of the fourth hole H4".

The inner portion 331''''' of the second heat radiation part 330''''' includes a top surface 331'''''s. The top surface 331'''''s may include a first surface "a" and a second surface "b". There is a predetermined level difference between the first surface "a" and the second surface "b". Specifically, the second surface "b" is disposed lower than the first surface "a". Also, the first surface "a" contacts with the bottom surface of the substrate 210", and the second surface "b" is spaced apart from the bottom surface of the substrate 210" at a predetermined interval.

The top surface 331'''''s may further include a lateral surface "c" connected between the first surface "a" and the second surface "b". The lateral surface "c" may or may not be perpendicular to the first surface "a" and the second surface "b".

The inner portion 331''''' may have a cavity 331'''''-5 which is defined by the second surface "b" and the lateral surface "c". The cavity 331'''''-5, together with the fourth hole H4" of the first heat radiation part 310''''' and the sixth hole H6" of the second heat radiation part 330', may be formed by a method for manufacturing the heat sink 300'''''. Hereafter, this will be described with reference to FIGS. 62 to 63.

Figure 63:
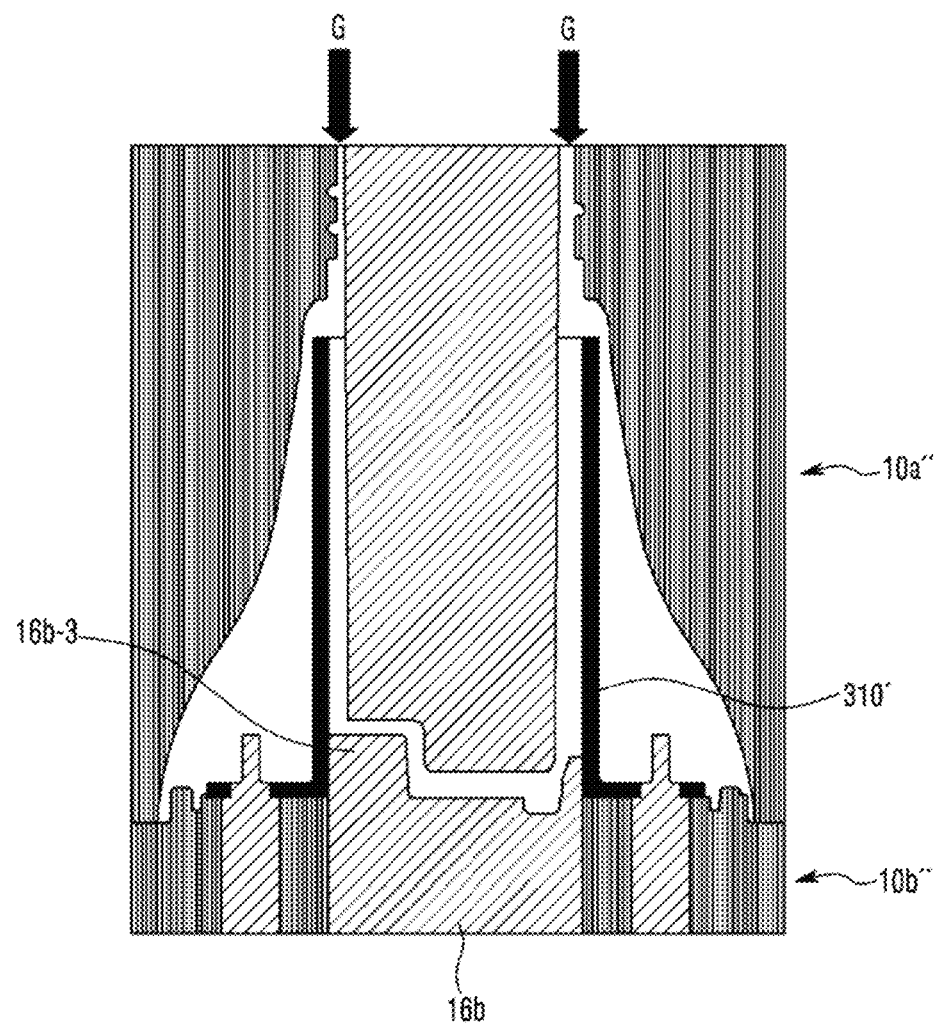

FIGS. 62 to 63 are views for describing a method for manufacturing the heat sink 300''''' shown in FIG. 59.

The method for manufacturing the heat sink 300''''' shown in FIGS. 62 to 63 may be the insert injection process shown in FIGS. 30 to 32 and 49 to 56. Accordingly, the first heat radiation part 310''''' and the second heat radiation part 330''''' of the heat sink 300''''' are integrally formed with each other, so that they may be limited to separate from each other.

The insert injection process shown in FIGS. 62 to 63 is as follows. First, as shown in FIG. 62, a first mold 10*a*" and a second mold 10*b*" are provided.

The first mold 10*a*" may include a first frame 10' and a second frame 14'. The first frame 10' forms the appearance of the heat sink 300''''' shown in FIG. 59. The second frame 14' is used to form the second receiver 330*a*' shown in FIG. 60.

The second mold 10*b*" may include a first fixing pin 16*a* and a second fixing pin 16*b*.

The first fixing pin 16*a* fixes and supports the first heat radiation part 310'''''. The second fixing pin 16*b* is used for forming the top surface 331'''''s of the inner portion 331''''' shown in FIG. 60.

The first fixing pin 16*a* may include a supporter 16*a*-1, a first upper portion 16*a*-2, and a second upper portion 16*a*-3. The supporter 16*a*-1 supports the first heat radiation part 310''''', in particular, the upper portion 311''''' of the first heat radiation part 310'''''. For the purpose of supporting the upper portion 311''''''' of the first heat radiation part 310''''''', the width of the supporter 16a-1 is greater than that of the first upper portion 16a-2. The first upper portion 16a-2 is formed extending upwardly from the top surface of the supporter 16a-1 and is disposed in the fourth hole H4" of the first heat radiation part 310''''''' shown in FIG. 59. The width of the first upper portion 16a-2 is less than that of the supporter 16a-1. The second upper portion 16a-3 is formed extending upwardly from the top surface of the first upper portion 16a-2 and is used in forming the sixth hole H6" of the second heat radiation part 330''''''' shown in FIG. 60. The sixth hole H6" of the second heat radiation part 330''''''' shown in FIG. 60 may be used as a hole into which a coupling means like a screw for fixing the substrate 210" shown in FIG. 47 to the first heat radiation part 310''''''' is inserted.

However, the sixth hole H6" may be forcibly formed after the formation of the heat sink 300''''''' is completed. As such, in the case where the sixth hole H6" is formed after the formation of the heat sink 300''''''' is completed, the second upper portion 16a-3 is not required.

For the purpose of forming the top surface 331'''''''s of the inner portion 331''''''' shown in FIGS. 62 to 63, the second fixing pin 16b may include a top surface 16b-1 and a protrusion 16b-3 which protrudes upwardly from the top surface 16b-1. Thanks to the protrusion 16b-3, the cavity 331'''''''-5 shown in FIG. 60 may be formed.

The first heat radiation part 310''''''' is disposed on the above-described second mold 10b". The first fixing pin 16a of the second mold 10b" is inserted into the fourth hole H4" of the upper portion 311''''''' of the first heat radiation part 310'''''''. Then, the first heat radiation part 310''''''' is supported by the first fixing pin 16a.

The first mold 10a" disposed above the second mold 10b" is moved to the second mold 10b". Then, as shown in FIG. 63, the first mold 10a" and the second mold 10b" become in contact with each other.

After a material constituting the second heat radiation part 330''''''', for example, a liquefied resin is injected through an inlet G and cured, the first mold 10a" and the second mold 10b" are separated from each other. Then, the heat sink 300''''''' including the integrally formed first and second heat radiation parts 310''''''' and 330''''''' shown in FIG. 59 may be obtained. Here, when the first mold 10a" is separated from the formed heat sink 300''''''', the protrusion 16b-3 of the second fixing pin 16b may function to hold the first heat radiation part 310'''''''. In other words, when the first mold 10a" is separated, the protrusion 16b-3 of the second fixing pin 16b prevents that the first heat radiation part 310''''''' is separated together with the first mold 10a".

In the formed heat sink 300''''''', it can be found that the cavity 331'''''''-5 is caused by the protrusion 16b-3 of the second fixing pin 16b, and it can be also found that the fourth hole H4" of the first heat radiation part 310''''''' is caused by the first fixing pin 16a. Further, the trace of the inlet G can be found in the end of the connection portion 337 of the formed heat sink 300'''''''. The trace of the inlet G may be, as shown in FIG. 54, shown in various shapes.

As such, as long as the cavity 331'''''''-5, the fourth hole H4", and the trace of the inlet G shown in FIG. 54 can be found in the heat sink 300''''''' shown in FIGS. 59 to 60, it can be understood by those skilled in the art that the heat sink 300''''''' shown in FIGS. 59 to 60 has been manufactured by the insert injection process shown in FIGS. 62 and 63.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device comprising:
    a heat sink including a first heat radiation part and a second heat radiation part;
    a light source module including a substrate disposed on the first heat radiation part of the heat sink, and a light emitting device disposed on the substrate; and
    a power supply unit which is disposed within the second heat radiation part of the heat sink and supplies power to the light source module,
    wherein the second heat radiation part of the heat sink comprises an inner portion receiving the power supply unit therewithin, an outer portion enclosing the inner portion, and a first receiver disposed between the inner portion and the outer portion,
    wherein the first heat radiation part of the heat sink comprises an upper portion which is disposed on the outer portion of the second heat radiation part and on which the light emitting device of the light source module is disposed, and a lower portion disposed in the first receiver of the second heat radiation part, and
    wherein the outer portion of the second heat radiation part of the heat sink includes a top surface which contacts with a bottom surface of the upper portion of the first heat radiation part.

2. The lighting device of claim 1, wherein a top surface of the upper portion of the first heat radiation part is disposed on the same plane with the top surface of the outer portion of the second heat radiation part.

3. The lighting device of claim 1, wherein the outer portion of the second heat radiation part has a recess in which the upper portion of the first heat radiation part.

4. The lighting device of claim 1, wherein each of the upper portion and the lower portion of the first heat radiation part has an opening, and wherein the inner portion of the second heat radiation part is disposed in the openings of the upper portion and the lower portion of the first heat radiation part.

5. The lighting device of claim 1, wherein a top surface of the upper portion of the first heat radiation part is disposed on the same plane with a top surface of the inner portion of the second heat radiation part.

6. The lighting device of claim 1, wherein a bottom surface of the substrate contacts with a top surface of the upper portion of the first heat radiation part, and the top surface of the outer portion and a top surface of the inner portion of the second heat radiation part.

7. The lighting device of claim 1, wherein the first receiver is a gap formed between the inner portion and the outer portion, wherein a shape of the gap of the first receiver corresponds to a shape of the lower portion of the first heat radiation part, wherein the second heat radiation part surrounds all of the lower portion of the first heat radiation part.

8. The lighting device of claim 1, wherein a plurality of the upper portions of the first heat radiation part or a plurality of the lower portions of the first heat radiation part are provided.

9. The lighting device of claim 8, wherein the substrate and the light emitting device of the light source module are sequentially disposed on the plurality of the upper portions of the first heat radiation part.

10. The lighting device of claim 8, wherein the outer portion of the second heat radiation part has a plurality of recesses in which each of the upper portions is disposed.

11. The lighting device of claim 1, wherein the upper portion of the first heat radiation part has a first hole, wherein the second heat radiation part has a second hole corresponding to the first hole of the first heat radiation part, and wherein a diameter of the first hole is less than that of the second hole.

12. The lighting device of claim 11, wherein the second hole of the second heat radiation part is formed in the outer portion of the second heat radiation part, and further comprising a cap disposed in the first hole of the first heat radiation part and in the second hole of the second heat radiation part.

13. The lighting device of claim 1, wherein the second heat radiation part further comprises a connection portion connected to the inner portion and the outer portion, and wherein a top surface of the inner portion of the second heat radiation part, a top surface of the outer portion of the second heat radiation part, and an end of the connection portion have at least one protrusion or at least one recess.

14. A lighting device comprising:
a heat sink including a first heat radiation part and a second heat radiation part;
a light source module including a substrate disposed on the heat sink and a light emitting device disposed on the substrate; and
a power supply unit which is disposed within the second heat radiation part of the heat sink and supplies power to the light source module,
wherein the second heat radiation part of the heat sink comprises an inner portion receiving the power supply unit therewithin, an outer portion enclosing the inner portion, and a first receiver disposed between the inner portion and the outer portion,
wherein the first heat radiation part of the heat sink comprises an upper portion which is disposed on the outer portion of the second heat radiation part, and a lower portion disposed in the first receiver of the second heat radiation part, and wherein the substrate is disposed on a top surface of the upper portion of the first heat radiation part and on a top surface of the inner portion of the second heat radiation part.

15. The lighting device of claim 14, wherein the light emitting device is disposed on the top surface of the upper portion of the first heat radiation.

16. The lighting device of claim 14, wherein the substrate is disposed on a top surface of the inner portion of the second heat radiation part.

17. The lighting device of claim 14, wherein
the second heat radiation part comprises a connection portion extending from lower portions of the inner portion and the outer portion,
the first receiver is a gap formed between the inner portion and the outer portion, and
a shape of the gap of the first receiver corresponds to a shape of the lower portion of the first heat radiation part.

18. The lighting device of claim 14, wherein the first heat radiation part of the heat sink is formed of a non-insulating material, wherein the second heat radiation part of the heat sink is formed of an insulating material, and wherein the first and second heat radiation parts are limited to separate from each other.

19. The lighting device of claim 14, wherein the first heat radiation part of the heat sink has a first thermal conductivity, wherein the second heat radiation part of the heat sink has a second thermal conductivity less than the first thermal conductivity, and wherein the first heat radiation part and the second heat radiation part are integrally formed with each other.

20. The lighting device of claim 14, wherein the upper portion of the first heat radiation part has a flat plate shape, and wherein the lower portion of the first heat radiation part has a cylindrical shape with an empty interior.

* * * * *